(12) United States Patent
    Carson et al.

(10) Patent No.:     US 12,589,474 B2
(45) Date of Patent:        Mar. 31, 2026

(54) SEAL INSERTION TOOL FOR A FLUID DELIVERY MODULE AND METHOD OF INSTALLING A SEAL INTO A FLUID DELIVERY MODULE

(71) Applicant: Ichor Systems, Inc., Fremont, CA (US)

(72) Inventors: Stephen Carson, Woodstock, NY (US); Randolph Treur, San Luis Obispo, CA (US)

(73) Assignee: Ichor Systems, Inc.

( * ) Notice: Subject to any disclaimer, the term of this patent is extended or adjusted under 35 U.S.C. 154(b) by 77 days.

(21) Appl. No.: 18/374,417

(22) Filed: Sep. 28, 2023

(65) Prior Publication Data

US 2024/0026974 A1      Jan. 25, 2024

Related U.S. Application Data

(60) Continuation-in-part of application No. 18/321,873, filed on May 23, 2023, and a continuation-in-part of application No. 17/319,196, filed on May 13, 2021, now Pat. No. 11,808,353, said application No. 18/321,873 is a division of application No. 17/318,241, filed on May 12, 2021, now Pat. No. 11,698,134.

(60) Provisional application No. 63/026,780, filed on May 19, 2020, provisional application No. 63/023,742, filed on May 12, 2020.

(51) Int. Cl.
    *B25B 27/00*       (2006.01)
    *B23P 19/08*       (2006.01)
    *F16J 15/06*       (2006.01)

(52) U.S. Cl.
    CPC ........ *B25B 27/0028* (2013.01); *B23P 19/084* (2013.01); *F16J 15/061* (2013.01)

(58) Field of Classification Search
    CPC .. F16J 15/061; F16J 15/3268; B25B 27/0028; B25B 27/023; B25B 27/067; B23P 19/084
    See application file for complete search history.

(56) References Cited

U.S. PATENT DOCUMENTS 3,981,066 A * 9/1976 Calvert .................. B01D 33/00
                                                        29/451
4,551,898 A * 11/1985 Provost ............... B25B 27/0028
                                                        29/263
4,607,402 A    8/1986 Pollard
                (Continued)

FOREIGN PATENT DOCUMENTS

CN        109564885 A    4/2019
JP        2003-526759 A    9/2003
                (Continued)

*Primary Examiner* — Nicholas L Foster
(74) *Attorney, Agent, or Firm* — The Belles Group, P.C.

(57) ABSTRACT

Apparatuses for controlling fluid flow are important components for delivering process fluids for semiconductor fabrication. These apparatuses for controlling fluid flow require a variety of fluid flow components which are tightly packaged within the apparatuses for controlling flow. Servicing the apparatuses requires specialized equipment and methods which enable installation of seals in close quarters in apparatuses which are installed in the field. Seal retainers may be used to retain the seals during assembly of fluid flow components into apparatus for controlling flow.

17 Claims, 42 Drawing Sheets

(56) References Cited

U.S. PATENT DOCUMENTS

| | | | | |
|---|---|---|---|---|
| 5,709,018 | A * | 1/1998 | Dugan | B23P 19/084 |
| | | | | 29/263 |
| 6,012,209 | A | 1/2000 | Whetstone | |
| 6,481,640 | B1 | 11/2002 | Carey et al. | |
| 6,629,546 | B2 | 10/2003 | Eidsmore et al. | |
| 6,945,539 | B2 | 9/2005 | Whitlow et al. | |
| 7,526,847 | B1 * | 5/2009 | Arthur | B25B 27/0028 |
| | | | | 29/466 |
| 8,496,029 | B2 | 7/2013 | Vu | |
| 9,969,069 | B2 * | 5/2018 | Pergantis | B25B 27/023 |
| 10,118,263 | B2 | 11/2018 | Kellogg et al. | |
| 10,576,613 | B2 * | 3/2020 | Pergantis | B25B 27/0028 |
| 10,641,312 | B2 * | 5/2020 | Mallard | F16J 15/068 |
| 10,836,004 | B2 * | 11/2020 | Noda | B25J 15/0206 |
| 11,052,520 | B2 * | 7/2021 | Maldonado | B23P 19/084 |
| 11,339,682 | B2 * | 5/2022 | Maldonado | B25H 3/02 |
| 11,698,134 | B2 * | 7/2023 | Carson | F16J 15/106 |
| | | | | 277/312 |
| 11,808,353 | B2 * | 11/2023 | Carson | F16J 15/104 |
| 12,018,571 | B2 * | 6/2024 | Maldonado | B25H 3/006 |
| 2002/0000256 | A1 | 1/2002 | Eidsmore et al. | |
| 2007/0186399 | A1 | 8/2007 | Bussell et al. | |
| 2008/0128303 | A1 | 6/2008 | Phillips et al. | |
| 2008/0302426 | A1 | 12/2008 | Mulligan et al. | |
| 2010/0313976 | A1 | 12/2010 | Vu | |
| 2012/0139190 | A1 | 6/2012 | Doyle | |
| 2013/0276928 | A1 | 10/2013 | Vu | |
| 2016/0312656 | A1 * | 10/2016 | Pergantis | B25B 27/023 |
| 2017/0057028 | A1 | 3/2017 | Kellogg et al. | |
| 2018/0222026 | A1 * | 8/2018 | Pergantis | F16J 15/021 |
| 2018/0339379 | A1 | 11/2018 | Noda et al. | |
| 2019/0299378 | A1 | 10/2019 | Horning et al. | |
| 2020/0406437 | A1 * | 12/2020 | Maldonado | B23P 19/084 |
| 2021/0356041 | A1 * | 11/2021 | Carson | F16K 27/003 |
| 2021/0364087 | A1 * | 11/2021 | Carson | B25B 27/0028 |
| 2023/0296175 | A1 * | 9/2023 | Carson | F16J 15/106 |
| | | | | 277/312 |

FOREIGN PATENT DOCUMENTS

| | | | |
|---|---|---|---|
| JP | 2008-002564 | A | 1/2008 |
| JP | 2010-156368 | | 7/2010 |
| JP | 2018-196916 | A | 12/2018 |
| KR | 10-0816263 | | 3/2008 |
| KR | 10-1838111 | B1 | 4/2018 |
| WO | WO2007/083203 | | 7/2007 |

\* cited by examiner

Insert Seal in End Effector of Seal Insertion Tool

Align Seal Insertion Tool with
Holes in Substrate Block

Press Seal Insertion Tool
onto Substrate Block

Install Tool Fasteners
of Seal Insertion Tool

Actuate Actuator to
Press Seal into Seal Cavity

Loosen Actuator and
Remove Tool Fasteners

Remove Seal Insertion Tool

SEAL INSERTION TOOL FOR A FLUID DELIVERY MODULE AND METHOD OF INSTALLING A SEAL INTO A FLUID DELIVERY MODULE

CROSS-REFERENCE TO RELATED APPLICATIONS

The present application is (1) a continuation in part of U.S. patent application Ser. No. 17/319,196, filed on May 13, 2021, which claims the benefit of U.S. Provisional Application 63/026,780, filed May 19, 2020; and (2) a continuation in part of U.S. patent application Ser. No. 18/321,873, filed on May 23, 2023, which is a divisional of U.S. application Ser. No. 17/318,241 (now U.S. Pat. No. 11,698,134), filed on May 12, 2021, which claims the benefit of U.S. Provisional Application 63/023,742, filed May 12, 2020, the entireties of which are incorporated herein by reference.

BACKGROUND

Flow control has been one of the key technologies in semiconductor chip fabrication. Apparatuses for controlling fluid flow are important for delivering known flow rates of process fluids for semiconductor fabrication and other industrial processes. Such devices are used to measure and accurately control the flow of fluids for a variety of applications. This control relies on apparatuses which have components that are quickly and reliably assembled with minimal seal leakage.

As the technology of chip fabrication has improved, the component size has decreased and packaging requirements have become tighter for the apparatuses for controlling flow. Maintenance and repair of apparatuses for controlling flow increasingly involves installing seals and components in tight quarters. In order to improve the speed and ease of maintenance, improved methods and equipment are desired.

BRIEF SUMMARY

The present technology is directed to a seal insertion tool for use in installing a seal to a component mounting location in an apparatus for controlling flow in a fluid delivery module. Apparatuses for controlling flow have a large number of components which must be assembled without leakage in order to function. Such apparatuses may be used in a wide range of processes such as semiconductor chip fabrication, solar panel fabrication, and the like.

In one implementation, the invention is a method of installing an annular seal in a fluid delivery module of a fluid supply line that extends from a fluid source to a process chamber. First, a seal insertion tool is coupled with a first substrate block of the fluid delivery module. The seal insertion tool is loaded with an annular seal. The seal insertion tool is coupled so that the annular seal is positioned above and aligned with a first fluid port located on a first surface of the first substrate block. Second, the seal insertion tool is actuated so that the seal insertion tool lowers the annular seal and presses a lower portion of the annular seal into a first annular groove of the first fluid port that surrounds a first fluid opening of the first fluid port. The first and second steps are performed while the fluid delivery module remains in-situ within the fluid supply line. In yet another implementation, the invention is a method of replacing an annular seal in a fluid delivery module. First an active flow component is decoupled from a first substrate block of the fluid delivery module by releasing one or more component fasteners that respectively engage one or more anchors of the fluid delivery module, thereby exposing a first fluid port on a first surface of the first substrate block. Second, an expired seal is removed. Third, a seal insertion tool is coupled to the first substrate block by activating one or more tool fasteners to engage the one or more anchors of the fluid delivery module. Fourth, the seal insertion tool is actuated so that an annular seal that is aligned with the first fluid port is pressed into a first annular groove of the first fluid port that surrounds a first fluid opening of the first fluid port.

In another implementation, the invention is a method of installing an annular seal in a fluid delivery module comprising a support structure, a first substrate block mounted to the support structure, and a plurality of flow components mounted to the support structure. First, a seal insertion tool loaded with an annular seal to the first substrate block, the annular seal positioned above and aligned with a first fluid port located on a first surface of the first substrate block. Second, the seal insertion tool is actuated so that the seal insertion tool presses a lower portion of the annular seal into a first annular groove of the first fluid port that surrounds a first fluid opening of the first fluid port. The first and second steps are performed while the first substrate block remains mounted to the support structure of the fluid delivery module.

In yet another implementation, the invention is a method of manufacturing semiconductors or integrated circuits. First, an annular seal of a fluid delivery module is installed or replaced according to the methods above to complete a fluid supply line that extends from a fluid source to a process chamber. Second, fluid is flowed from the fluid source to the process chamber to contact one or more semiconductor or integrated circuit wafers in the process chamber.

In an alternate implementation, the invention is a seal insertion tool. The seal insertion tool has a body, a pair of fasteners for coupling the body to a fluid delivery module, an end effector slidably mounted to the body, the end effector configured to receive and retain an annular seal, and an actuator operably coupled to the end effector and configured to alter the end effector from a raised state to a lowered state upon a user actuating the actuator.

In another implementation, this technology is directed to a seal retainer for use in assembling a seal and a component to a component mounting location in an apparatus for controlling flow. One or more of the seal retainers may be used on a single component and the resulting apparatuses for controlling flow may be used in a wide range of processes such as semiconductor chip fabrication, solar panel fabrication, and the like.

In one implementation, the invention is a method of installing a fluid flow component in an apparatus for controlling flow. In a first step, a seal is positioned into a first seal retainer to form a seal assembly. Second, the seal assembly is installed onto the fluid flow component so that the first seal is aligned with a first seal cavity of the fluid flow component, thereby forming a component assembly. Third, the component assembly is positioned atop a first substrate block of the apparatus for controlling flow so that the first seal is aligned with a first seal cavity of the first substrate block and a portion of the first seal retainer is positioned between the first substrate block and the fluid flow component. Fourth, the component assembly is partially fastened to the apparatus for controlling flow so that the first seal is at least partially disposed within each of the first seal cavity of the first substrate block and the first seal cavity of the fluid flow component. Fifth, the first seal retainer is retracted so that the first seal retainer is released from the fluid flow component and the portion of the first seal retainer is removed from between the first substrate block and the fluid flow component. Sixth, the component assembly is completely fastened to the apparatus for controlling flow.

In yet another implementation, the invention is a method of manufacturing semiconductors or integrated circuits. First, a fluid flow component of an apparatus for controlling flow is installed according to the method discussed above to complete a fluid supply line that extends from a fluid source to a process chamber. Second, fluid is flowed from the fluid source to the process chamber to contact one or more semiconductor or integrated circuit wafers in the process chamber.

In another implementation, the invention is a seal retainer for retaining a seal, the seal retainer having a sheet body. The sheet body has a first axis, a second axis perpendicular to the first axis, a first portion, and a second portion. The first axis is coplanar with the first portion and the first portion is elongate in a direction of the first axis and extends from the second axis along the first axis. The second portion extends from the second axis and has a seal retaining feature.

In yet another implementation, the invention is a fluid flow component assembly, the fluid flow component assembly having a fluid flow component, an alignment feature, a first seal, and a first seal retainer. The fluid flow component has a first seal cavity. The alignment feature is in contact with the fluid flow component. The first seal is configured to engage the first seal cavity. The first seal retainer is configured to engage the first seal and the alignment feature of the fluid flow component. The first seal is assembled to the first seal retainer so that the first seal is in contact with the first seal cavity.

In an alternate implementation, the invention is a method of installing a fluid flow component to an apparatus for controlling flow. First a component assembly is positioned atop a first substrate block, the component assembly comprising a fluid flow component, a first seal retainer, and a first seal retained by the first seal retainer in alignment with a first seal cavity of the fluid flow component. The component assembly is positioned atop the first substrate block so that the first seal is aligned with a first seal cavity of the first substrate block. Second, the first seal retainer is retracted so that the first seal retainer is released from the fluid flow component while the first seal and the fluid flow component remain in position. Third, the fluid flow component is fastened to the apparatus for controlling flow so that the first seal hermetically seals a flow path of the first substrate block to a flow path of the fluid flow component.

In yet another implementation, the invention is a seal retainer for retaining a seal, the seal retainer having a sheet body. The sheet body has a first portion extending along a first axis. The first portion is elongate in a direction of the first axis and extending from the second axis. The sheet body further has a second portion extending along a second axis, the second axis being perpendicular to the first axis. The second portion extends along the second axis. The sheet body also has a seal retaining feature formed into the second portion.

Further areas of applicability of the present technology will become apparent from the detailed description provided hereinafter. It should be understood that the detailed description and specific examples, while indicating the preferred implementation, are intended for purposes of illustration only and are not intended to limit the scope of the technology.

BRIEF DESCRIPTION OF THE DRAWINGS

The invention of the present disclosure will become more fully understood from the detailed description and the accompanying drawings, wherein.

Figure 1:
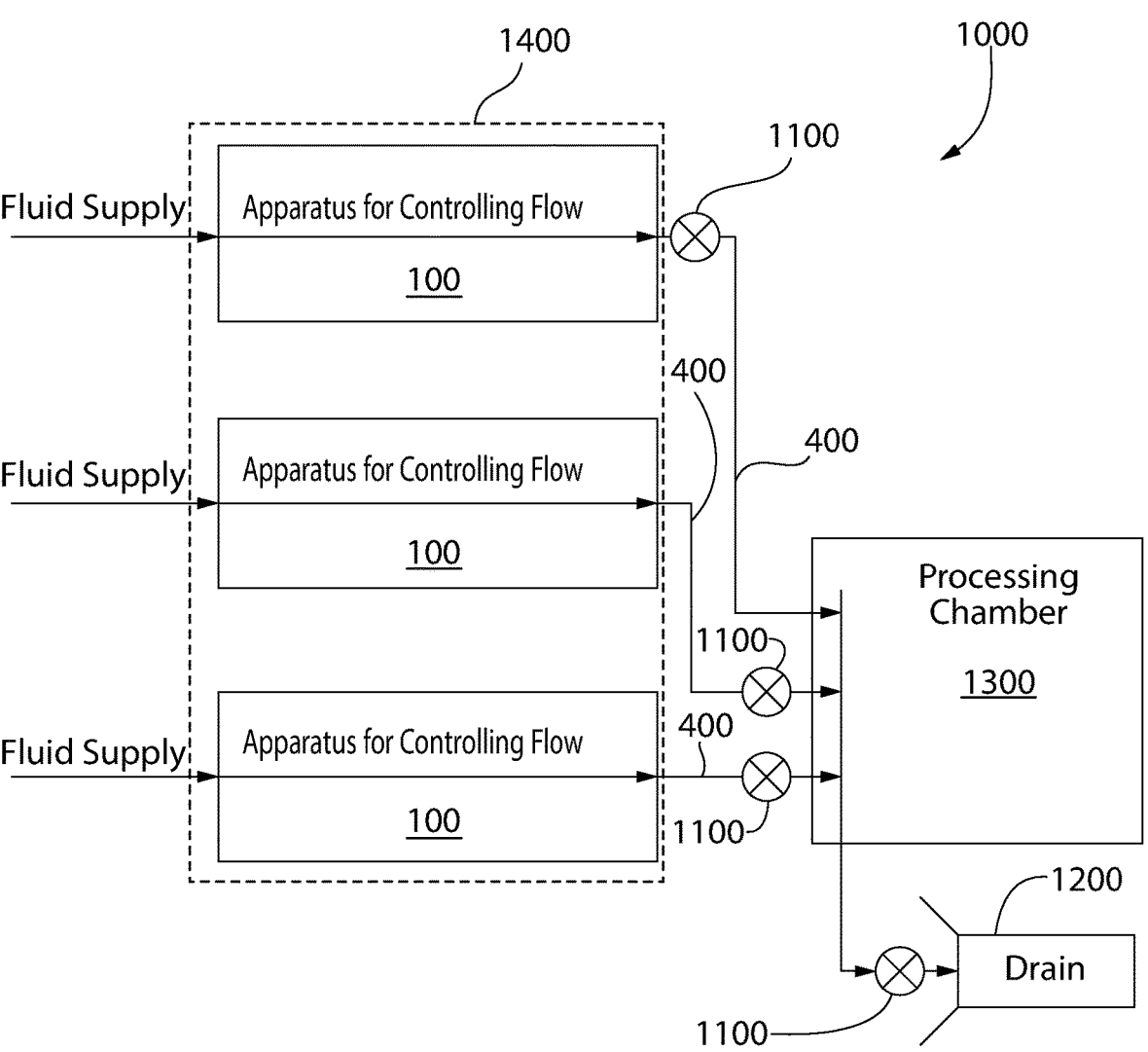
FIG. 1 is a schematic of a system for manufacturing semiconductor devices utilizing one or more apparatuses for controlling flow.

All drawings are schematic and not necessarily to scale. Features shown numbered in certain figures which may appear un-numbered in other figures are the same features unless noted otherwise herein.

DETAILED DESCRIPTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

The disclosure is divided into two sections. Section I discusses a seal insertion tool for a fluid delivery module and a method of installing a seal into a fluid delivery module. Section II discusses a seal retainer for a component assembly and a method of installing a component into an apparatus for controlling flow. Different embodiments disclosed in the respective sections can be used together as part of a fluid delivery apparatus, method, or system. To the extent a term, reference number, or symbol is used differently in different sections, context should be taken from the relevant section and not the other sections.

Section I

The present invention is directed to a seal retainer for use in installing fluid flow components to form a flow control apparatus. Semiconductor fabrication is one industry which demands high performance in control of fluid flows. As semiconductor fabrication techniques have advanced, customers have recognized the need for flow control devices with decreased space requirements. Thus, servicing and maintenance of flow control equipment has grown increasingly difficult as packaging of flow control devices grows denser than ever. The present invention facilitates efficient assembly of a flow control component within a flow control apparatus.

FIG. 1 shows a schematic of an exemplary processing system 1000. The processing system 1000 may utilize a plurality of apparatus for controlling flow 100 fluidly coupled to a processing chamber 1300. The plurality of apparatus for controlling flow 100 are used to supply one or more different process fluids to the processing chamber 1300. Fluids are provided by a plurality of fluid supplies, or fluid sources. Collectively, the plurality of apparatus for controlling flow 100 belong to a fluid delivery module 1400. Optionally, more than one fluid delivery module 1400 may be utilized in the processing system 100. The plurality of apparatus for controlling flow 100 are connected to the processing chamber 1300 by an outlet manifold 400. Articles such as semiconductors and integrated circuits may be processed within the processing chamber 1300.

Valves 1100 isolate each of the apparatus for controlling flow 100 from the processing chamber 1300, enabling each of the apparatus for controlling flow 100 to be selectively connected or isolated from the processing chamber 1300, facilitating a wide variety of different processing steps. The processing chamber 1300 may contain an applicator to apply process fluids delivered by the plurality of apparatus for controlling flow 100, enabling selective or diffuse distribution of the fluids supplied by the plurality of apparatus for controlling flow 100. Optionally, the processing chamber 1300 may be a vacuum chamber or may be a tank or bath for immersing articles in the fluids supplied by the plurality of apparatus for controlling flow 100. A fluid supply line is formed by the flow path from each of the respective fluid supplies to the processing chamber 1300.

In addition, the processing system 1000 may further comprise a drain 1200 which is isolated from the processing chamber 1300 by a valve 1100 to enable evacuation of process fluids or facilitate purging one or more of the apparatus for controlling flow 100 to enable switching between process fluids in the same apparatus for controlling flow 100. Optionally, the drain 1200 may be a source of vacuum or may be a liquid drain configured to remove liquids from the processing chamber 1300. Optionally, the apparatus for controlling flow 100 may be mass flow controllers, flow splitters, or any other device which controls the flow of a process fluid in a processing system. Furthermore, the valves 1100 may be integrated into the apparatus for controlling flow 100 if so desired.

Processes that may be performed in the processing system 1000 may include wet cleaning, photolithography, ion implantation, dry etching, atomic layer etching, wet etching, plasma ashing, rapid thermal annealing, furnace annealing, thermal oxidation, chemical vapor deposition, atomic layer deposition, physical vapor deposition, molecular beam epitaxy, laser lift-off, electrochemical deposition, chemical-mechanical polishing, wafer testing, electroplating, or any other process utilizing fluids.

Figure 2:
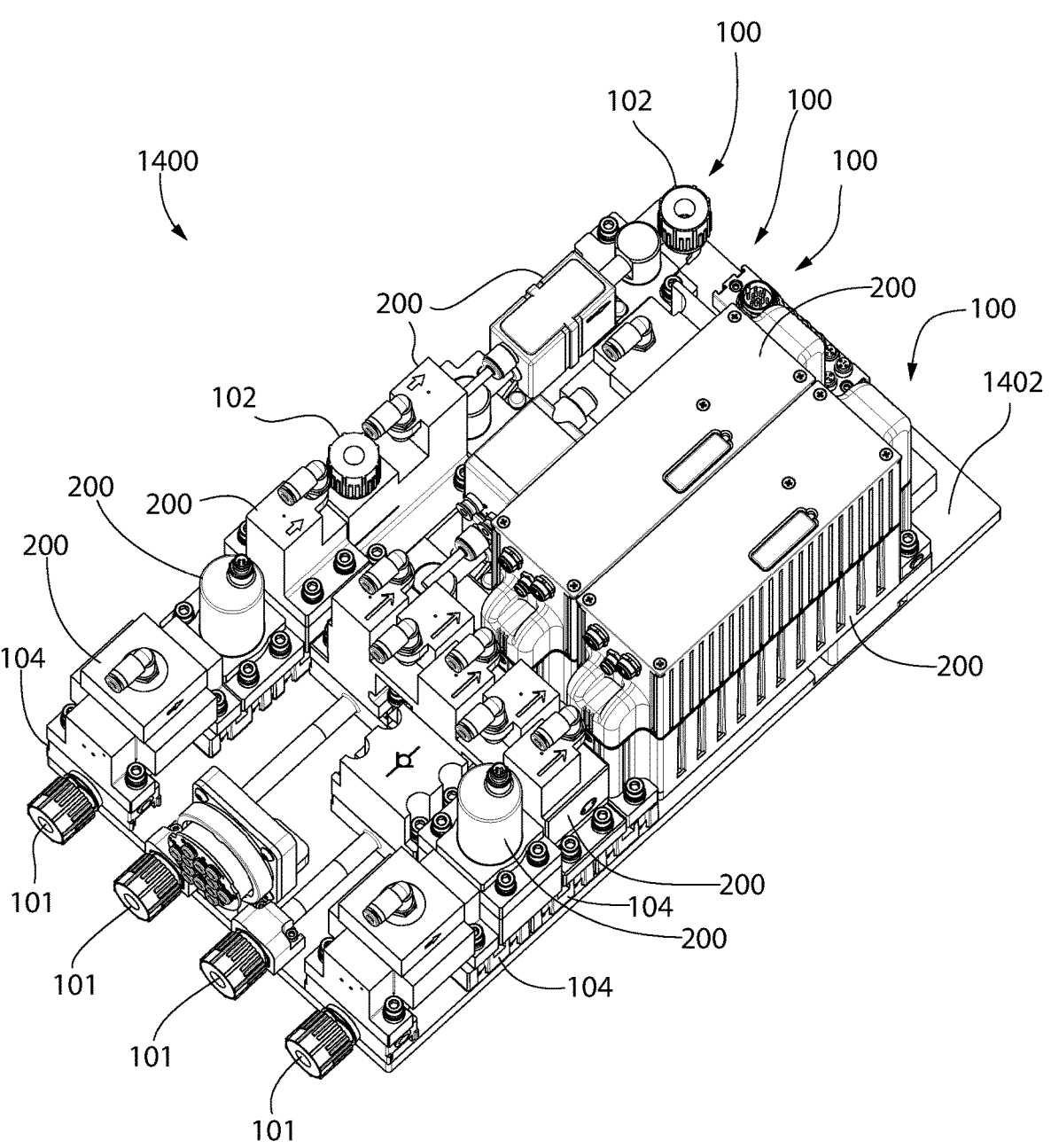
FIG. 2 is a perspective view of a fluid delivery module comprising a plurality apparatuses for controlling flow as may be utilized in the process of FIG. 1.
Figure 3:
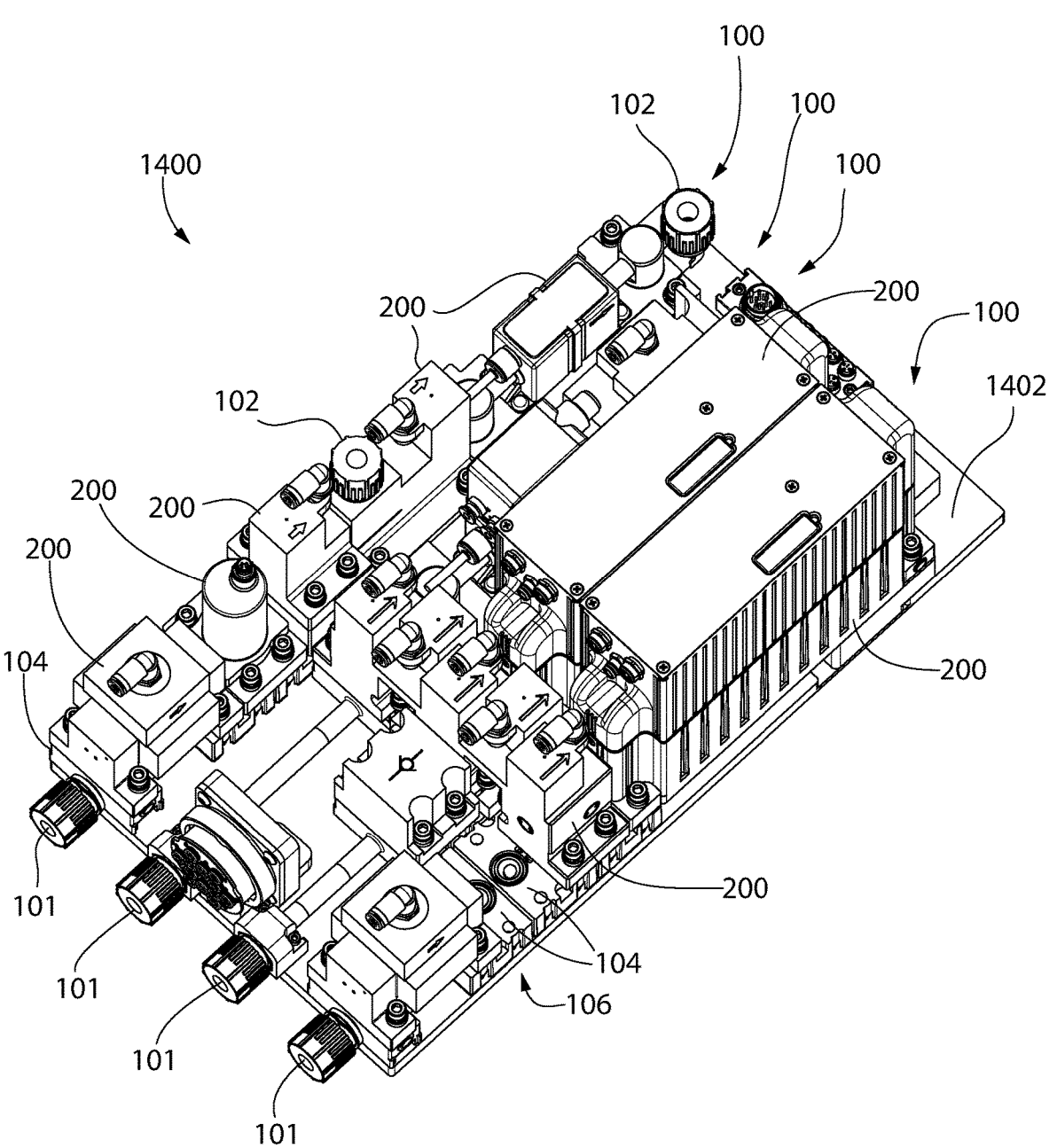
FIG. 3 is a perspective view of the module of FIG. 2 showing one fluid flow component removed.

FIGS. 2 and 3 show a schematic of an exemplary fluid delivery module 1400. In this embodiment, the fluid delivery module 1400 has a plurality of apparatus for controlling flow 100 having a plurality of inlets 101 and a plurality of outlets 102. In some embodiments, the plurality of inlets 101 do not correspond to the plurality of outlets 102 in a one to one manner. Instead, a plurality of inlets 101 may be joined into a single outlet 102 and a single inlet 101 may be split into a plurality of outlets 102. This may be done to achieve mixing or combination of different fluids prior to providing them to the process chamber 1300.

As can be seen, each of the apparatus for controlling flow 100 is arranged generally in a row, with the plurality of apparatus 100 in parallel rows. This need not be the case, and any packaging configuration may be used. The fluid delivery module 1400 has a substrate panel 1402. The substrate panel 1402 serves as support structure for the fluid delivery module 1400, but it may be simply used to facilitate assembly. Other structural support configurations are contemplated. A plurality of substrate blocks 104 rest on the substrate panel 1402 and comprise fluid ports therein to conduct flow to one or more fluid flow components 200 having corresponding fluid ports as discussed in greater detail below. The fluid flow components 200 may be considered active components while the substrate blocks 104 may be considered passive components. The fluid flow components 200 may be one or more of a valve, a flow controller, a pressure transducer, a flow measurement sensor, a pressure regulator, a flow restrictor, or an actuator, or any other known flow control component. A plurality of anchors are used to couple the fluid flow components 200 to the substrate blocks 104. The anchors may be threaded inserts or threads in the substrate blocks 104, threaded inserts or threads in the substrate panel 1402, nuts, or other anchoring features which permit secure fastening of the fluid flow components 200.

As can be seen by comparing FIG. 2 with FIG. 3, a fluid flow component 200 is removed from the fluid delivery module 1400 of FIG. 3. The removal of the fluid flow component 200 exposes portions of two substrate blocks 104. A component mounting location 106 is formed by the portions of the two substrate blocks 104. The component mounting location 106 may vary in size depending on the dimensions of the component 200 mounted to the component mounting location 106. Thus, different component mounting locations 106 may comprise different portions of the same substrate block 104. Each and every component 200 has a component mounting location 106 in the fluid delivery module 1400.

Turning to FIGS. 4A-D, a portion of the fluid delivery module 1400 is shown. Specifically, a fluid flow component 200 is shown mounted to a pair of substrate blocks 104 which form a component mounting location 106. The fluid flow component 200 is mounted to the substrate blocks 104 via component fasteners 250. The component fasteners 250 may be used for alignment as well as for fastening and may be replaced by any suitable type of fastener capable of fastening the fluid flow components 200 to the substrate blocks 104. The component fasteners 250 may be fasteners such as bolts, screws, pins, or other known fastening device. However, in other embodiments, the component fasteners 250 may be separate from the alignment features. For instance, dowel pins or other pins may be used to align the fluid flow component 200 to the substrate blocks 104. Then, a separate component fastener may be used for fastening the fluid flow component 200 to the substrate blocks 104. As can be seen in FIGS. 4A-D, the component fasteners 250 extend through the substrate blocks 104.

Although not shown in FIGS. 4A-D, the substrate panel 1402 has anchors. The anchors comprise portions of the substrate panel 1402 which are threaded or have threaded inserts which receive the component fasteners 250. Thus, the component fasteners 250 extend through fastener passageways 208 in the fluid flow component 200, fastener passageways 108 in the substrate blocks 104, and install into anchors in the substrate panel 1402. The component fasteners 250 are intended for rough alignment, but precision alignment is provided by other geometry. Thus, the fastener passageways 108, 208 need not be a precision fit on the component fasteners 250. In alternate embodiments, the component fasteners 250 may install directly to the substrate blocks 104 via threaded holes or inserts within the fastener passageways 108. In these embodiments, the substrate blocks 104 may be separately attached to the substrate panel 1402 via additional fasteners. In other embodiments, the component fasteners 250 may install into supports or other components which are beneath the substrate panel 1402.

Figure 4A:
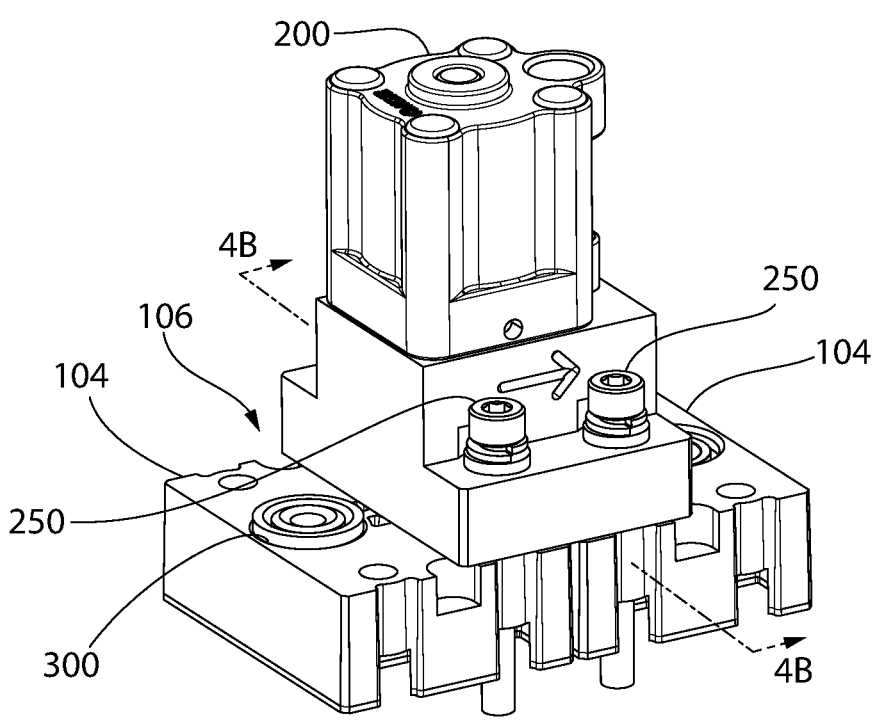
FIG. 4A is a perspective view of a component mounted to a pair of substrate blocks.
Figure 4B:
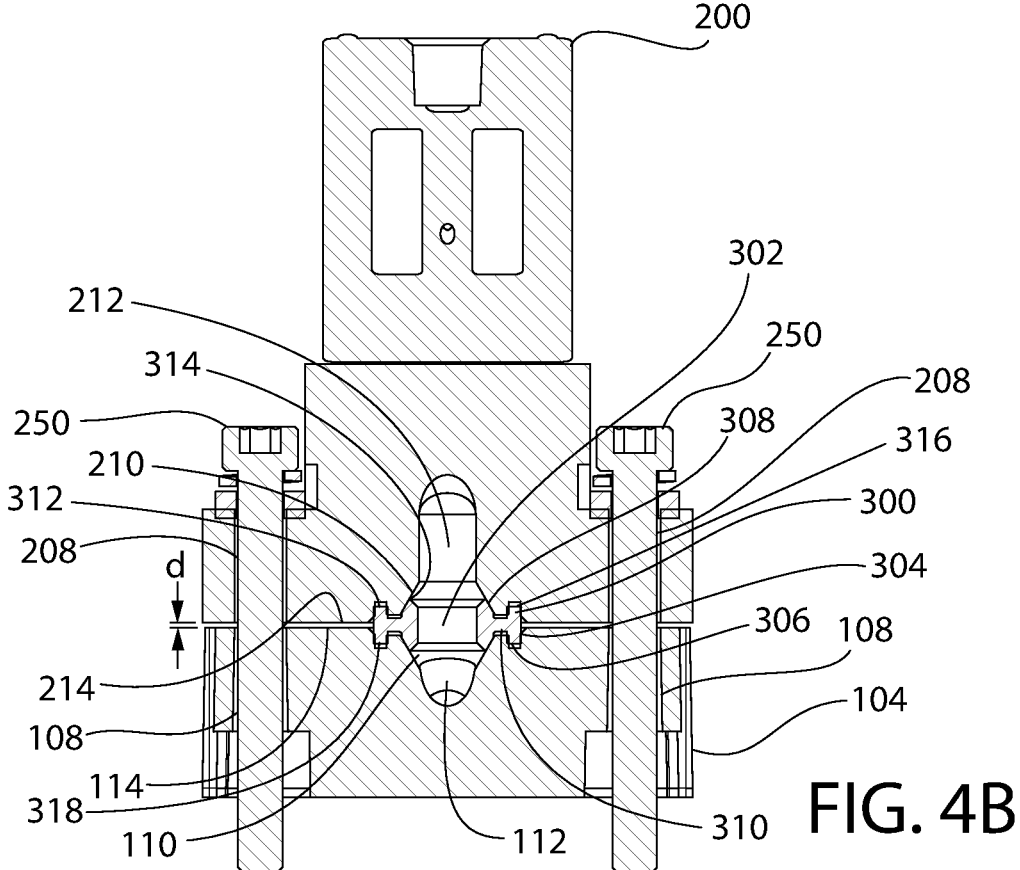
FIG. 4B is a cross-sectional view of the component and one of the substrate blocks of FIG. 4A, taken along line 4B-4B.

As best shown in FIG. 4B, an annular seal 300 is positioned between the fluid flow component 200 and the substrate block 104. The annular seal 300 is a seal having an annular configuration with a cylindrical outer surface 304, an outer upstanding ring wall 306, an inner upstanding ring wall 308, and a flange 310 connecting the inner and outer upstanding ring walls 308, 306. The outer upstanding ring wall 306 has a top surface 312. The seal 300 is also divided into an upper portion 316 and a lower portion 318, the upper portion 316 being the upper half of the seal and the lower portion 318 being a lower portion of the seal. The seal 300 also has a flow path 302 through the center which permits passage of fluid therethrough. The seal 300 provides a hermetic seal between a fluid port 210 of the fluid flow component 200 and a fluid port 110 of the substrate block 104. Each of the fluid ports 110 of the substrate block 104 comprises an annular groove 116. Each of the fluid ports 210 of the fluid flow component 200 comprises an annular groove 216. Each of the fluid ports 110 of the substrate blocks 104 comprises an annular groove 116.

Figure 4C:
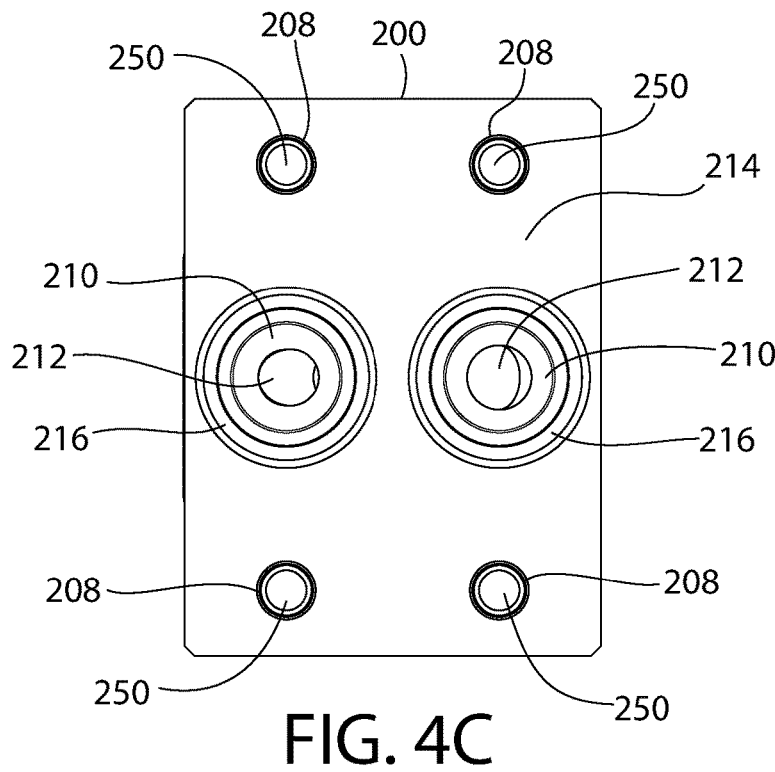
FIG. 4C is a bottom view of the component of FIG. 4A.
Figure 4D:
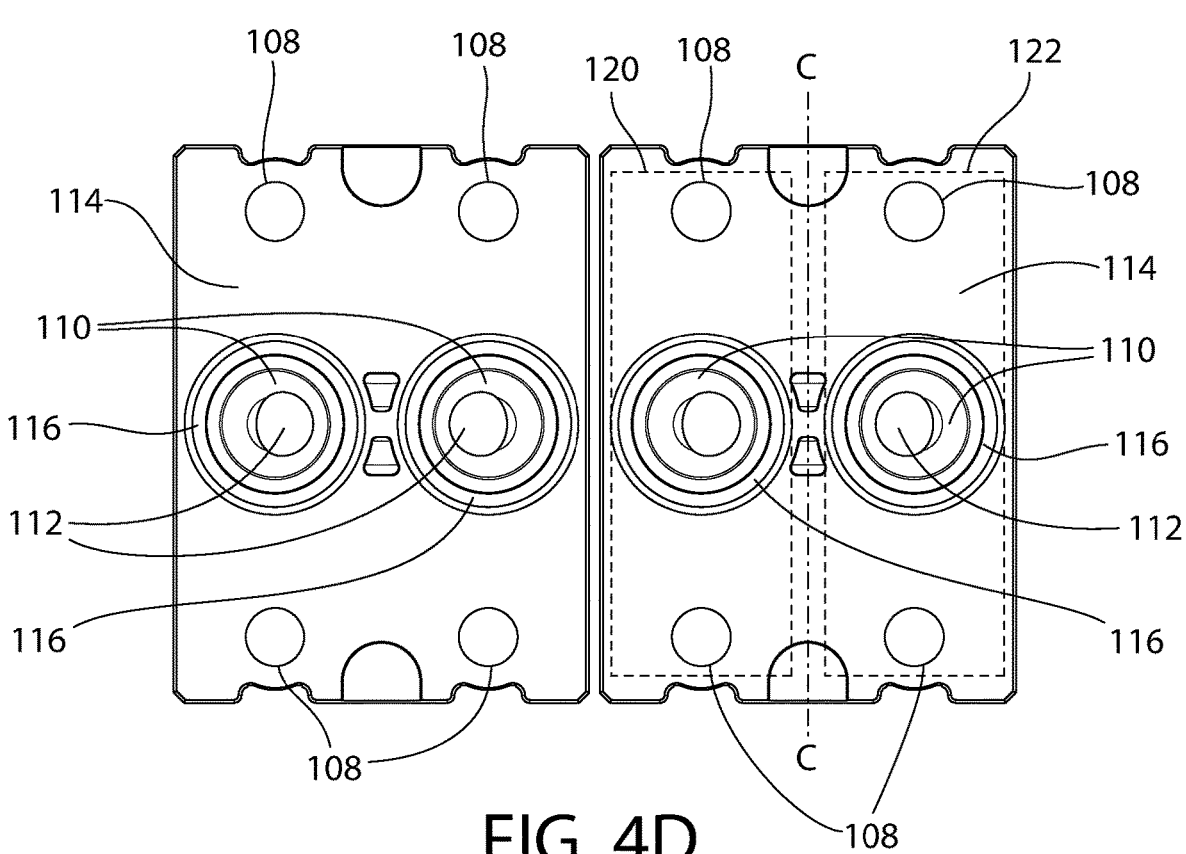
FIG. 4D is a top view of the substrate blocks of FIG. 4A.
Figure 5:
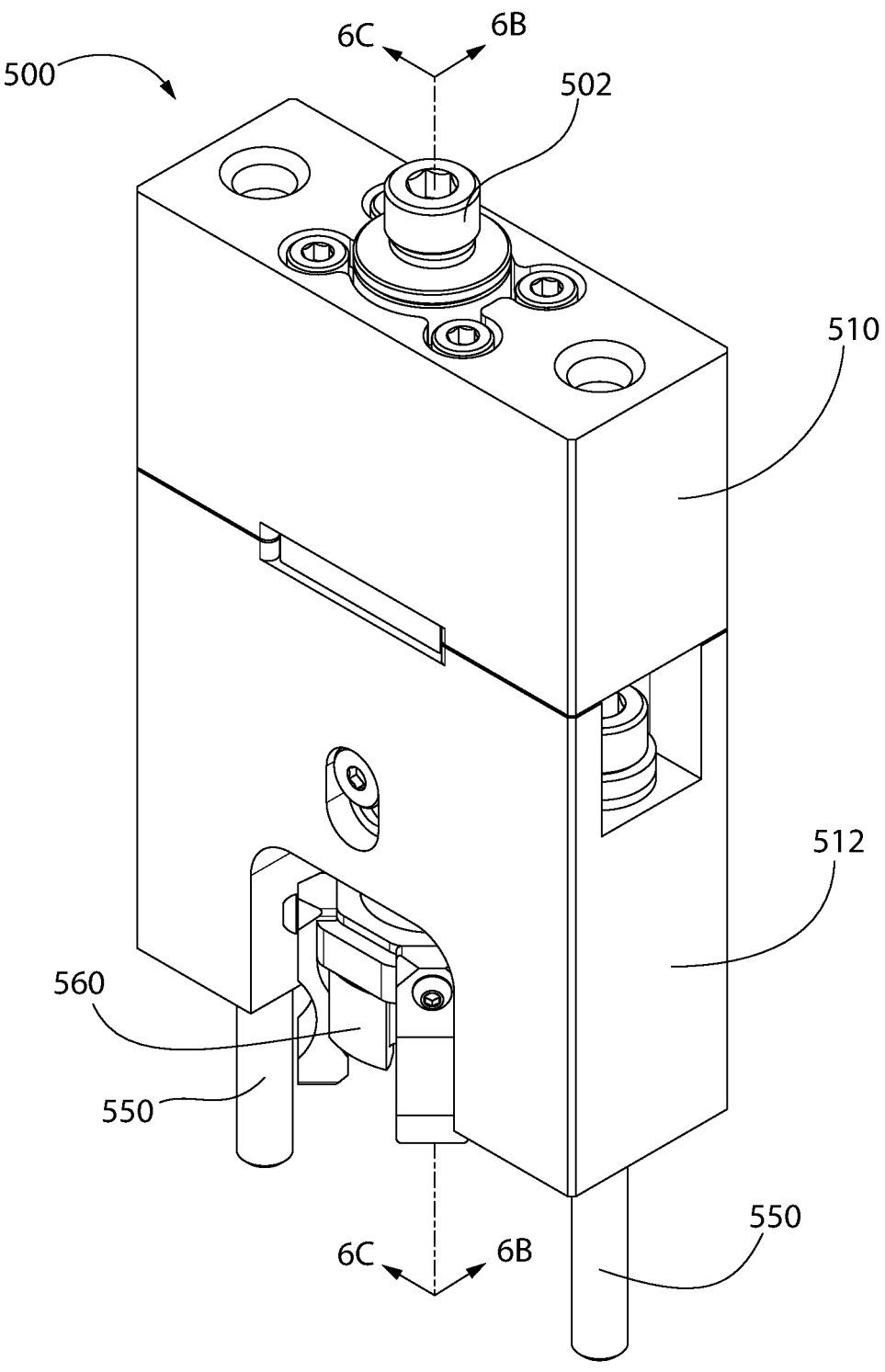
FIG. 5 is a perspective view of a seal insertion tool for installing a seal into a substrate block of an apparatus controlling flow.

As best shown in FIG. 4C, the fluid flow component 200 comprises a bottom surface 214 comprising two fluid ports 210, with one fluid port 210 being an inlet and the other being an outlet. A fluid flow path 212 extends from a fluid opening of one fluid port 210 to a fluid opening of the other fluid port 210. Similarly, in FIG. 4D, it can be seen that the substrate blocks 104 each comprise a first surface 114 comprising two fluid ports 110. A fluid flow path 112 extends from a fluid opening of one fluid port 110 to a fluid opening of the other fluid port 110. Returning to FIG. 4B, it can be seen that, when the seal 300 is installed between the fluid flow component 200 and the substrate block 104, there is a distance d between the first surface 114 and the bottom surface 214. Thus, the seal 300 is compressed between the fluid flow component 200 and the substrate block 104. The seal 300 fits into the annular groove 216 of the fluid flow component 200 and the annular groove 116 of the substrate block 104. During assembly, the first surface 114 and the bottom surface 214 are drawn closer together by the component fasteners 250, reducing the distance d between the first surface 114 and the bottom surface 214.

The substrate blocks 104 each comprise a central plane C-C which divides the first fluid port 110 from the second fluid port 110. The central plane C-C is spaced at a midpoint between two opposite sides of the substrate block 104 and is transverse to the first surface 114. The first surface 114 forms a footprint of the substrate block 104 onto which components may be mounted. However, due to the configuration of the fluid delivery module 1400, the substrate blocks 104 each mount two different components. The central plane C-C divides the footprint of the substrate block 104 into a first footprint half 120 and a second footprint half 122. A fluid flow component 200 is always mounted to one or the other of the first footprint halves 120, 122 and never crosses the central plane C-C.

Turning to FIGS. 5-8, a seal insertion tool 500 is shown. The seal insertion tool 500 is used to press a seal 300 into an annular groove 116 of a substrate block 104. As can be best seen in FIG. 5, the seal insertion tool 500 has an actuator 502, an end effector 560, an upper body 510, a lower body 512, and a pair of tool fasteners 550. The actuator 502 may be a socket head cap screw or other component which can be engaged by a tool such as an Allen wrench, socket, spanner wrench, or any other tool which can operate the actuator 502. The end effector 560 holds the seal and moves up and down to press the seal 300 into the annular groove 116 as will be discussed in greater detail below. The tool fasteners 550 fit into the fastener passageways 108 of the substrate block 104 and engage the same anchors that the component fasteners 250 engage. The tool fasteners 550 are preferably threaded, but they may operate in any manner required to secure the seal insertion tool 500 to the substrate block 104.

Figure 6A:
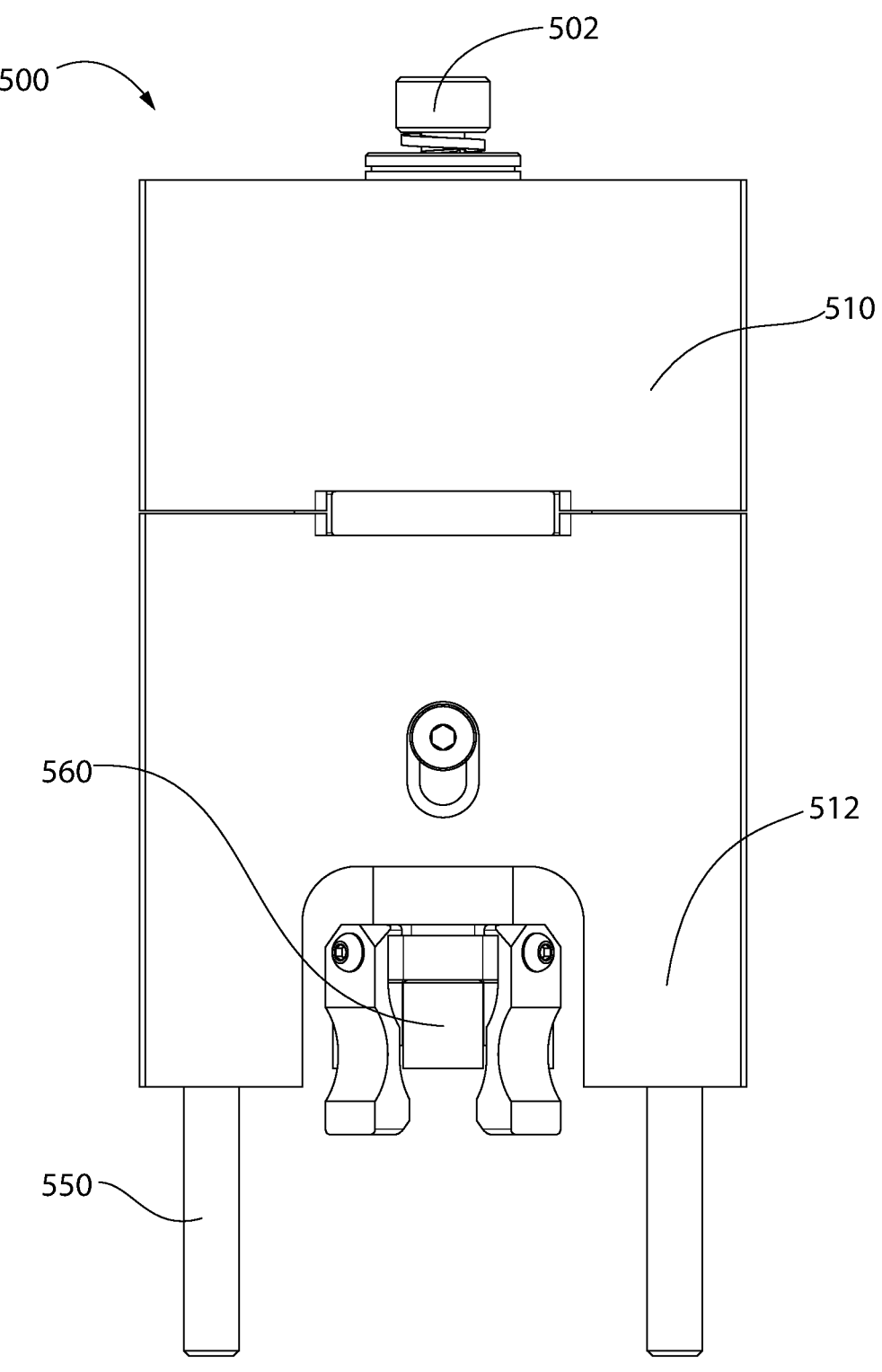
FIG. 6A is a front view of the seal insertion tool FIG. 5.
Figure 6B:
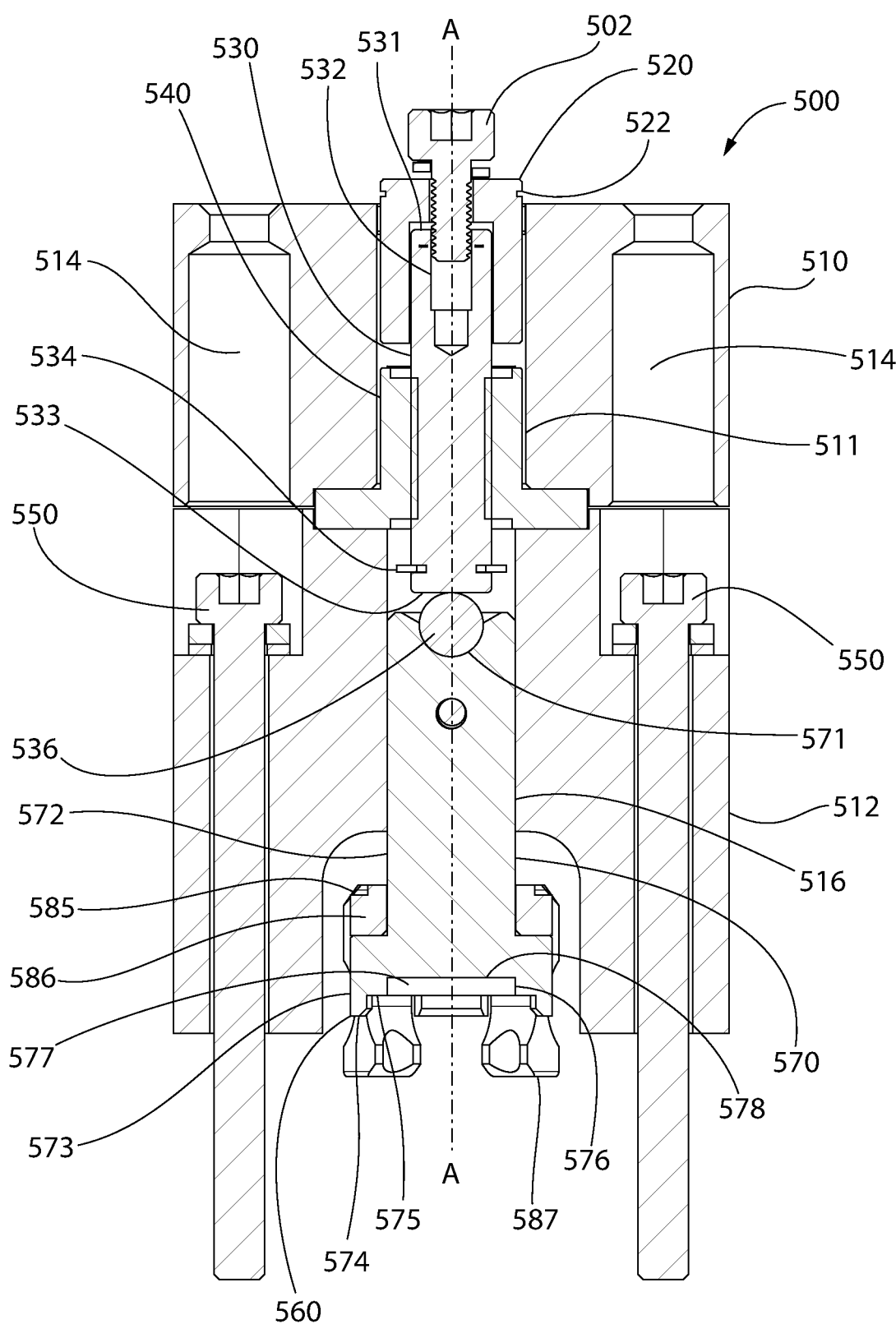
FIG. 6B is a cross-sectional view of the seal insertion tool FIG. 5 taken along the line 6B-6B.
Figure 6C:
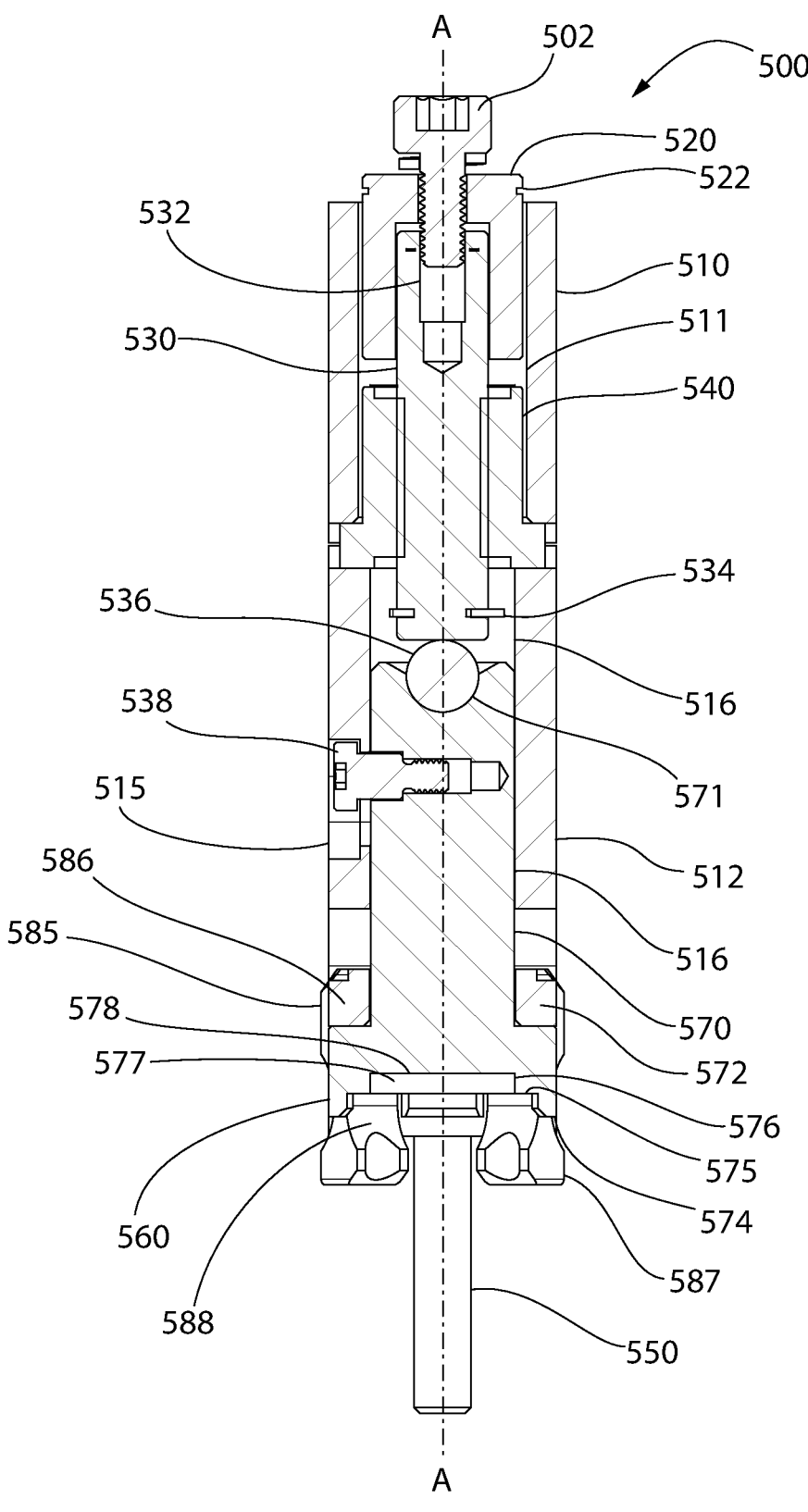
FIG. 6C is a cross-sectional view of the seal insertion tool FIG. 5 taken along the line 6C-6C.

Turning to FIGS. 6A-C, a front view and two cross sections of the seal insertion tool 500 are shown. The actuator 502 of the seal insertion tool 500 is fixedly attached to a drive shaft 530. The drive shaft 530 has a hole 532 which receives the actuator 502, fixing the drive shaft 530 to the actuator 502 by a threaded connection. Alternately, the actuator 502 may be glued, welded, pressed, or otherwise fixed to the drive shaft 530. In some embodiments, the actuator 502 may be integrally formed with the drive shaft 530. Preferably, the drive shaft 530 is a ball screw, but may also be a lead screw having an Acme or trapezoidal thread, a conventional screw, or any other shaft capable of linear motion when rotated. The drive shaft 530 extends from a proximal end 531 to a distal end 533, the hole 532 for the actuator 502 being located at the proximal end 531.

The drive shaft 530 threadedly engages a threaded collar 540. The threaded collar 540 is a ball nut in this implementation, but may be a lead nut having trapezoidal or Acme threads, or a conventional nut for triangular profile threads. Alternately, the threaded collar 540 may be any device capable of engaging the drive shaft 530 to provide relative motion between the drive shaft 530 and the threaded collar 540 when one of the drive shaft 530 and the threaded collar 540 are rotate with respect to the other one of the drive shaft 530 and the threaded collar 540.

An input stop block 520 is captured between the actuator 502 and the drive shaft 530. The input stop block 520 serves to limit travel of the drive shaft 530 by bottoming out on the threaded collar 540. This prevents excessive compression of the seal 300 during installation and minimizes the risk of destruction of the anchors in the substrate panel 1402 due to excessive force from the drive shaft 530 overwhelming the maximum retention force of the actuators. The input stop block 520 also rides in the bore 511 of the upper body 510, reducing bending forces on the drive shaft 530 when torque is applied to the actuator 502. Finally, the input stop block 520 has an indicator groove 522, which may be used to indicate when the drive shaft 530 has been adequately retracted prior to installation of the seal 300.

At the distal end 533 of the drive shaft 530, a snap ring 534 fits within an annular groove of the drive shaft 530. The snap ring 534, also known as a circlip, e-clip, or spring clip, fits into the annular groove and prevents excessive retraction of the drive shaft 530. When the actuator 502 is turned to retract the drive shaft 530 upward, the snap ring 534 engages the threaded collar 540 and prevents further rotation of the actuator 502. This beneficially ensures that the drive shaft 530 is not excessively retracted from the threaded collar 540 and prevents undesired disassembly of the seal insertion tool 500.

The distal end 533 of the drive shaft 530 engages a friction reducing component 536. In this case, the friction reducing component 536 is a ball bearing, but it may also be a thrust washer or other friction reducing component. The friction reducing component 536 engages an end effector 560. The end effector 560 has a plunger 570 and a gripper 585. The plunger 570 has a depression 571 into which the friction reducing component 536 rests.

The plunger 570 also has a plunger shaft 572 and a plunger head 573. The plunger shaft 572 slides in a bore 516 formed in the lower body 512. The plunger head 573 has an end face 574, a work surface 575, an annular wall 576, a depression 577, and a floor 578. The end face 574 is the lower-most surface of the plunger head 573 as shown in FIGS. 6A-C. The work surface 575 is a planar surface which is above and inside of the end face 574. The work surface 575 surrounds the depression 577, which is bounded by the annular wall 576 and the floor 578. When a seal 300 is loaded into the end effector 560, the top surface 312 of the outer upstanding ring wall 306 of the seal 300 rests against the work surface 575 while a top surface 314 of the inner upstanding ring wall 308 is spaced from the floor 578. In this manner, the inner upstanding ring wall 308 is not deformed during installation.

The gripper 585 has a collar 586 and a plurality of grip fingers 587. The collar 586 is sized so that it slides on the plunger shaft 586. The grip fingers 587 are attached to the plunger shaft 586 so that they move with the collar 586. A longitudinal axis A-A extends through the actuator 502, the drive shaft 530, the friction reducing component 536, and the plunger 570. The plunger 570 and the gripper 585 are constrained so that they move along the longitudinal axis A-A during installation of the seal. During use, the gripper 585 retains the seal 300. The gripper 585 is designed to capture the seal 300 so that the seal 300 is retained while seal insertion tool 500 is installed onto the substrate block 104. The grip fingers 587 each have inner surfaces 588 which have arcuate sections and flat sections that engage the cylindrical outer surface 304 and the outer upstanding ring wall 306 of the seal 300 as will be discussed in greater detail below.

Rotation of the end effector 560 is prevented by an anti-rotation feature 538 which is installed within a slot 515 formed in the lower body 512. The anti-rotation feature 538 may slide up and down in the slot 515, but the end effector 560 cannot rotate. The anti-rotation feature 538 engages the plunger shaft 572 of the plunger 570 to prevent rotation. Optionally, the anti-rotation feature 538 may be a bolt that is installed in a threaded hole in the plunger 570. In other embodiments, it may be a pin or other feature which is pressed, welded, glued, or otherwise installed in place.

The combination of the anti-rotation feature 538 and the slot 515 also serve to prevent undesired removal of the end effector 560. The end effector 560 is not axially constrained against the drive shaft 530. Instead, the end effector 560 is free to float axially. When the drive shaft 530 is retracted and no upward force is present on the end effector 560, there may be a space between the friction reducing component 536 and the drive shaft 530. However, as soon as a force is applied to the end effector 560 and the drive shaft 530 is advanced into contact with the friction reducing component 536, the friction reducing component 536 transmits the force from the drive shaft 530 to the end effector 560.

Figure 7:
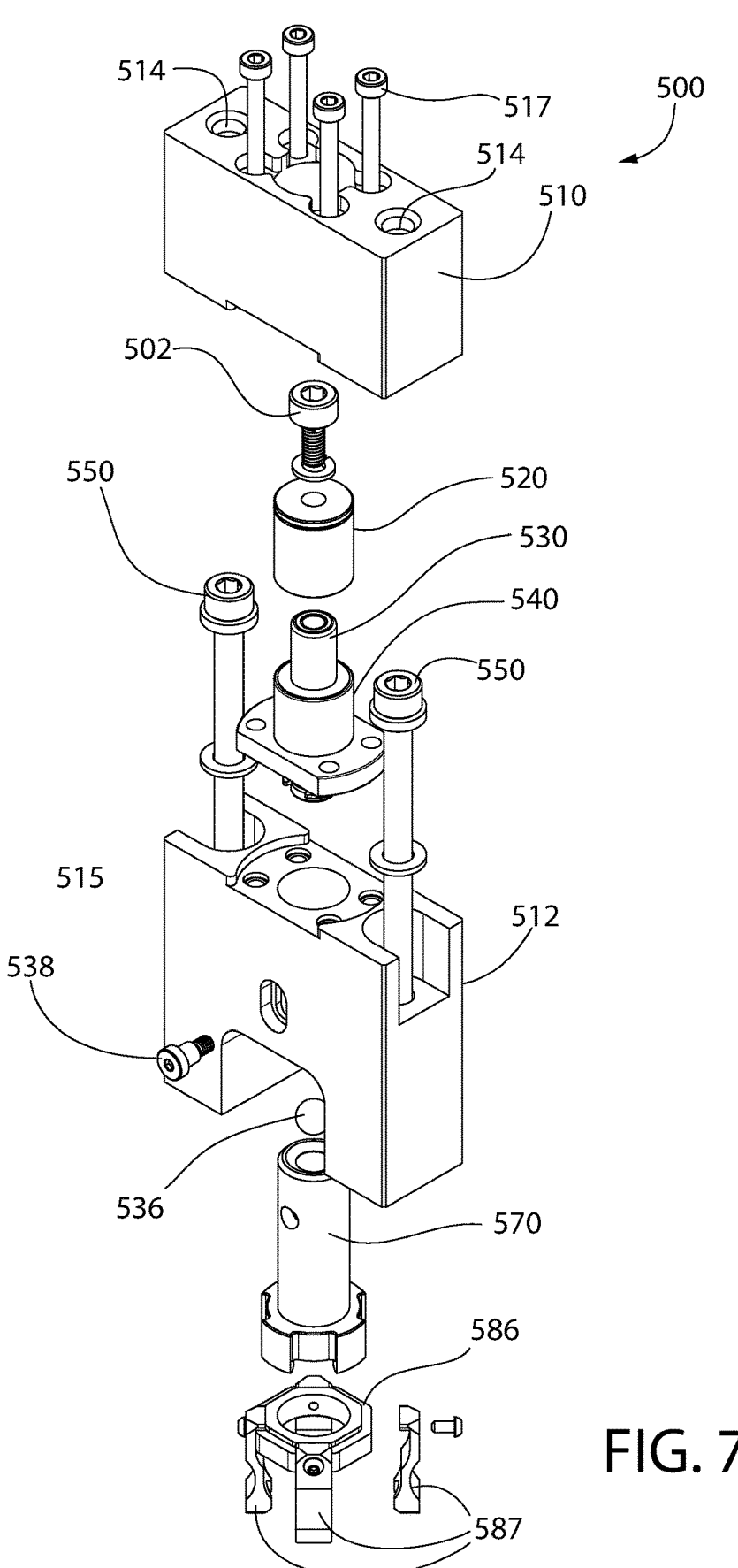
FIG. 7 is an exploded view of the seal insertion tool of FIG. 5.

Turning to FIG. 7, an exploded view of the seal insertion tool 500 is shown. The components described are shown. As can be best seen in this view, an additional set of fasteners 517 are used to attach the upper body 510 to the lower body 512. The threaded collar 540 is captured by the fasteners 517 because the threaded collar 540 is sandwiched between the upper body 510 and the lower body 512. The upper body 510 also has a plurality of passageways 514 which allow a tool to be inserted through the upper body 510 to reach the fasteners 550. The fasteners 550 are also captured by the features of the passageways 514 but are free to retract axially. This beneficially facilitates installation of the seal insertion tool 500 onto a substrate block 104.

Figure 8:
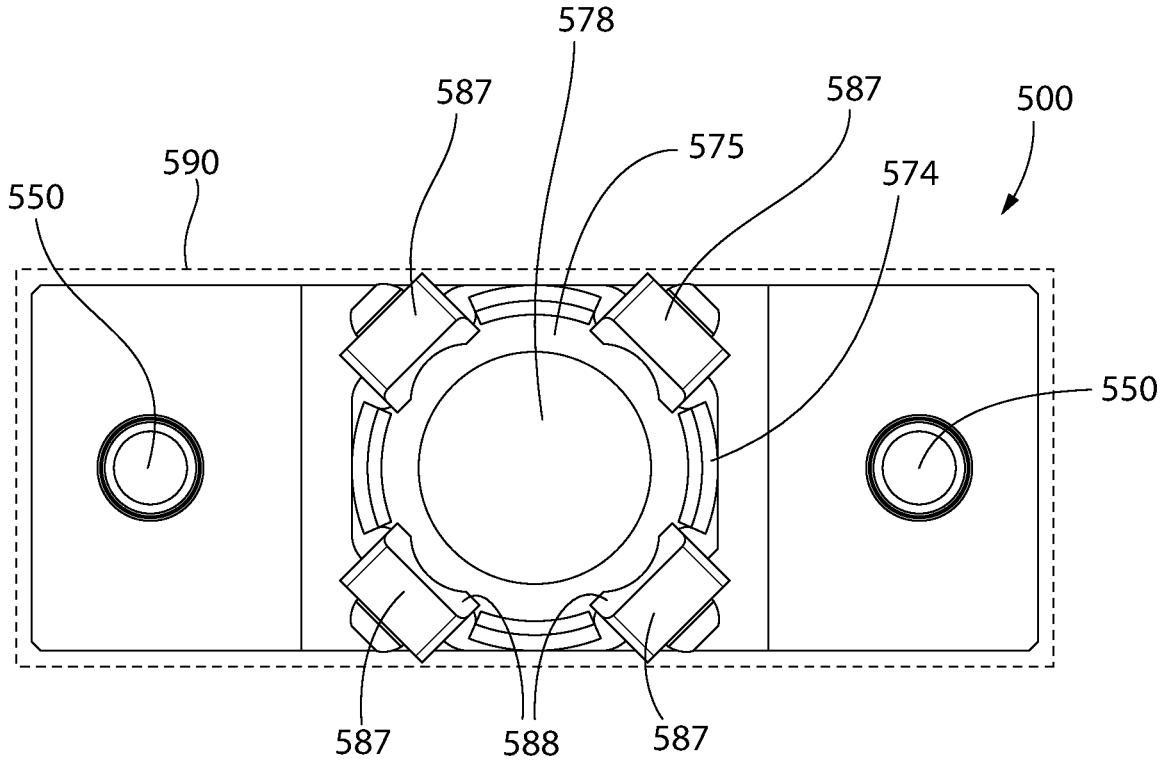
FIG. 8 is a bottom view of the seal insertion tool of FIG. 5.

Turning to FIG. 8, a bottom view of the seal insertion tool 500 is shown. The seal insertion tool 500 has a footprint 590 as shown by the dotted line. This is the area that it occupies on the substrate block 104 when the seal insertion tool 500 is installed on the substrate block 104. The footprint 590 is less than half of the footprint of the substrate block 104. Thus, the seal insertion tool 500 fits within either one of the first and second footprint halves 120, 122 and does not cross the central plane C-C. The footprint 590 is smaller than each of the first and second footprint halves 120, 122 to ensure that the seal insertion tool 500 does not interfere with the fluid flow components 200 in the fluid delivery module 1400.

Figure 9:
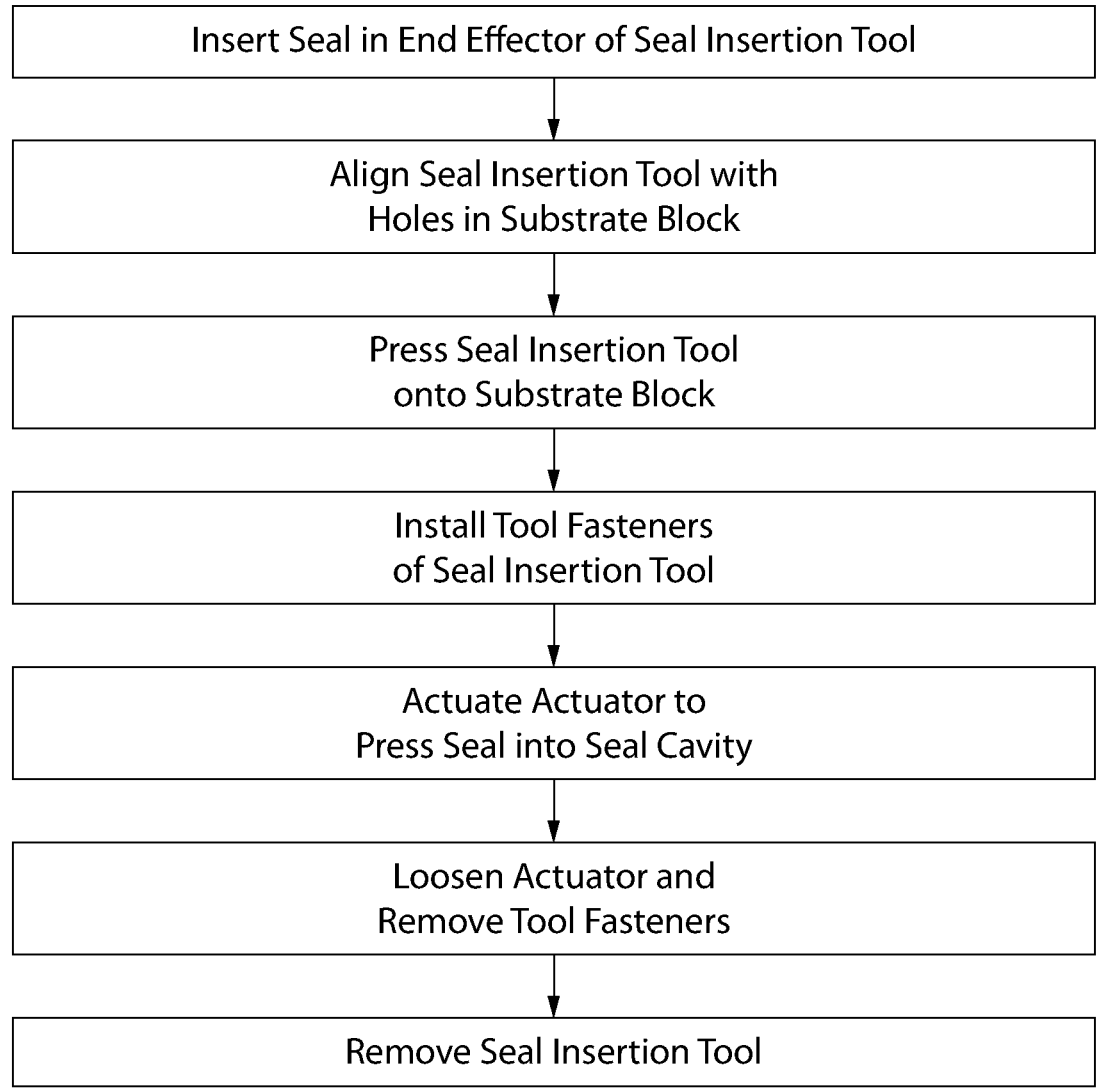
FIG. 9 is a flow chart showing a method of installing a seal.

Turning to FIG. 9, a method of using the seal insertion tool 500 is described in greater detail. First, the user inserts a seal 300 in the end effector 560. This is done by pushing the gripper 585 into a lowered position where the collar 586 rests against the plunger head 573 of the plunger 570. The seal 300 is then pressed into position in the end effector 560 so that the top surface 312 of the outer upstanding ring wall 308 is in contact with the work surface 575 of the plunger 570. The gripper 585 remains in the lowered position with the gripping fingers 587 engaging the outer upstanding ring wall 308 and holding the seal 300 firmly in place. Either before or after installing the seal, the actuator 502 is rotated so that the drive shaft 530 is fully retracted, and the indicator groove 522 is exposed above a top surface of the upper body 510. This ensures that there is sufficient clearance for the seal during the installation of the seal insertion tool 500 onto the substrate block 104.

Second, the seal insertion tool 500 is aligned with the substrate block 104 so that the fasteners 550 can be inserted through the fastener passageways 108. Third, the seal insertion tool 500 is pressed onto the substrate block 104. The gripping fingers 587 are the first part of the seal insertion tool 500 to contact the first surface of the substrate block 104. The tool fasteners 550 are within the fastener passageways 108 but are not secured to the underlying anchors.

Fourth, the tool fasteners 550 are installed into the anchors to secure the seal insertion tool 500 to the substrate block 104. The installation of the tool fasteners 550 causes the bottom of the seal insertion tool 500 to contact the first surface 114 of the substrate block 104. This also pushes the gripper 585 into a raised position where the collar 586 of the gripper 585 is spaced from the plunger head 573 of the plunger 570. When transitioning from the lowered position to the raised position, the gripping fingers 587 slide past the seal 300, with the inner surface 588 of the gripping fingers 587 engaging the cylindrical outer surface 304 of the seal 300. The gripping fingers 587 deflect outward, maintaining pressure on the seal 300 as the plunger 570 moves downward relative to the first surface 114 of the substrate block 104.

Fifth, the actuator 502 is actuated by rotation to lower the lower portion 318 of the annular seal 300 into the annular groove 116 of the fluid port 110. The actuator 502 transitions from its initial raised state where the actuator 502 and the end effector 560 are retracted to a lowered state where the actuator 502 and the end effector 560 are extended. As the end effector 560 is transitioned to the lowered state, the seal 300 is pressed into the annular groove 116 by engagement between the work surface 575 and the top surface 312 of the upstanding ring wall 306. In the process, the inner surface 588 of the gripping fingers 587 engage the plunger head 573 and engage further via cam action, allowing the seal to be released as the actuator 502 is actuated to insert the seal 300 into the annular groove 116. Sixth, the actuator 502 is loosened and the tool fasteners 550 are removed. Finally, the seal insertion tool 500 is removed from the substrate mounting block 104.

Figure 10A:
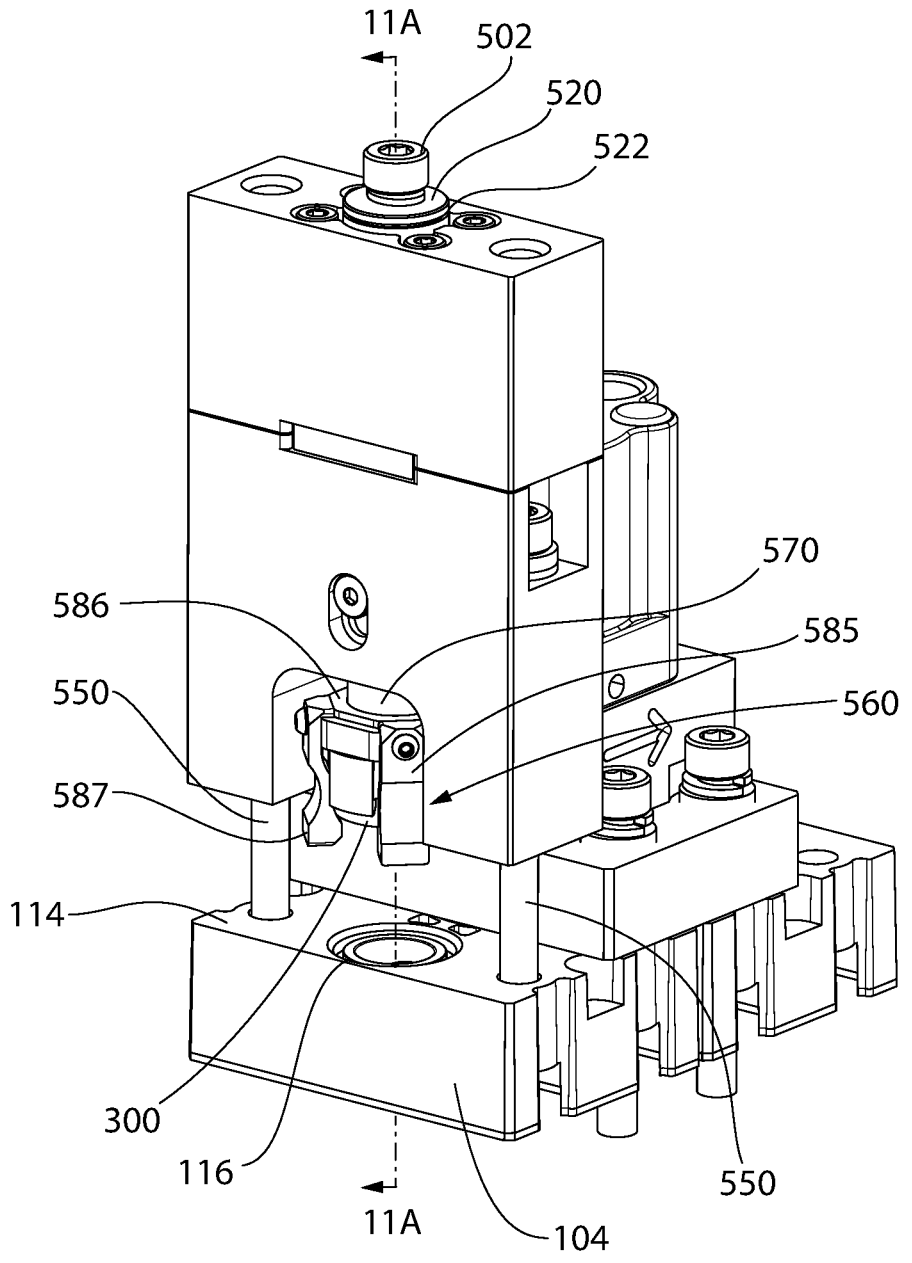
FIG. 10A is a perspective view of a seal insertion tool and seal positioned above a substrate block of a portion of the fluid delivery module.

FIGS. 10A-11D show the use of the seal insertion tool 500 in greater detail. In FIGS. 10A and 11A, seal insertion tool 500 is positioned above the substrate block 104 with a seal 300 inserted into the end effector 560. The tool fasteners 550 are inserted into the fastener passageways 108 of the substrate block in preparation for installation of the seal insertion tool. It is also important to note that the actuator 502 is retracted so that the seal is not pressed into the annular groove 116 prior to fastening of the tool fasteners 550. This is indicated to a user by the indicator groove 522 of the input stop block 520 being exposed as shown. As can be seen, the inner surface 588 of the gripping fingers 587 engage an edge of the upstanding ring wall 306 of the seal 300. The gripper 585 is in the lowered position with the collar 586 touching the plunger head 573.

Figure 10B:
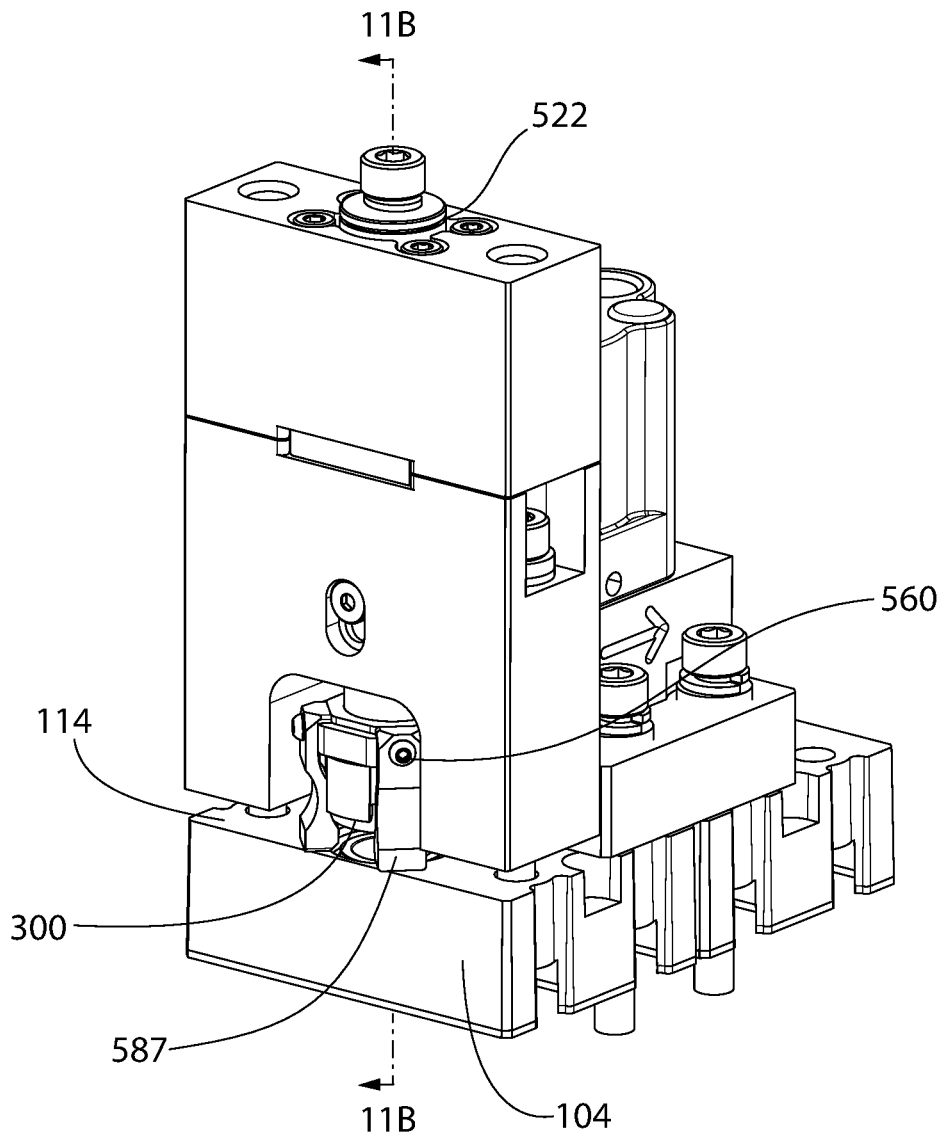
FIG. 10B is a perspective view of the end effector of the seal insertion tool positioned in contact with the substrate block of the portion of the fluid delivery module.
Figure 11A:
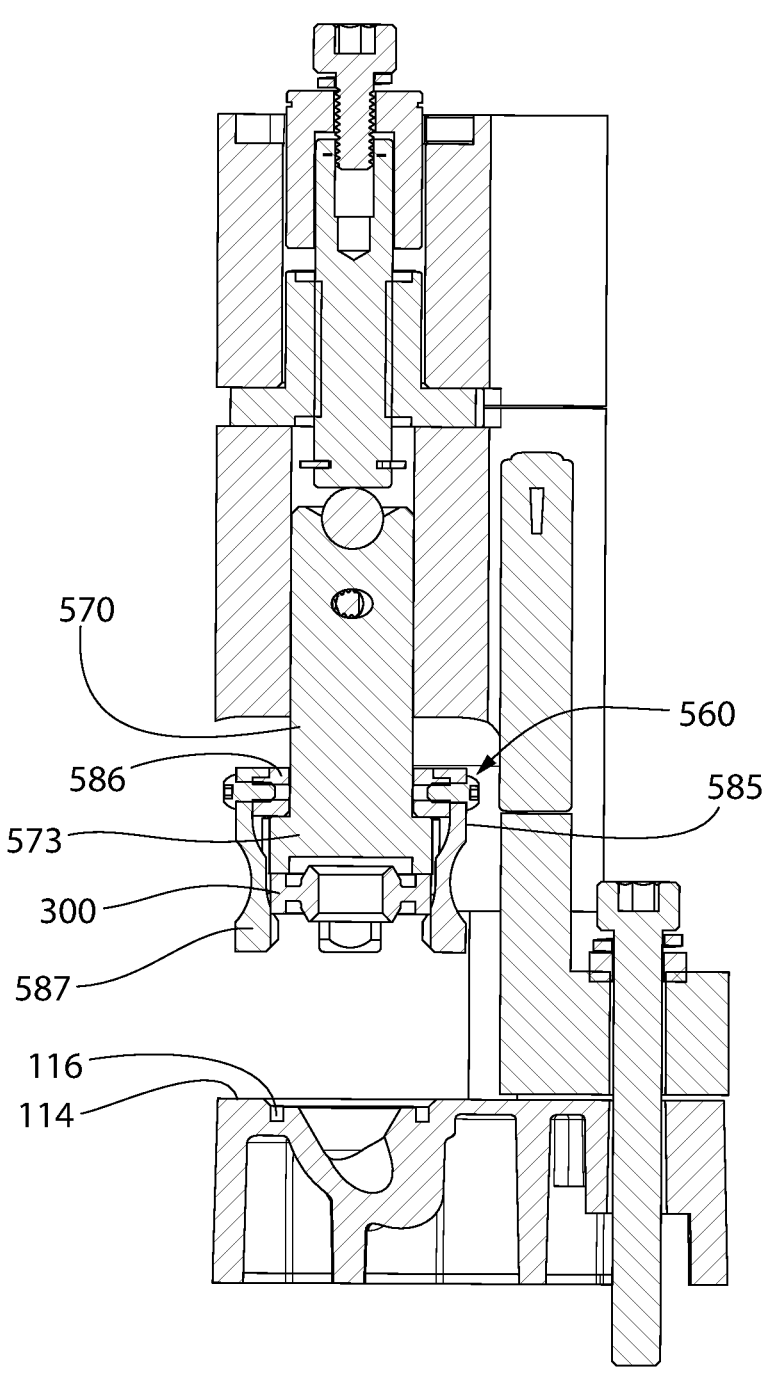
FIG. 11A is a cross-sectional view of the seal insertion tool, seal, and portion of the fluid delivery module of FIG. 10A, taken along line 11A-11A.
Figure 11B:
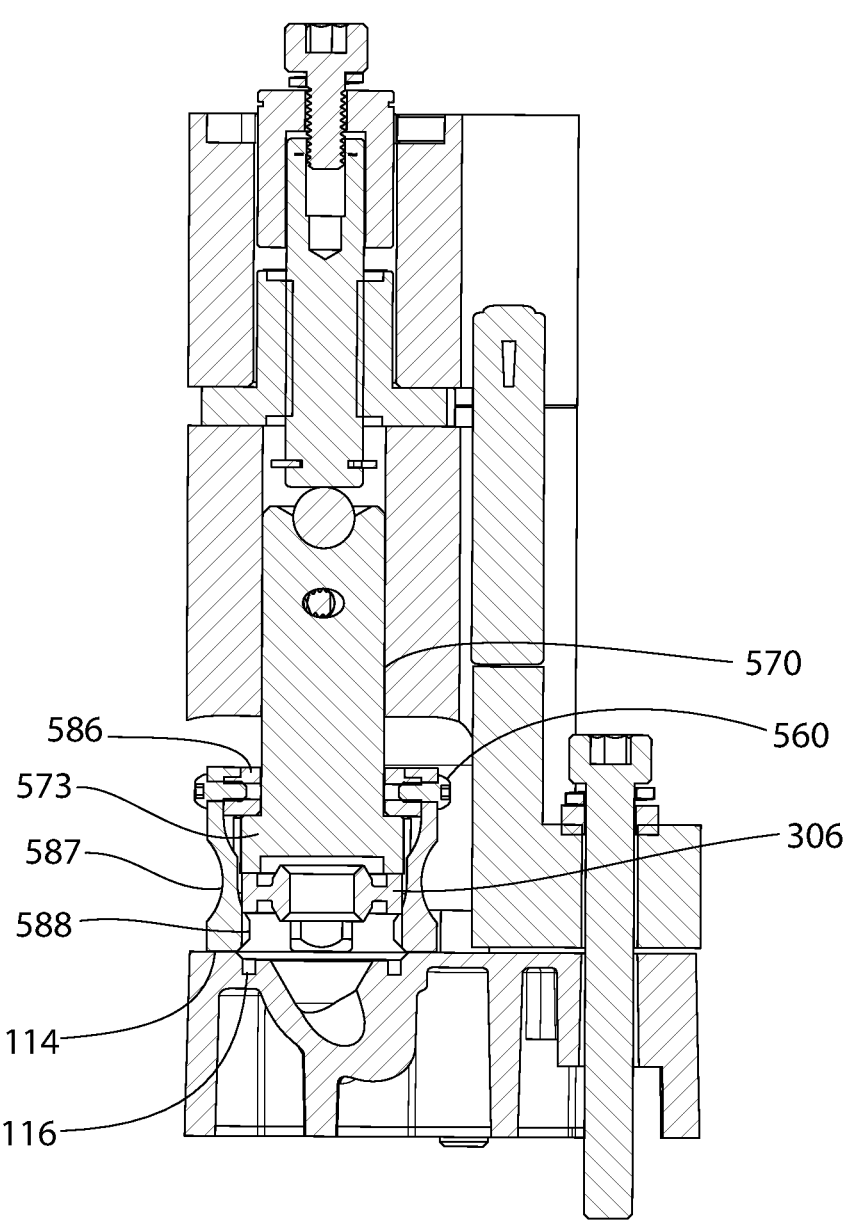
FIG. 11B is a cross-sectional view of the seal insertion tool, seal, and portion of the fluid delivery module of FIG. 10B, taken along line 11B-11B.

In FIGS. 10B and 11B, the seal insertion tool 500 is shown positioned atop the substrate block 104. The gripping fingers 587 are now in contact with the first surface 114 of the substrate block. The gripper 585 remains in the lowered position with the collar 586 touching the plunger head 573. The inner surface 588 of the gripping fingers 587 engage an edge of the upstanding ring wall 306 of the seal 300.

Figure 10C:
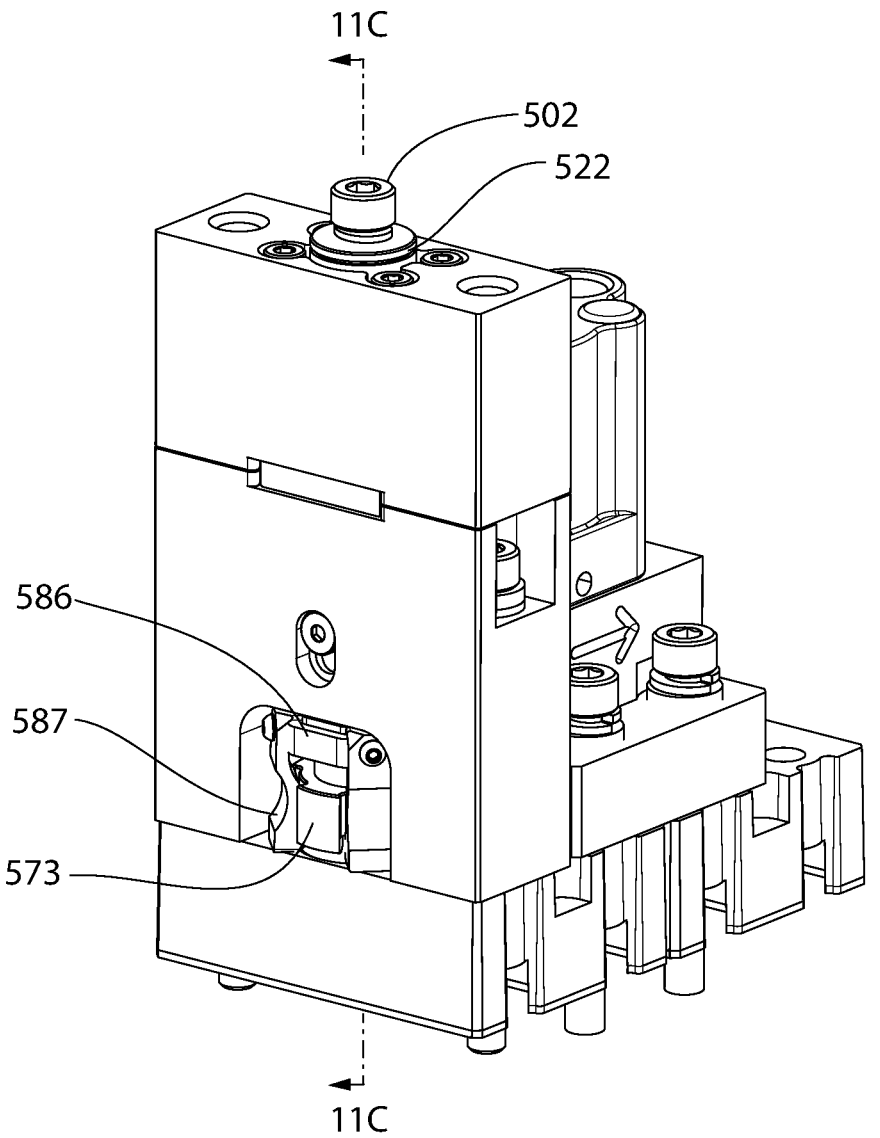
FIG. 10C is a perspective view of the seal insertion tool coupled to the substrate block of the portion of the fluid delivery module.
Figure 11C:
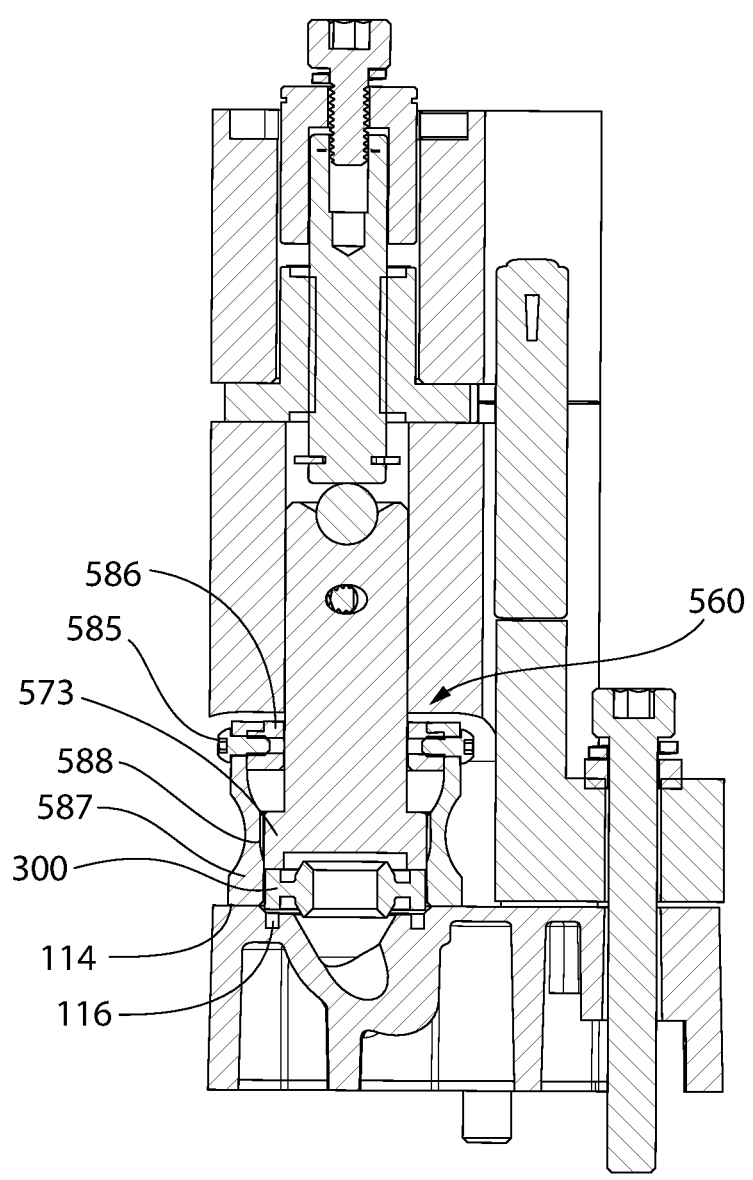
FIG. 11C is a cross-sectional view of the seal insertion tool, seal, and portion of the fluid delivery module of FIG. 10C, taken along line 11C-11C.

In FIGS. 10C and 11C, the seal insertion tool 500 is shown mounted to the first surface 114 of the substrate block 104. The tool fasteners 550 have been installed, securing the insertion tool 500 to the substrate block 104. The gripping fingers 587 remain in contact with the first surface 114 of the substrate block. The gripper 585 is now in a partially raised position because the tool fasteners 550 have pulled the seal insertion tool 500 against the first surface 114 of the substrate block 104. The collar 586 is no longer touching the plunger head 573. The collar 586 has moved up plunger shaft 572 because the gripper 585 has remained stationary as the seal insertion tool 500 has been mounted to the substrate block 104, causing the plunger 570 to translate downward toward the substrate block 104. The inner surface 588 of the gripping fingers 587 now engage the cylindrical outer surface 304 of the seal 300.

Figure 10D:
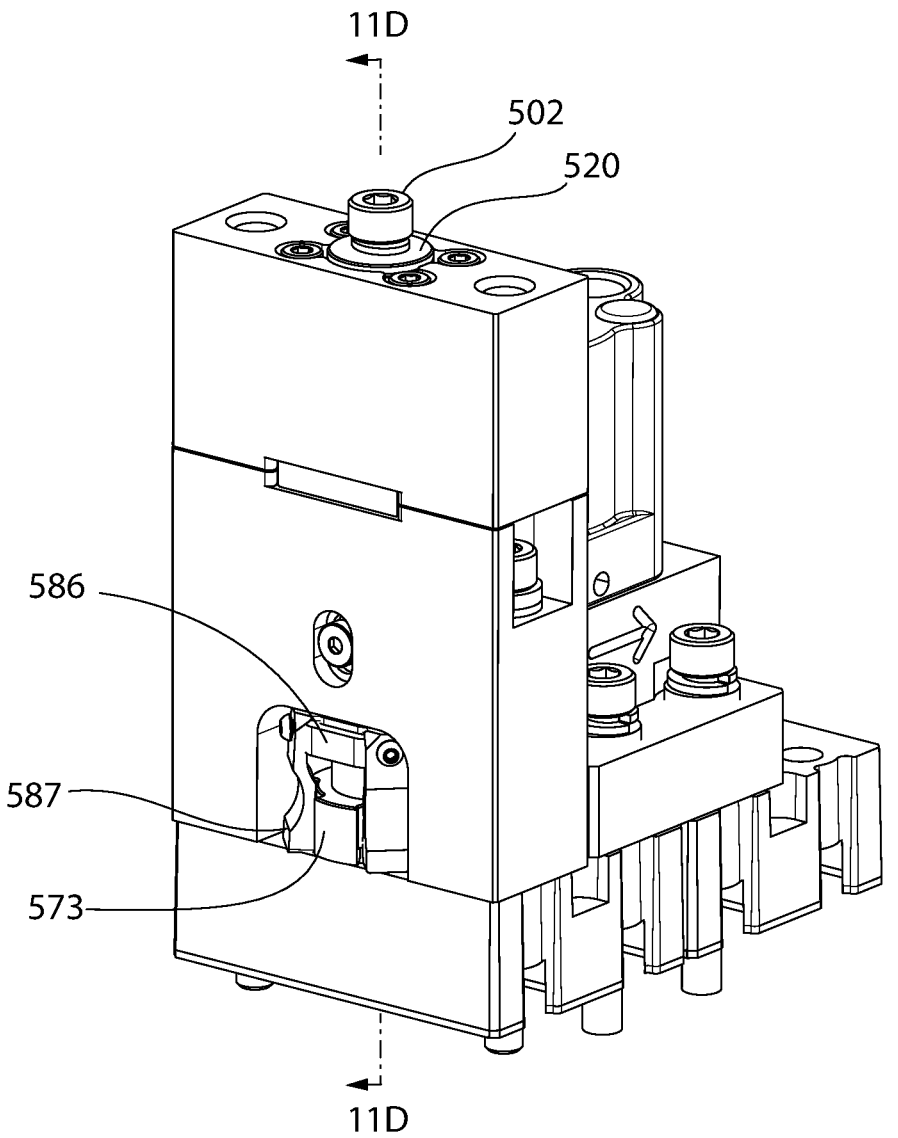
FIG. 10D is a perspective view of the seal pressed into the seal cavity of the substrate block of the portion of the fluid delivery module.
Figure 10E:
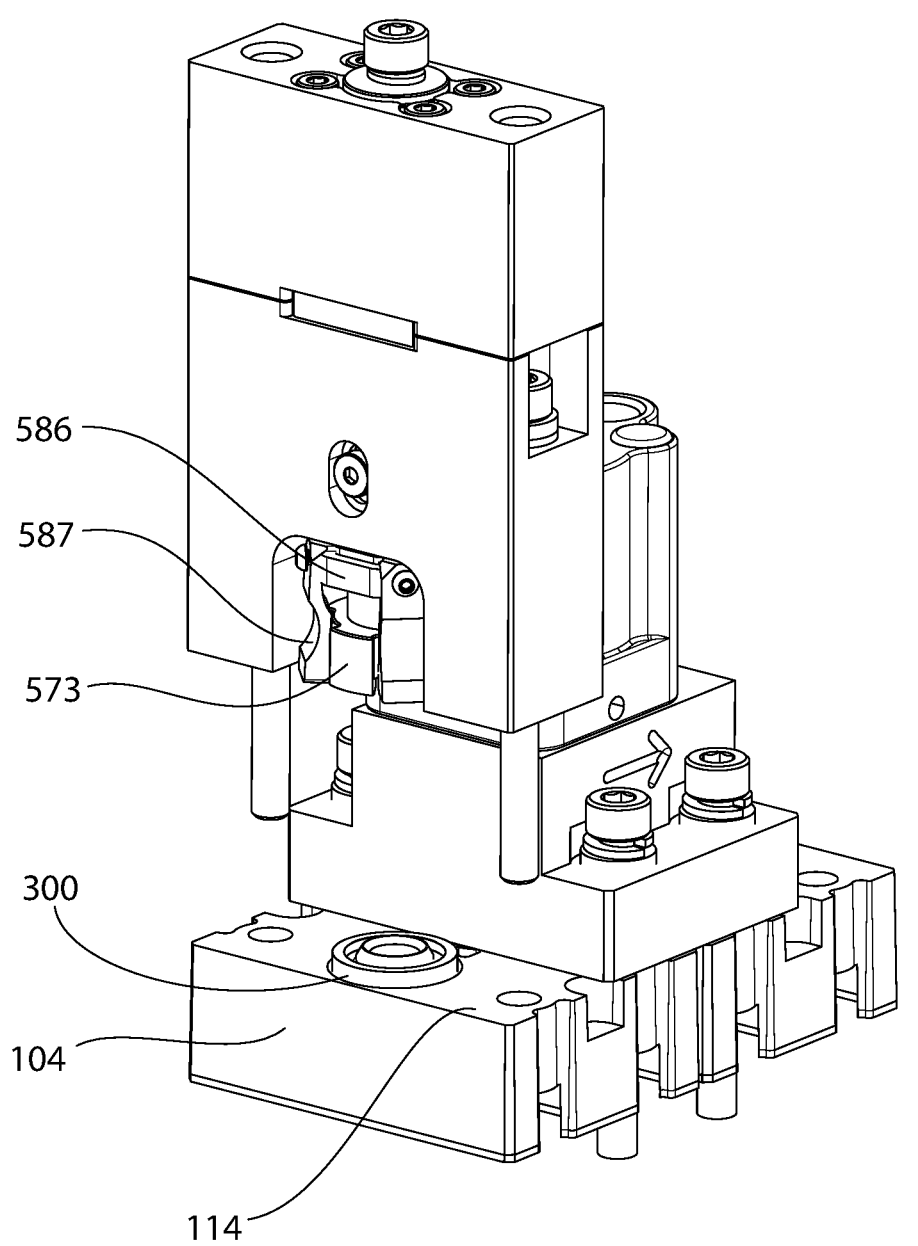
FIG. 10E is a perspective view of the seal insertion tool removed from the substrate block of the portion of the fluid delivery module.
Figure 11D:
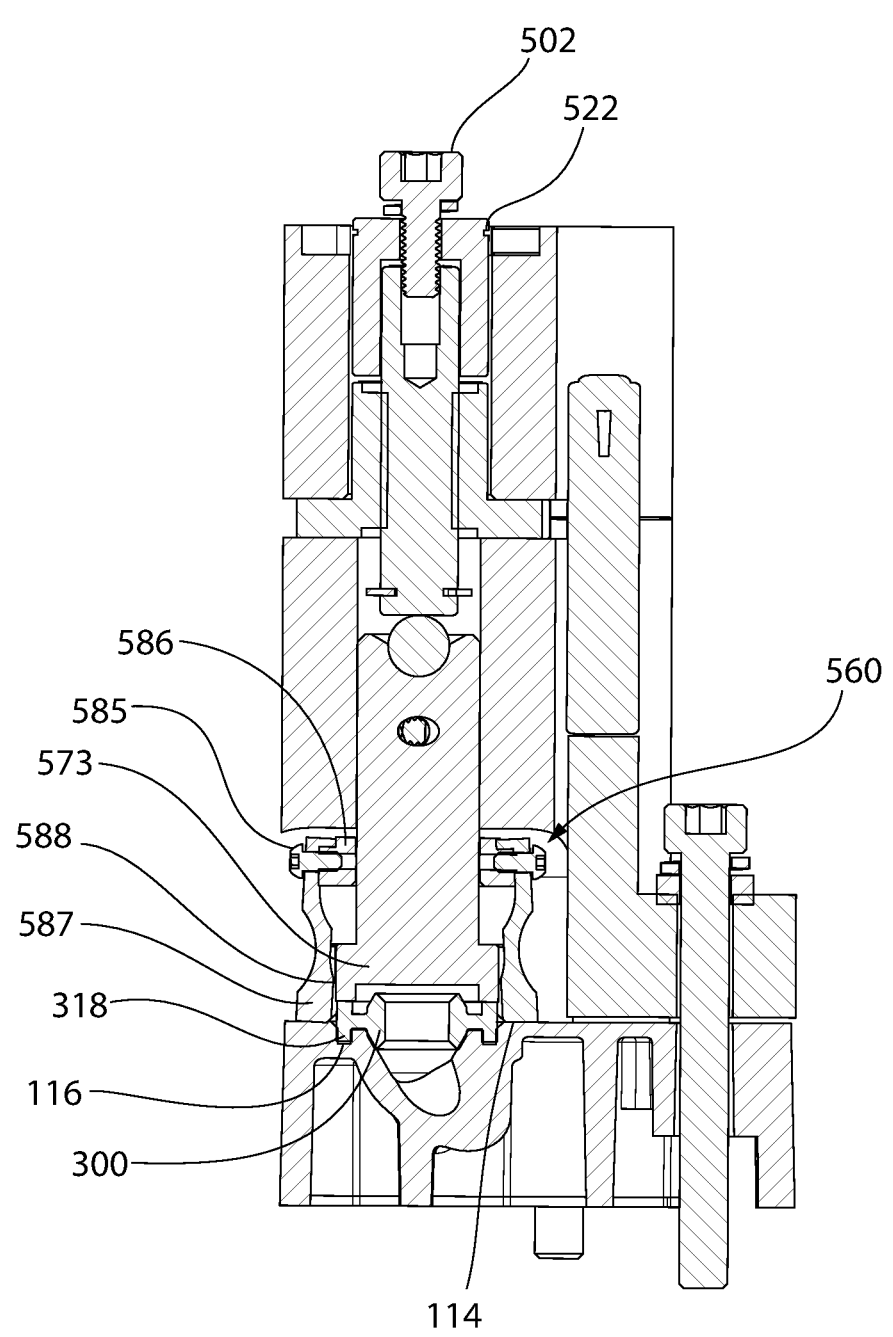
FIG. 11D is a cross-sectional view of the seal insertion tool, seal, and portion of the fluid delivery module of FIG. 10D, taken along line 11D-11D.

In FIGS. 10D and 11D, the actuator 502 of the seal insertion tool 500 is fully actuated to press the seal 300 into position in the substrate block 104. Specifically, the end effector 560 is translated to the lowered state from a raised state. In the lowered state, the indicator groove 522 of the input stop block 520 is no longer visible. The lower portion 318 of the seal 300 is pressed into the annular groove 116 and the gripper 585 has now fully transitioned to the raised state. In the raised state the gripping fingers 587 no longer engage the seal 300. Instead, the inner surface 588 of the gripping fingers 587 engage the plunger head 573 as shown. This avoids the seal 300 being retracted with the plunger 570 and ensures that the seal 300 remains in place. FIG. 10E shows the seal retainer 500 after the actuator 502 has been retracted and the tool fasteners 500 have been removed from their respective anchors. The seal 300 remains in the substrate block 104, ready for installation.

Prior to installation of a seal 300 with the seal insertion tool 500, it is important to remove any expired seals 300 and carefully clean the annular groove 116 and the first surface 114. As is apparent, this is done after removal of the fluid flow component 200 which is in need of servicing. For instance, a typical service procedure would be to remove a fluid flow component 200, remove the expired seal 300, clean the substrate block 104 thoroughly to prepare for installation of a new seal 300, install the seal 300 as discussed above, and then reinstall the fluid flow component 200.

Figure 12A:
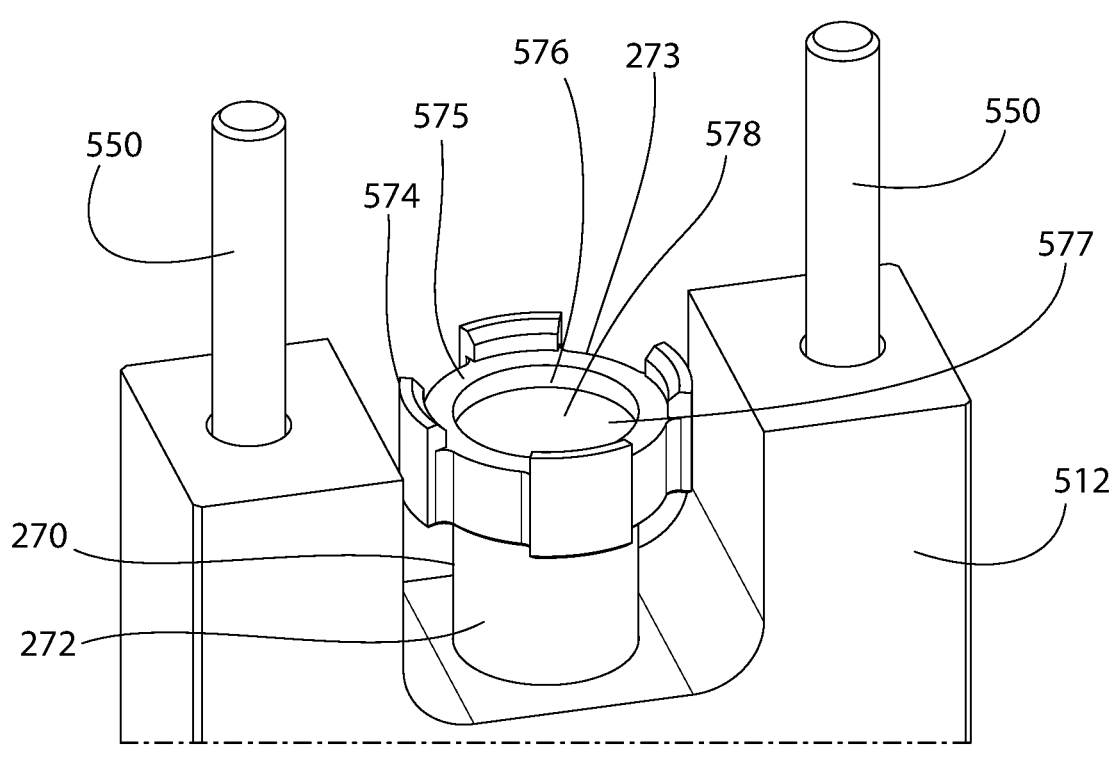
FIG. 12A is a perspective view of a portion of the seal insertion tool of FIG. 5 showing the end effector with the grippers removed.
Figure 12B:
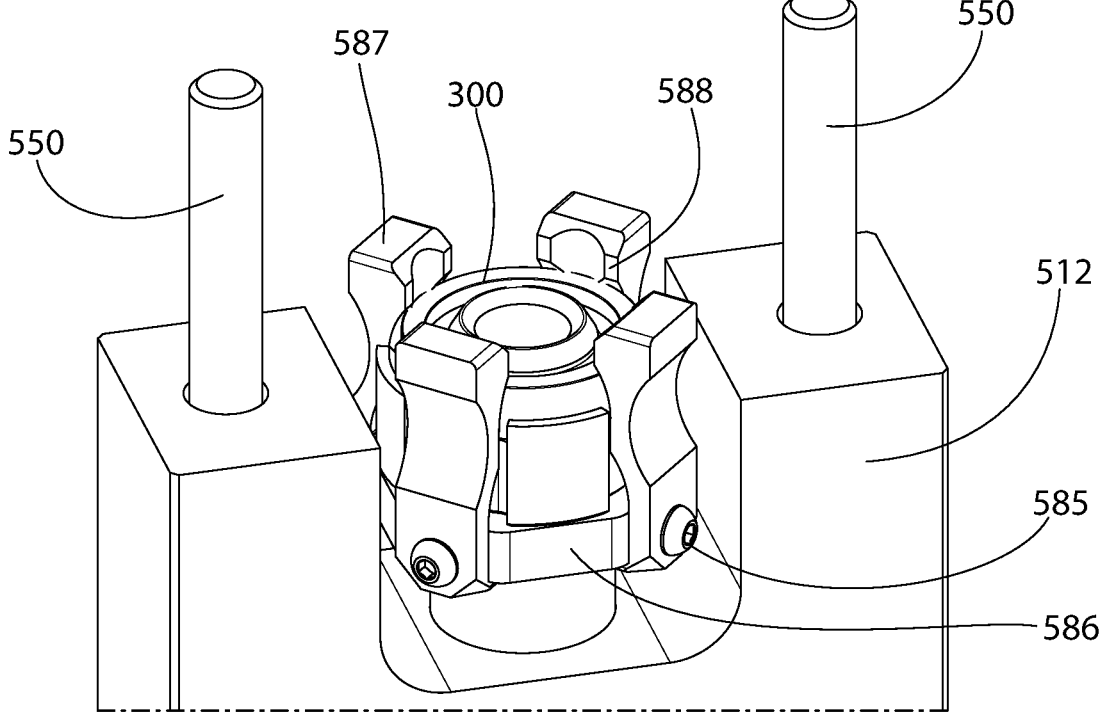
FIG. 12B is a perspective view of the portion of the seal insertion tool of FIG. 12A showing the end effector with the grippers present.

FIGS. 12A and 12B show views of a portion of the seal insertion tool 500 in greater detail. As can be seen, FIG. 12A shows the plunger 570 without the gripper 585. 12B shows the gripper 585 in place, along with a seal 300.

Figure 13A:
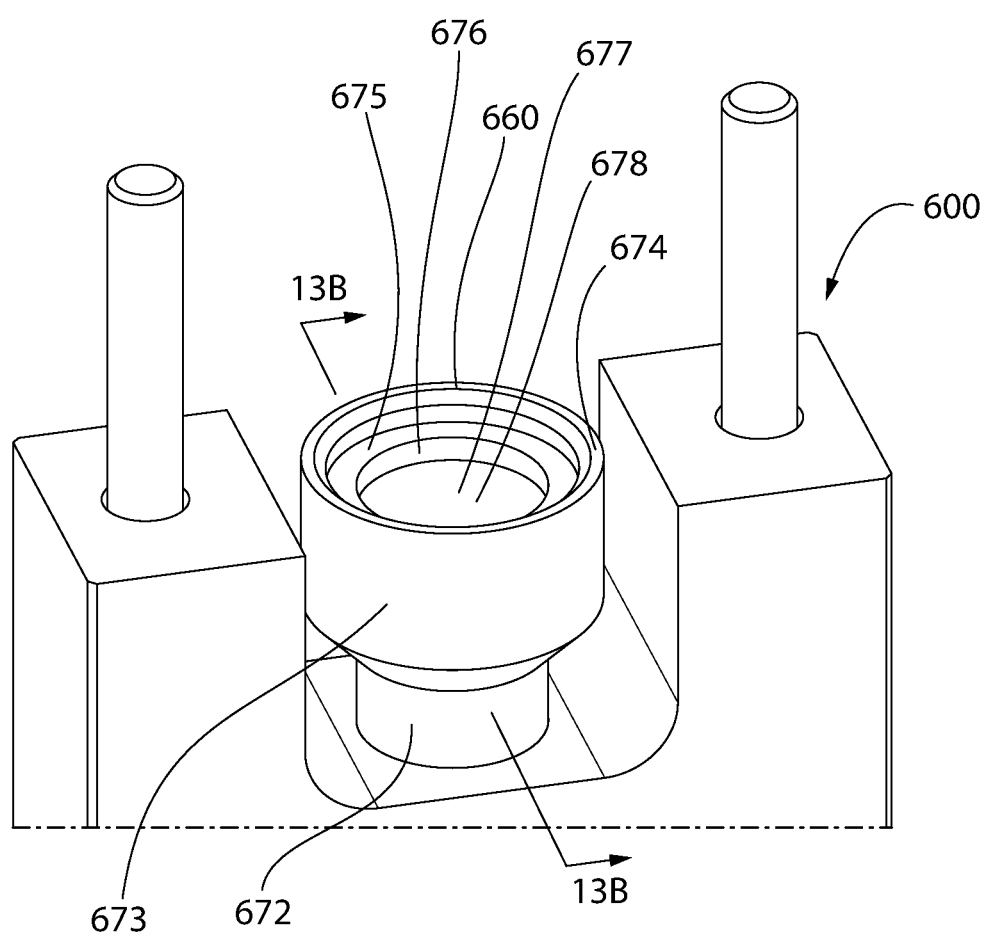
FIG. 13A is a perspective view of a portion of an alternate embodiment of the seal insertion tool showing an alternate end effector.
Figure 13B:
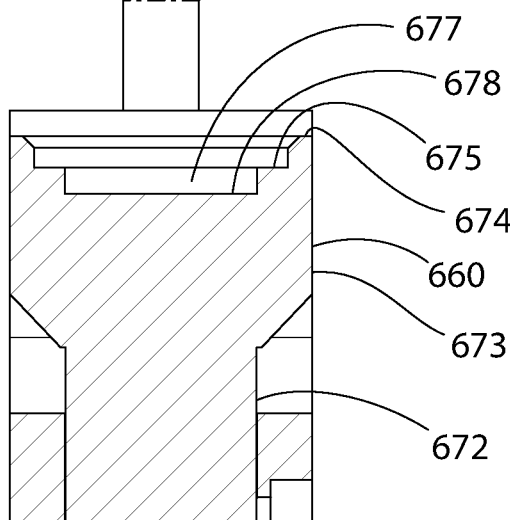
FIG. 13B is a cross-sectional view of the portion of the seal insertion tool of FIG. 13A, taken along line 13B-13B.

FIGS. 13A and 13B show an alternate embodiment of the seal insertion tool 600. The seal insertion tool 600 has an end effector 660 having a plunger head 673 and a plunger shaft 672. However, the seal insertion tool 600 omits the gripper of the seal insertion tool 500. The end effector 660 of the seal insertion tool 600 has an end face 674 that forms a lowermost surface of the plunger head 673. The end effector 660 also has a work surface 675 to engage the outer upstanding ring wall 306, a depression 677, a floor 678, and an annular wall 676. The depression 677, floor 678, and annular wall 676 serve to avoid contact between the end effector 660 and the inner upstanding ring wall 308. The top surface 314 of the inner upstanding ring wall 308 is spaced from the floor 678, preventing undesired deformation of the seal 300.

The seal insertion tool 600 functions substantially identically to the seal insertion tool 500, but does not grip the seal 300 during installation. Instead, the user places the seal 300 on the substrate block 104 and then installs the seal insertion tool 600. The actuator 502 is then actuated to seat the seal 300.

Turning to FIGS. 14A-D, an embodiment of a torque limiting device for a seal insertion tool is shown. The present embodiment combines one of the seal insertion tools 500, 600 previously disclosed with a torque module 1000 to preclude the need for a separate torque driver. In FIGS. 14A-D, the seal insertion tool 600 is shown, but either embodiment could be utilized with the torque module 1000. The torque module 1000 can be engaged with the top of the seal insertion tool 500 and act as an add-on component. As shown, the torque module 1000 has a handle 1002 for operation by a user and thumb screws 1003 and shafts 1005 to engage the tool fasteners 550.

Figures 14A, 14B:
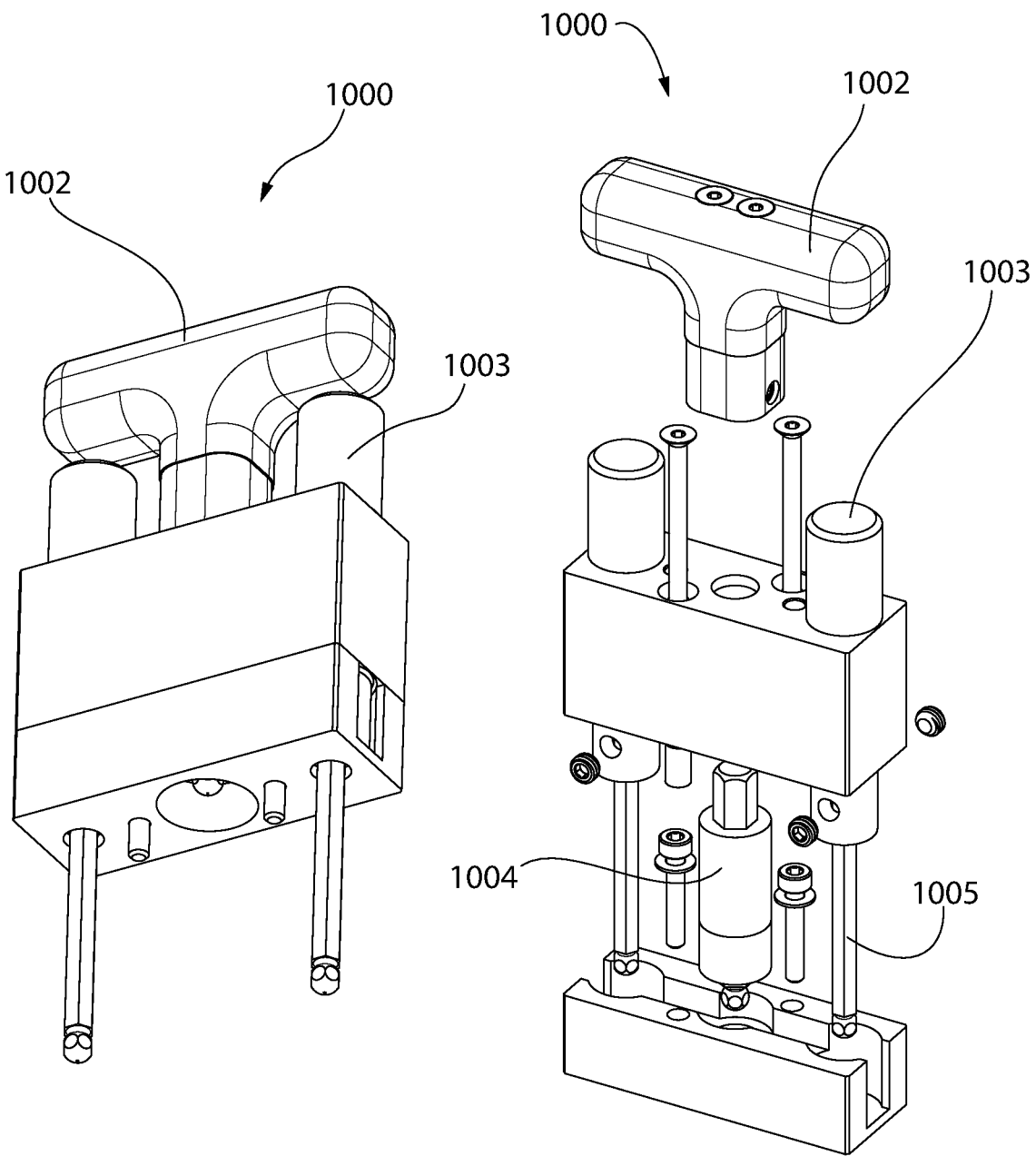
FIG. 14A is a perspective view of a torque limiting attachment for a seal insertion tool.
FIG. 14B is an exploded view of the torque limiting attachment of FIG. 14A.
Figures 14C, 14D:
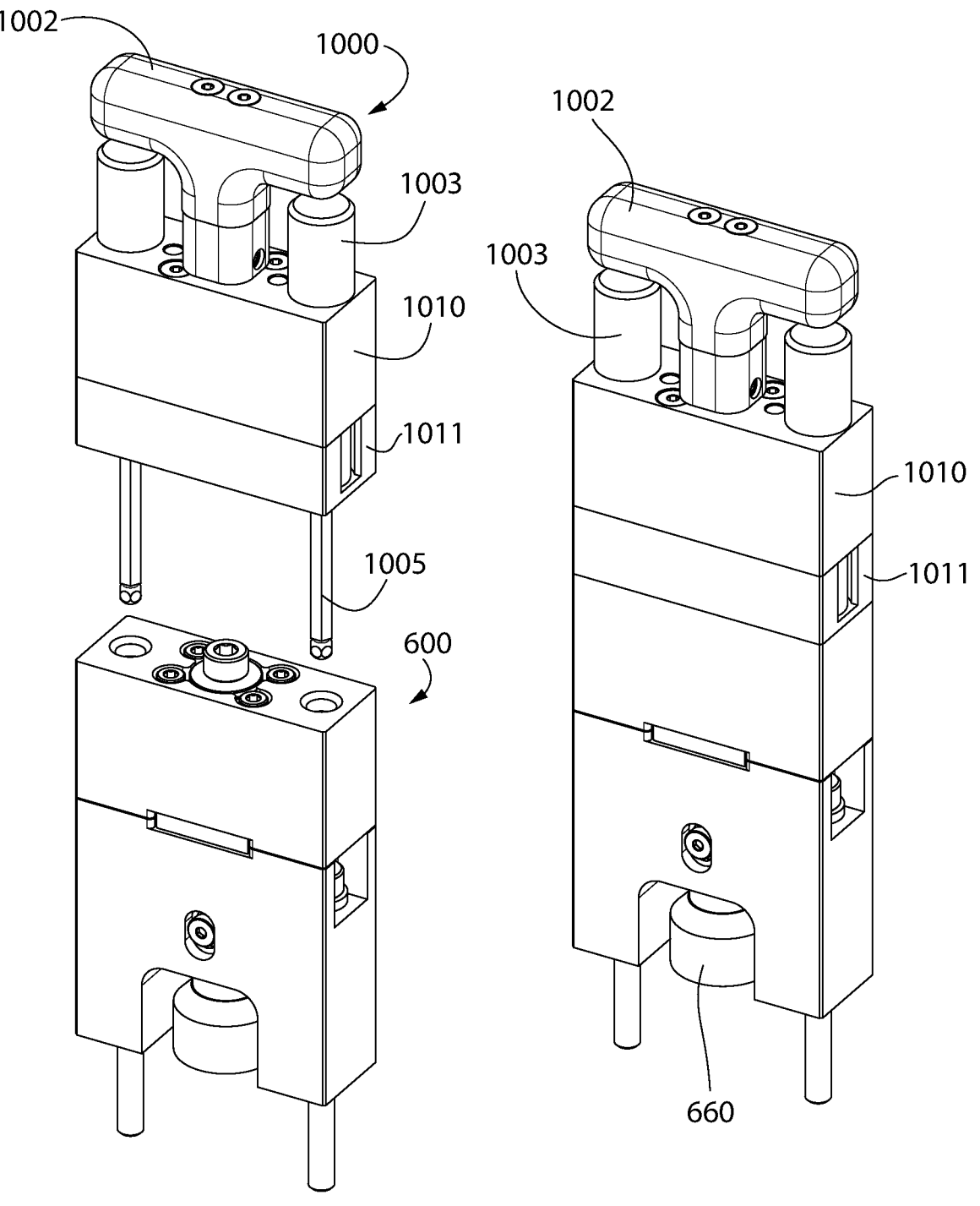
FIG. 14C is a perspective view of the torque limiting attachment positioned above the seal insertion tool of FIG. 13A.
FIG. 14D is a perspective view of the torque limiting attachment assembled with the seal insertion tool of FIG. 13A.

As shown in FIGS. 14C and 14D, the torque module 1000 installs directly onto the seal insertion tool 600. The torque module 1000 has a torque limiter 1004 housed within an upper body 1010 and a lower body 1011. The torque limiter 1004 may be a friction clutch based device or any other known torque limiting device. The torque module 1000 may be attached by bolts, magnets, adhesives, a snap-interface, or any other known method.

Section II

Figure 15:
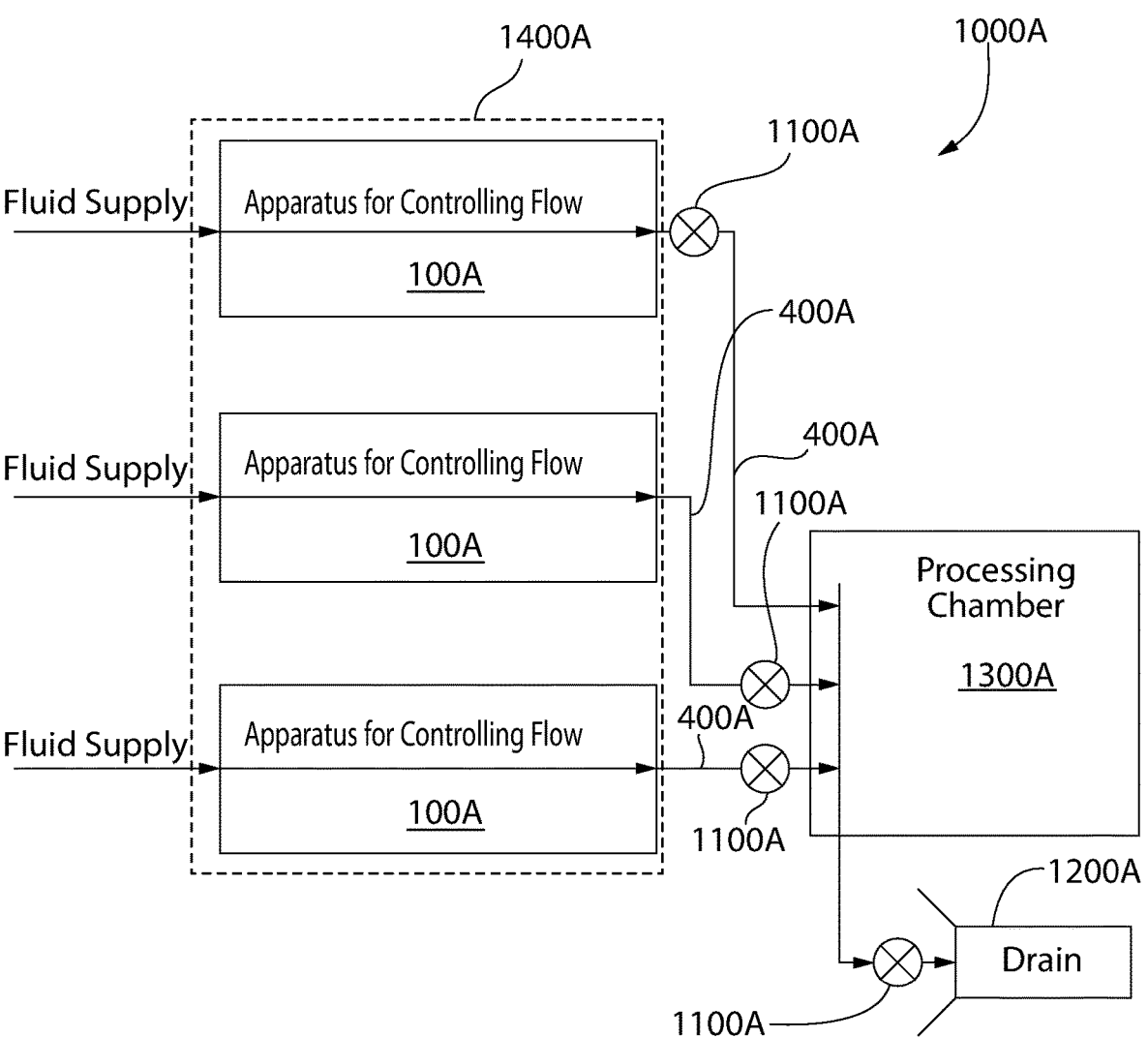
FIG. 15 is a schematic of another system for manufacturing semiconductor devices utilizing one or more apparatuses for controlling flow.

FIG. 15 shows a schematic of an exemplary processing system 1000A. The processing system 1000A may utilize a plurality of apparatus for controlling flow 100A fluidly coupled to a processing chamber 1300A. The plurality of apparatus for controlling flow 100A are used to supply one or more different process fluids to the processing chamber 1300A. Fluids are provided by a plurality of fluid supplies, or fluid sources. Collectively, the plurality of apparatus for controlling flow 100A belong to a fluid delivery module 1400A. Optionally, more than one fluid delivery module 1400A may be utilized in the processing system 100A. The plurality of apparatus for controlling flow 100A are connected to the processing chamber 1300A by an outlet manifold 400A. Articles such as semiconductors and integrated circuits may be processed within the processing chamber 1300A.

Valves 1100A isolate each of the apparatus for controlling flow 100A from the processing chamber 1300A, enabling each of the apparatus for controlling flow 100A to be selectively connected or isolated from the processing chamber 1300A, facilitating a wide variety of different processing steps. The processing chamber 1300A may contain an applicator to apply process fluids delivered by the plurality of apparatus for controlling flow 100A, enabling selective or diffuse distribution of the fluids supplied by the plurality of apparatus for controlling flow 100A. Optionally, the processing chamber 1300A may be a vacuum chamber or may be a tank or bath for immersing articles in the fluids supplied by the plurality of apparatus for controlling flow 100A. A fluid supply line is formed by the flow path from each of the respective fluid supplies to the processing chamber 1300A.

In addition, the processing system 1000A may further comprise a drain 1200A which is isolated from the processing chamber 1300A by a valve 1100A to enable evacuation of process fluids or facilitate purging one or more of the apparatus for controlling flow 100A to enable switching between process fluids in the same apparatus for controlling flow 100A. Optionally, the drain 1200A may be a source of vacuum or may be a liquid drain configured to remove liquids from the processing chamber 1300A. Optionally, the apparatus for controlling flow 100A may be mass flow controllers, flow splitters, or any other device which controls the flow of a process fluid in a processing system. Furthermore, the valves 1100A may be integrated into the apparatus for controlling flow 100A if so desired.

Processes that may be performed in the processing system 1000A may include wet cleaning, photolithography, ion implantation, dry etching, atomic layer etching, wet etching, plasma ashing, rapid thermal annealing, furnace annealing, thermal oxidation, chemical vapor deposition, atomic layer deposition, physical vapor deposition, molecular beam epitaxy, laser lift-off, electrochemical deposition, chemical-mechanical polishing, wafer testing, electroplating, or any other process utilizing fluids.

Figure 16:
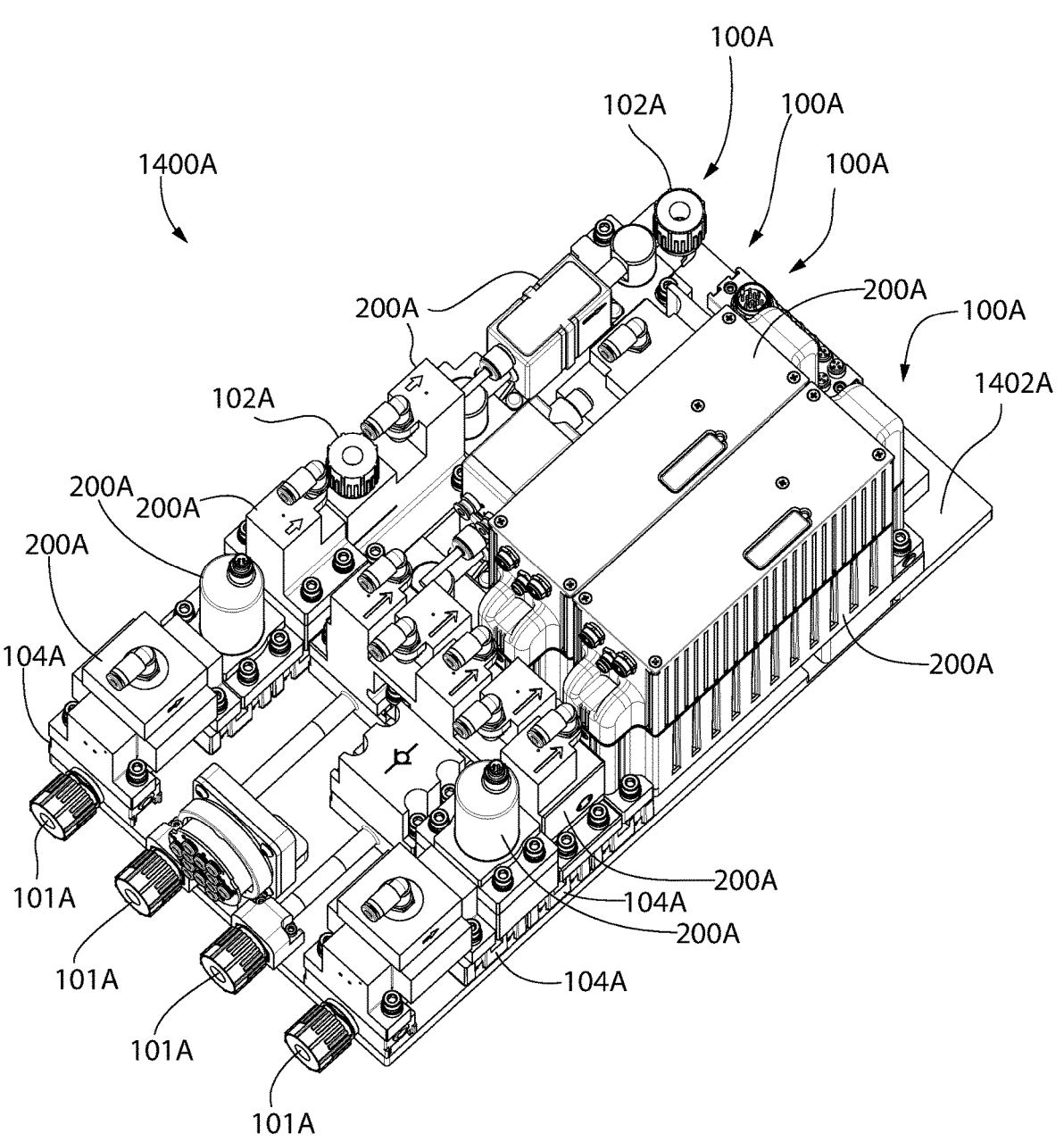
FIG. 16 is a perspective view of a fluid delivery module comprising a plurality apparatuses for controlling flow as may be utilized in the process of FIG. 15.
Figure 17:
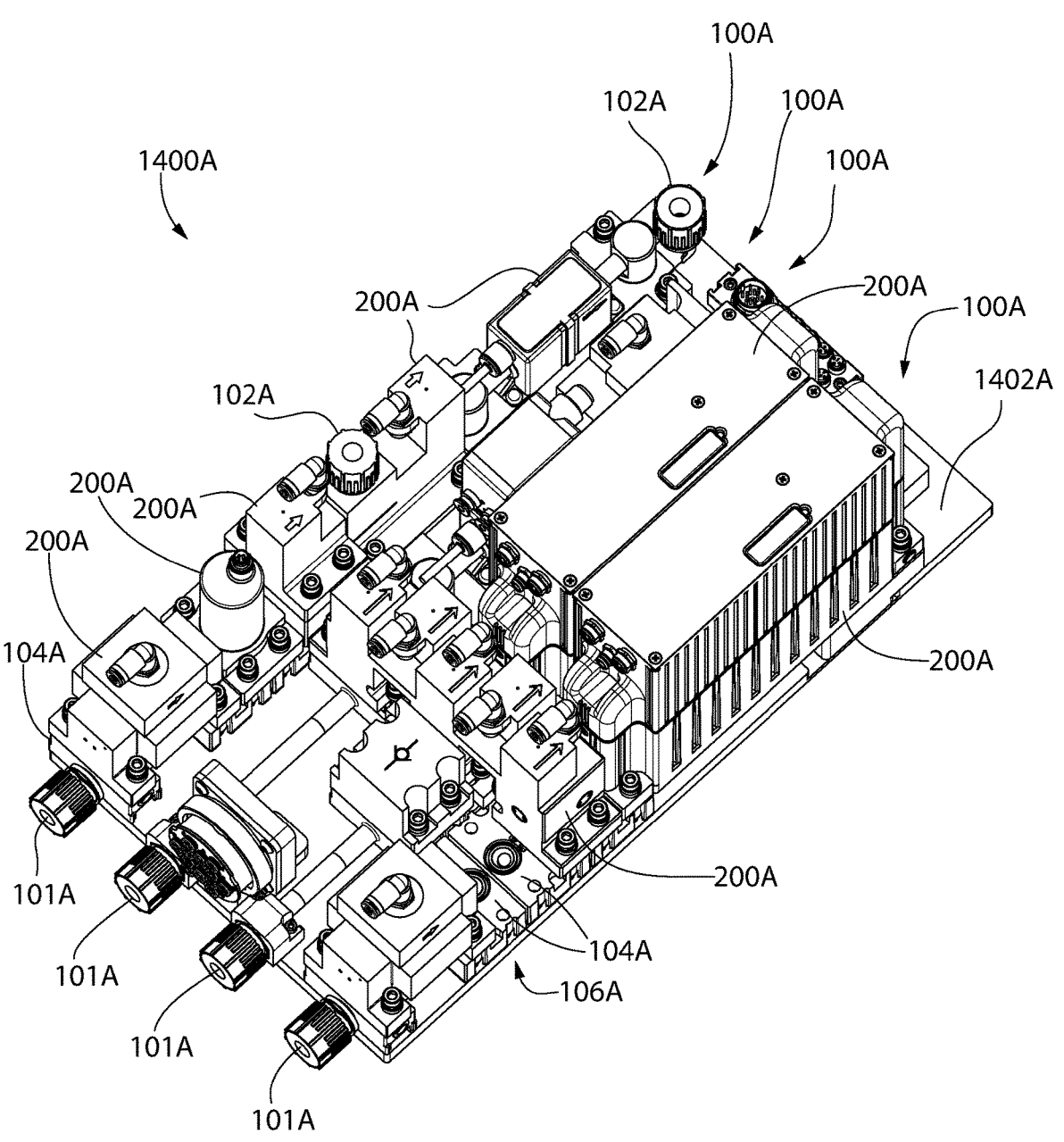
FIG. 17 is a perspective view of the module of FIG. 16 showing one fluid flow component removed.

FIGS. 16 and 17 show a schematic of an exemplary fluid delivery module 1400A. In this embodiment, the fluid delivery module 1400A has a plurality of apparatus for controlling flow 100A having a plurality of inlets 101A and a plurality of outlets 102A. In some embodiments, the plurality of inlets 101A do not correspond to the plurality of outlets 102A in a one to one manner. Instead, a plurality of inlets 101A may be joined into a single outlet 102A and a single inlet 101A may be split into a plurality of outlets 102A. This may be done to achieve mixing or combination of different fluids prior to providing them to the process chamber 1300A.

As can be seen, each of the apparatus for controlling flow 100A is arranged generally in a row, with the plurality of apparatus 100A in parallel rows. This need not be the case, and any packaging configuration may be used. The fluid delivery module 1400A has a substrate panel 1402A. The substrate panel 1402A serves as structural support for the fluid delivery module 1400A, but it may be simply used to facilitate assembly. Other structural support configurations are contemplated. A plurality of substrate blocks 104A rest on the substrate panel 1402A and comprise fluid ports therein to conduct flow to one or more fluid flow components 200A having corresponding fluid ports as discussed in greater detail below. The fluid flow components 200A may be considered active components while the substrate blocks 104A may be considered passive components. The fluid flow components 200A may be one or more of a valve, a flow controller, a pressure transducer, a flow measurement sensor, a pressure regulator, a flow restrictor, or an actuator, or any other known flow control component.

As can be seen by comparing FIG. 16 with FIG. 17, a fluid flow component 200A is removed from the fluid delivery module 1400A of FIG. 17. The removal of the fluid flow component 200A exposes portions of two substrate blocks 104A. A component mounting location 106A is formed by the portions of the two substrate blocks 104A. The component mounting location 106A may vary in size depending on the dimensions of the component 200A mounted to the component mounting location 106A. Thus, different component mounting locations 106A may comprise different portions of the same substrate block 104A. Each and every component 200A has a component mounting location 106A in the fluid delivery module 1400A.

Turning to FIGS. 418A-D, a portion of the fluid delivery module 1400A is shown. Specifically, a fluid flow component 200A is shown mounted to a pair of substrate blocks 104A which form a component mounting location 106A. The component 200A is mounted to the substrate blocks 104A via alignment features 250A. The alignment features 250A may also be referred to as fasteners and may be utilized as both alignment features and fasteners. The alignment features 250A may be fasteners such as bolts, screws, pins, or other known fastening device. However, in other embodiments, the alignment features 250A may be separate from the fasteners. For instance, dowel pins or other pins may be used to align the fluid flow component 200A to the substrate blocks 104A. Then, a separate fastener may be used for fastening the fluid flow component 200A to the substrate blocks 104A. As can be seen in FIGS. 4A-D, the alignment features 250A extend through the substrate blocks 104A.

Although not shown in FIGS. 18A-D, the substrate panel 1402A is threaded or has threaded inserts which receive the alignment features 250A. Thus, the alignment features 250A extend through fastener passageways 208A in the fluid flow component 200A, fastener passageways 108A in the substrate blocks 104A, and install into threaded holes or other features in the substrate panel 1402A. The alignment features 250A are intended for rough alignment, but precision alignment is provided by other geometry. Thus, the fastener passageways 108A, 208A need not be a precision fit on the alignment features 250A. In alternate embodiments, the alignment features 250A may install directly to the substrate blocks 104A via threaded holes or inserts within the fastener passageways 108A. In these embodiments, the substrate blocks 104A may be separately attached to the substrate panel 1402A via additional fasteners. In other embodiments, the alignment features 250A may install into supports or other components which are beneath the substrate panel 1402A.

Figure 18A:
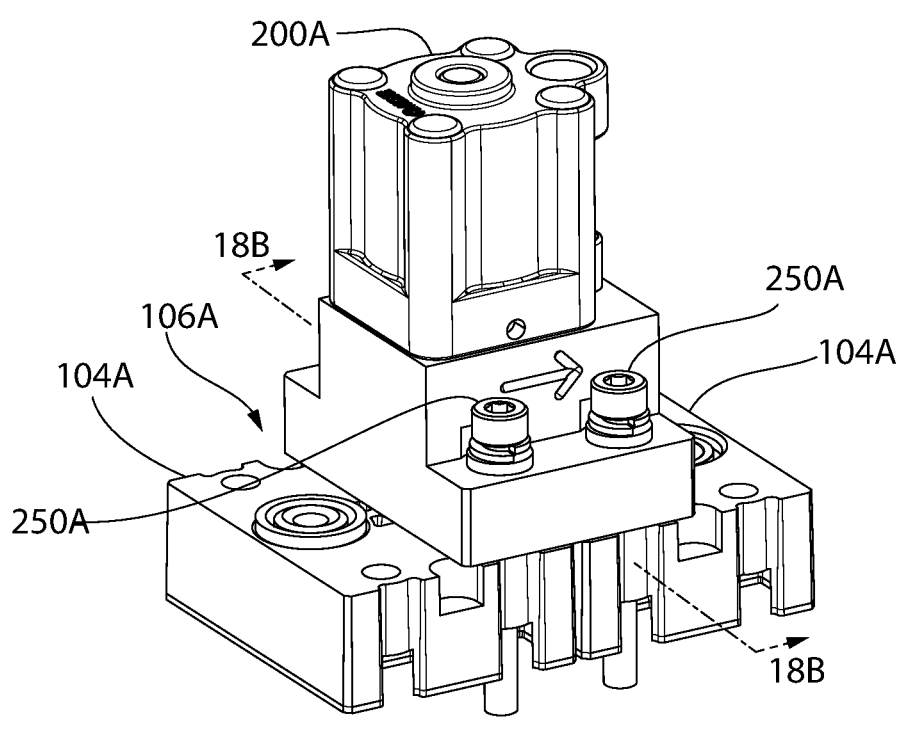
FIG. 18A is a perspective view of a component mounted to a pair of substrate blocks.
Figure 18B:
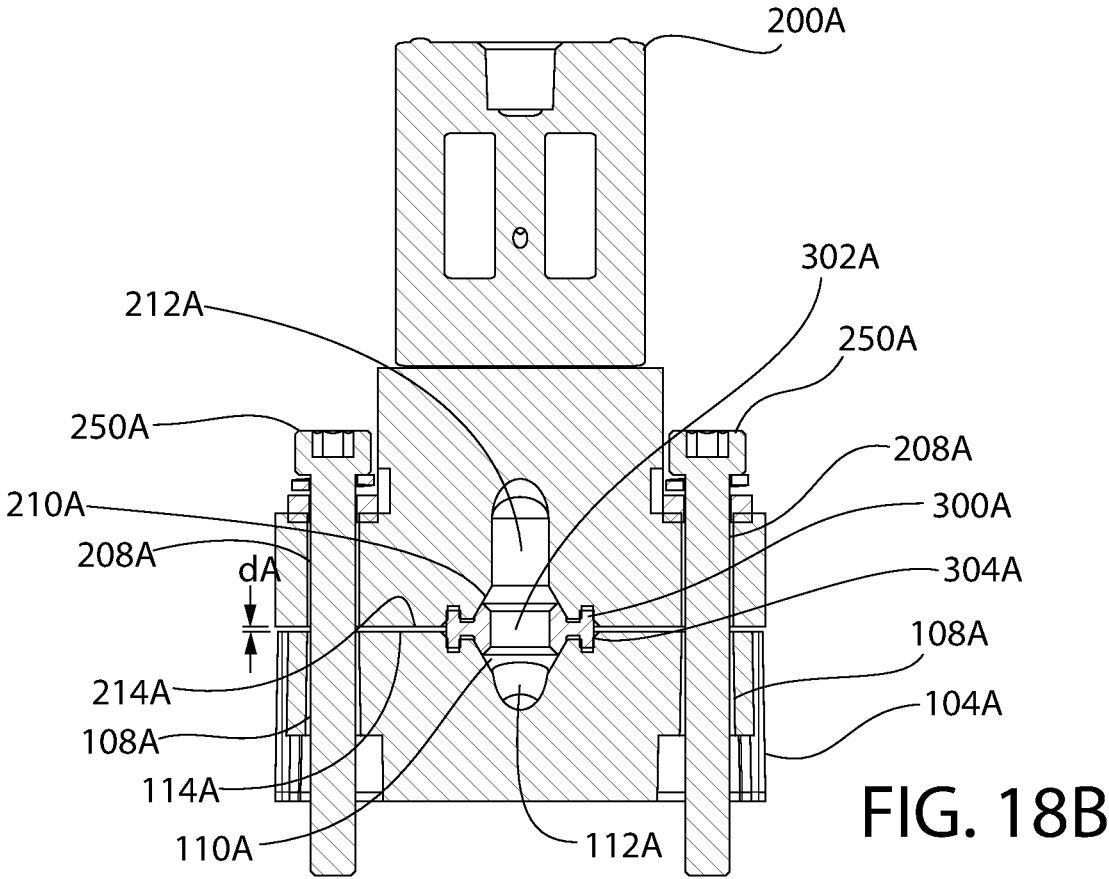
FIG. 18B is a cross-sectional view of the component and one of the substrate blocks of FIG. 18A, taken along line 18B-18B.

As best shown in FIG. 18B, a seal 300A is positioned between the fluid flow component 200A and the substrate block 104A. The seal 300A is an annular seal having a cylindrical outer surface 304A. The seal 300A also has a flow path 302A through the center which permits passage of fluid therethrough. The seal 300A provides a hermetic seal between a fluid port 210A of the fluid flow component 200A and a fluid port 110A of the substrate block 104A. Each of the fluid ports 110A of the substrate block 104A comprises a seal cavity 116A. Each of the fluid ports 210A of the fluid flow component 200A comprises a seal cavity 216A. Each of the fluid ports 110A of the substrate blocks 104A comprises a seal cavity 116A.

Figure 18C:
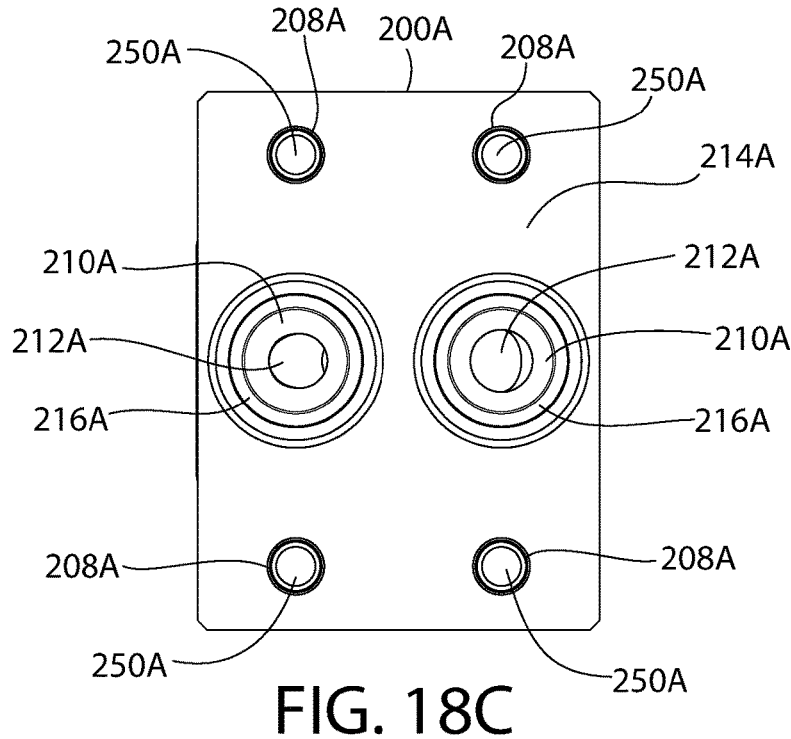
FIG. 18C is a bottom view of the component of FIG. 18A.
Figure 18D:
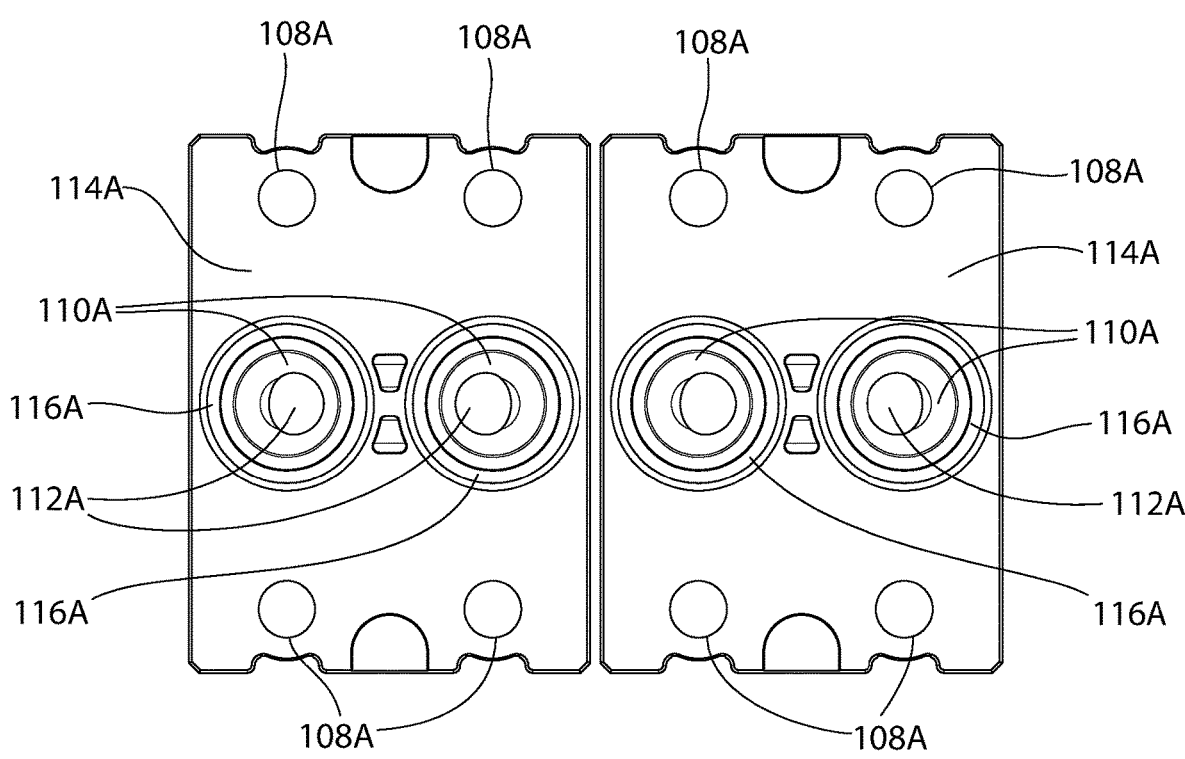
FIG. 18D is a top view of the substrate blocks of FIG. 18A.

As best shown in FIG. 18C, the fluid flow component 200A comprises a mounting surface 214A comprising two fluid ports 210A, with one fluid port 210A being an inlet and the other being an outlet. A fluid flow path 212A extends from one fluid port 210A to the other fluid port 210A. Similarly, in FIG. 18D, it can be seen that the substrate blocks 104A each comprise a mounting surface 114A comprising two fluid ports 110A. A fluid flow path 112A extends from one fluid port 110A to the other fluid port 110A. Returning to FIG. 18B, it can be seen that, when the seal 300A is installed between the fluid flow component 200A and the substrate block 104A, there is a distance d between the mounting surfaces 214A, 114A. Thus, the seal 300A is compressed between the fluid flow component 200A and the substrate block 104A. The seal 300A fits into the seal cavity 216A of the fluid flow component 200A and the seal cavity 116A of the substrate block 104A. During assembly, the mounting surfaces 114A, 214A are drawn closer together by the alignment features 250A, reducing the distance d between the mounting surfaces 114A, 214A.

Figure 19:
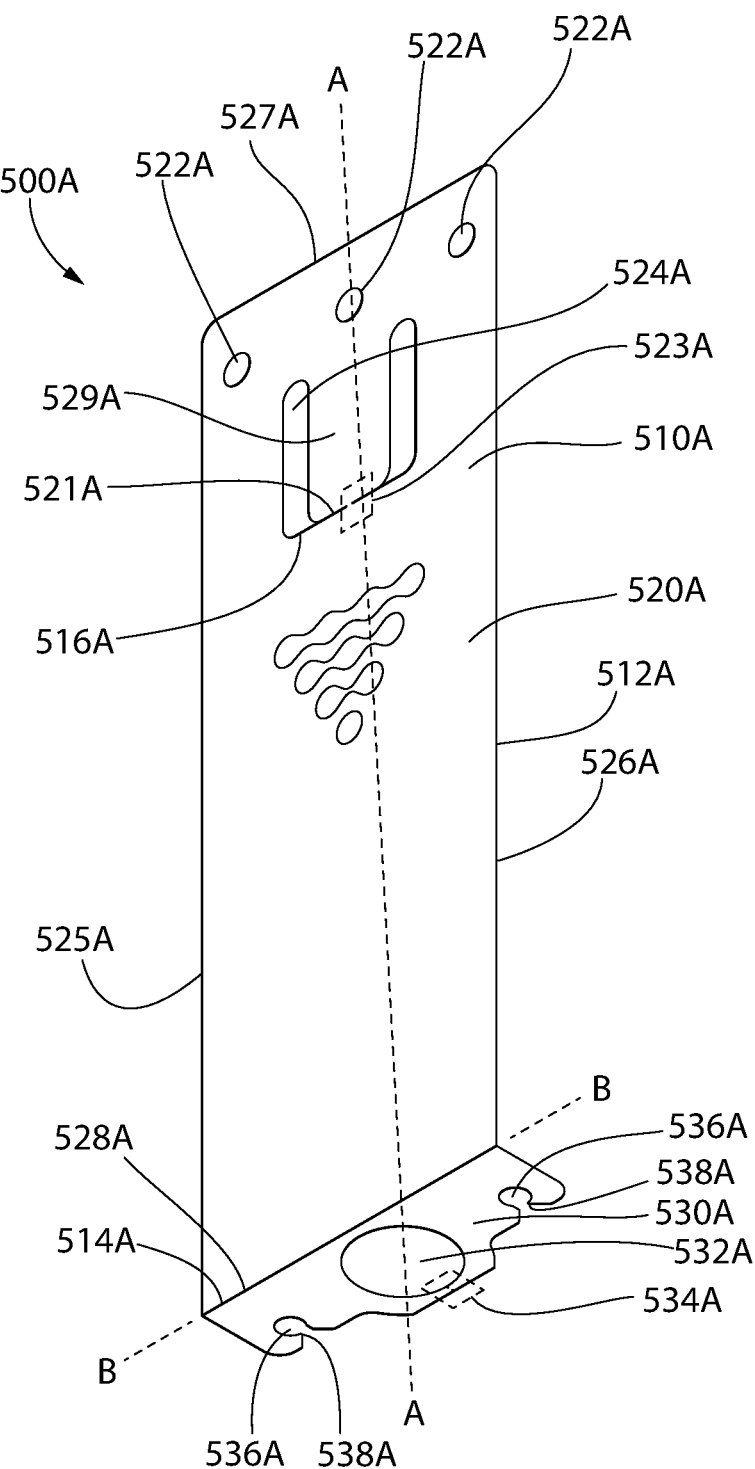
FIG. 19 is a perspective view of a seal retainer for installing a seal between a fluid flow component and a substrate block of an apparatus controlling flow.
Figure 20:
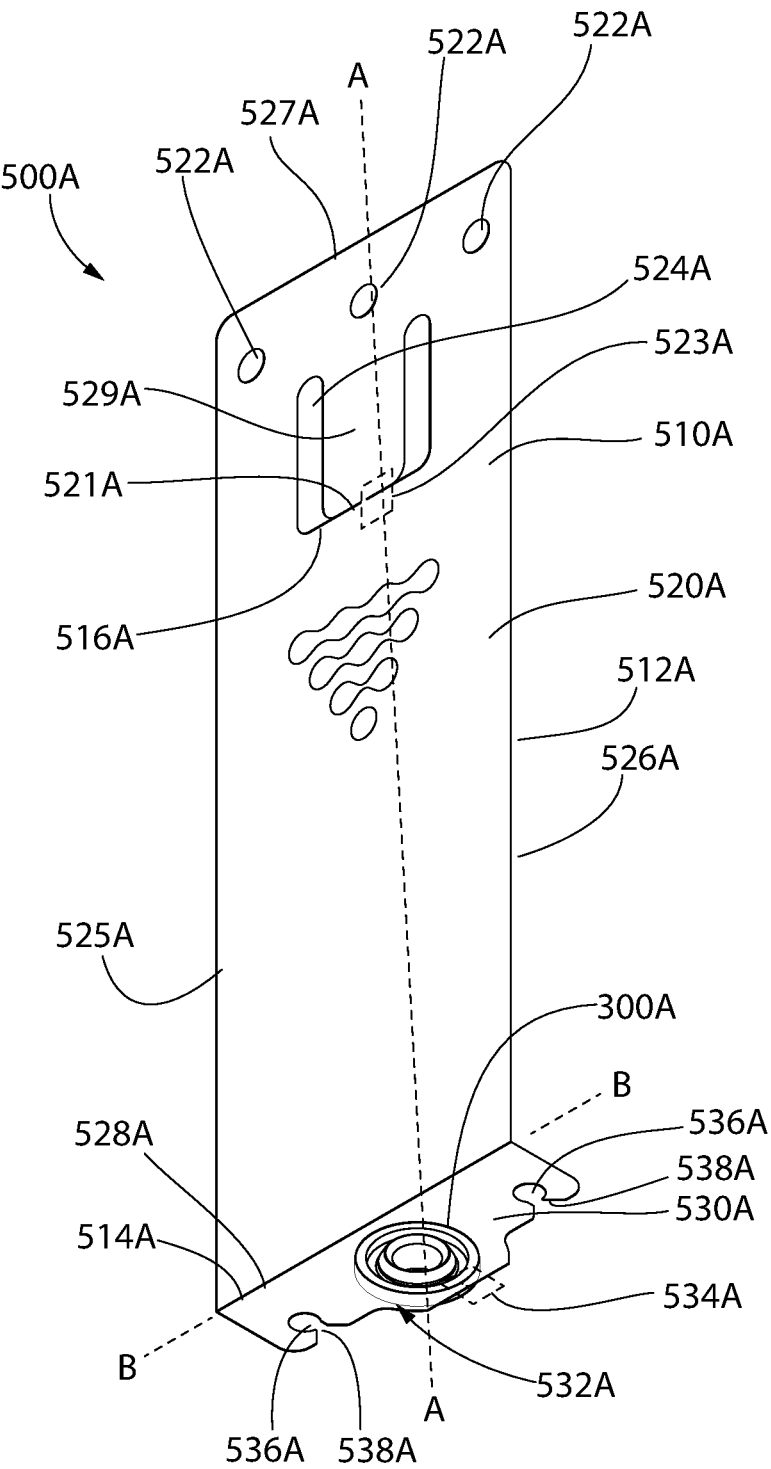
FIG. 20 is a perspective view of a seal assembly comprising the seal retainer of FIG. 19 and a seal installed in the seal retainer.
Figure 21:
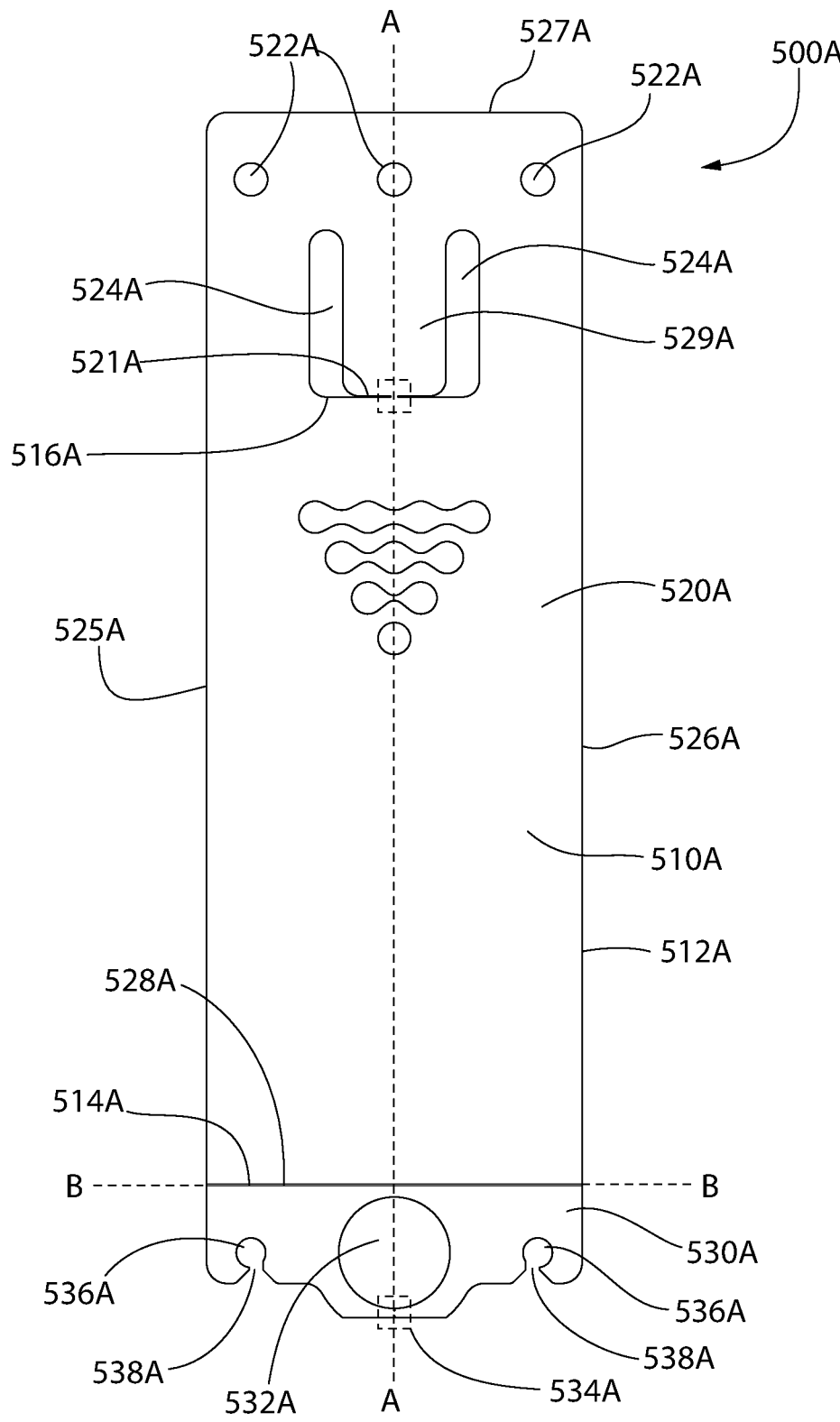
FIG. 21 is a plan view of the seal retainer of FIG. 19.

Turning to FIGS. 19-21, a seal retainer 500A is shown. The seal retainer is formed of a sheet body 510A. The sheet body 510A may be formed of any sheet material, such as sheet metal, metal foil, plastic film, or the like. In particular, the sheet body 510A may be formed of one or more of polyethylene terephthalate, Mylar, perfluoroalkoxy alkane, polytetrafluoroethylene, polyether ether ketone, polyvinylidene fluoride, polyimide, polypropylene, or fluorinated ethylene propylene. The sheet body 510A may have a thickness of 0.010 mm, 0.016 mm, or any other thickness. As discussed in greater detail below, the material properties of the sheet body 510A and other aspects will dictate the optimal thickness. In all implementations, the sheet body 510A is flexible so that the seal retainer 500A can flex during use. The sheet body 510A will flex in order to receive the seal 300A and will flex in order to bend around the component 200A.

The seal retainer 500A comprises a longitudinal axis A-A and a transverse axis B-B. In some embodiments, the longitudinal axis A-A and the transverse axis B-B are perpendicular, but in other embodiments they may be angled at angles other than 90 degrees. When the seal retainer 500A is in a flat state, the seal retainer 500A extends along the longitudinal axis A-A, the seal retainer 500A being elongate in the direction of the longitudinal axis. The seal retainer 500A has a length along the longitudinal axis A-A and a width along the transverse axis B-B, the width being less than the length. The seal retainer 500A further comprises a perimeter edge 512A, the perimeter edge 512A extending around an outer edge of the sheet body 510A.

The seal retainer 500A also comprises a first portion 520A and a second portion 530A. The first portion 520A is formed by a first edge 525A, a second edge 526A opposite the first edge 525A, a third edge 527A, and a fourth edge 528A opposite the third edge 527A, the fourth edge 528A being collinear with the transverse axis B-B. The sheet body 510A comprises a fold line 514A which is also collinear with the transverse axis B-B. Thus, the fold line 514A is collinear with the fourth edge 528A. The second portion 530A is defined by the fold line 514A and the remainder of the perimeter edge 512A of the sheet body 10. Thus, the second portion 530A is the portion that is on the opposite side of the transverse axis B-B from the first portion 520A. The fold line 514A may be perforated, scored, grooved, or otherwise altered so that the sheet body 510A will fold cleanly about the transverse axis B-B. However, in other embodiments the fold line 514A may be formed without additional bending aids formed into the sheet body 510A.

The first portion 520A also comprises a plurality of circular apertures 522A which form a gripping feature. The circular apertures 522A are arranged in a line so that a tool may be inserted into the circular apertures 522A and used as a handle for pulling on the first portion 520A of the seal retainer 500A. Optionally, the circular apertures 522A are symmetrical about the longitudinal axis A-A. There may be fewer or more than three circular apertures.

A second gripping feature is formed by a pair of elongate apertures 524A, the elongate apertures 524A being along the longitudinal axis A-A and symmetrical about the longitudinal axis A-A. The second gripping feature comprises a tab portion 529A having a distal edge 521A. The sheet body 510A comprises an internal edge 516A which is joined to the distal edge 521A of the tab portion 529A by a frangible zone 523A. The frangible zone 523A may be an area of the distal edge 521A that remains connected to the tab portion 529A in some manner. For instance, it may be scored, grooved, cut, or perforated. In other words, the distal edge 521A is connected to the internal edge 516A but the connection is weakened intentionally to permit breakage of the frangible zone 523A. The frangible zone 523A may also be known as a pre-weakened zone or pre-weakened area. The tab portion 529A may then be folded upward away from the first portion 520A so that the user can insert a finger into the first portion 520A between the elongate apertures 524A. This can be used to pull on the first portion 520A. Reasons for the importance of gripping features will be discussed in greater detail below.

The second portion 530A can be transitioned from the flat state discussed above to a folded state. In the flat state, the first portion 520A forms a first planar surface and the second portion 530A forms a second planar surface. Each of the first and second planar surfaces are coplanar. In other words, they both occupy the same plane and form a single planar surface. In the flat state, the first portion 520A is coincident with the longitudinal axis A-A. In the flat state, the second portion 530A is also coincident with the longitudinal axis. In the folded state, the second portion 530A is bent about the transverse axis B-B along the fold line 514A. Thus, the second portion 530A and (its corresponding second planar surface) are no longer coplanar with the first planar surface of the first portion 520A. The second portion 530A may be angled at any angle, but is most preferably angled at approximately 90 degrees to the first portion 520A. Thus, the second portion 530A is angled with respect to the longitudinal axis A-A. The second portion 530A rotates about transverse axis B-B at the fold line 514A.

The second portion 530A comprises a seal aperture 532A configured to accept a seal 300A. As shown in FIG. 20, the seal 300A fits within the seal aperture 532A so that the seal 300A is retained by the seal aperture 532A. A seal assembly 540A is formed by the assembly of a seal 300A with a seal retainer 500A, the seal 300A being assembled into the seal aperture 532A. As shown, the seal aperture 532A is circular and engages the cylindrical outer surface 304A of the seal 300A. The seal aperture 532A is preferably sized so that it is an interference fit with the cylindrical outer surface 304A to prevent movement of the seal 300A in the seal aperture 532A. However, other geometries are contemplated for the seal aperture 532A.

Adjacent the seal aperture 532A, a frangible zone 534A is positioned between the seal aperture 532A and the perimeter edge 512A of the sheet body 510A. As discussed above with respect to the frangible zone 523A, the frangible zone 534A may be slotted, perforated, grooved, scored, or otherwise weakened to promote breakage of the sheet body 510A at the frangible zone 534A. The frangible zone 534A may also be known as a pre-weakened zone or pre-weakened area. The frangible zone 534A will be discussed in greater detail below.

The second portion 530A further comprises a pair of fastener engagement features 536A. The fastener engagement features 536A are semi-circular in construction with an entry slot 538A that has a width less than the diameter of the semi-circular fastener engagement feature 536A. In alternate configurations, the entry slot 538A may be replaced by a frangible zone or other feature. The fastener engagement features 536A need not be semi-circular, and may have different shapes, as desired. The fastener engagement features 536A are configured to engage the alignment features 250A and may be the same diameter or general dimensions as the alignment features 250A. Alternately, they may be an interference fit or they may have some clearance between the fastener engagement features 536A and the alignment features 250A.

Figure 22A:
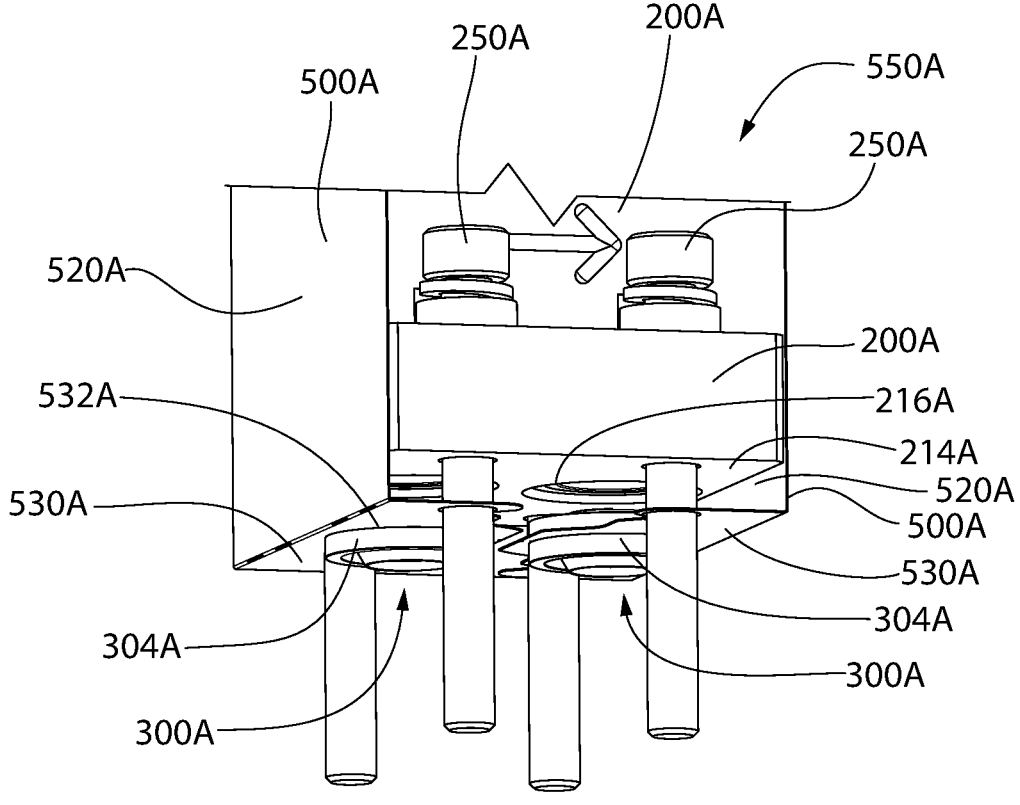
FIG. 22A is a lower perspective view of a portion of a component assembly including two seal retainers, two seals, and a flow control component.
Figure 22B:
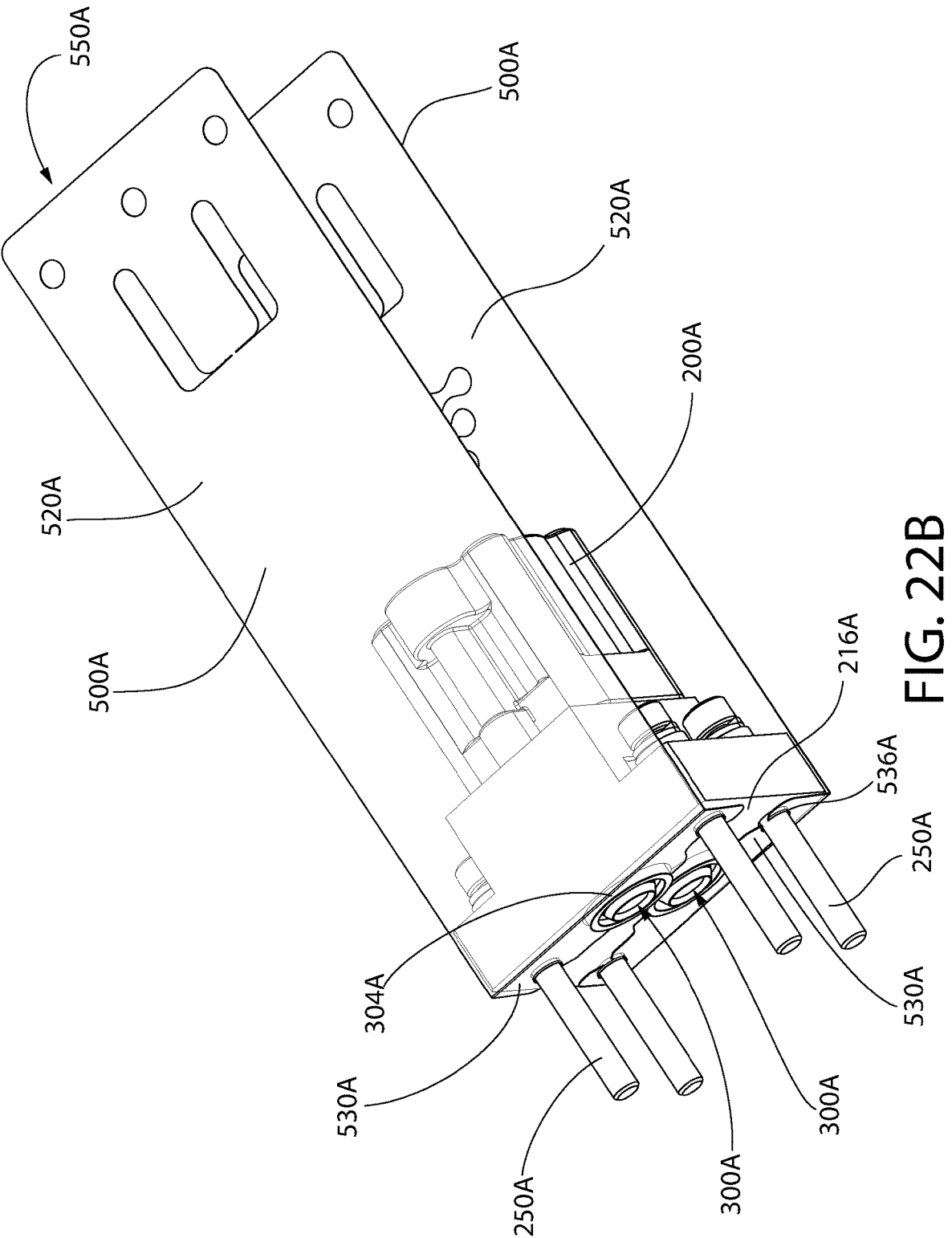
FIG. 22B is a perspective view of the component assembly of FIG. 22A.

Turning to FIGS. 22A and 22B, a component assembly 550A is shown. The component assembly 550A comprises the fluid flow component 200A, a plurality of alignment features 250A, and two seal assemblies 540A. In FIG. 22A, the seal assemblies 540A are not yet fully assembled to the fluid flow component 200A. As can be seen, the seal cavities 216A of the component 200A are still exposed, with the seals 300A spaced from the seal cavities 216A. The fastener engagement features 536A are engaged with the alignment features 250A so that the first portions 520A of the seal retainer are located on opposite sides of the fluid flow component 200A. In FIG. 22B, the seal assemblies 540A are fully assembled to the fluid flow component 200A such that the seals 300A are at least partially inserted into the seal cavities 216A. The fastener engagement features 536A remain engaged with the alignment features 250A to facilitate the retention of the seals 300A in contact with the seal cavities 216A.

Figure 23A:
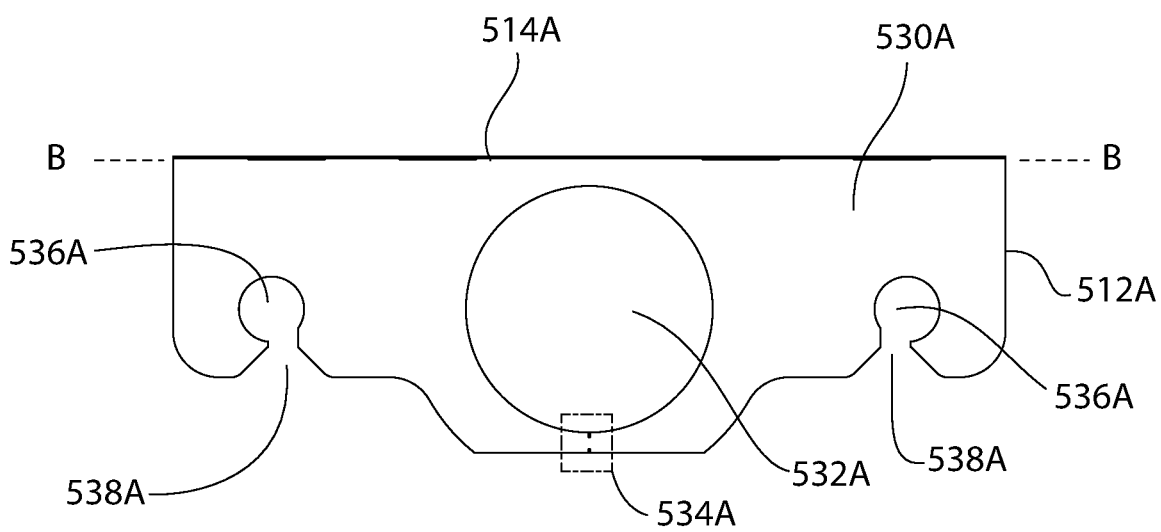
FIG. 23A is a plan view of a portion of the seal retainer of FIG. 19.
Figure 23B:
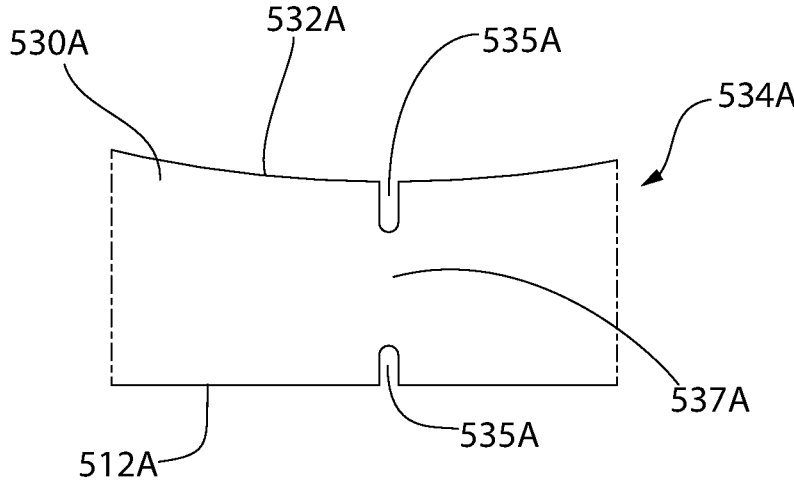
FIG. 23B is a detail view of the portion of the seal retainer of FIG. 23A showing a frangible zone.

FIGS. 23A and 23B show detailed views of a portion of the seal retainer 500A. In particular, the second portion 530A is shown in detail in FIG. 23A. As can be seen, the frangible zone 534A is adjacent the seal aperture 532A. The frangible zone 534A is shown in greater detail in FIG. 23B. As is apparent, the seal aperture 532A is located on one side of the frangible zone 534A. The perimeter edge 512A of the sheet body 510A is located on an opposite side of the frangible zone 534A. The frangible zone 534A comprises a pair of slots 535A and an unbroken section 537A. A first one of the slots 535A extends from an edge of the seal aperture 532A, while a second one of the slots 535A extends from the perimeter edge 512A of the sheet body 510A. An unbroken section 537A is located between the slots 535A.

Figure 23C:
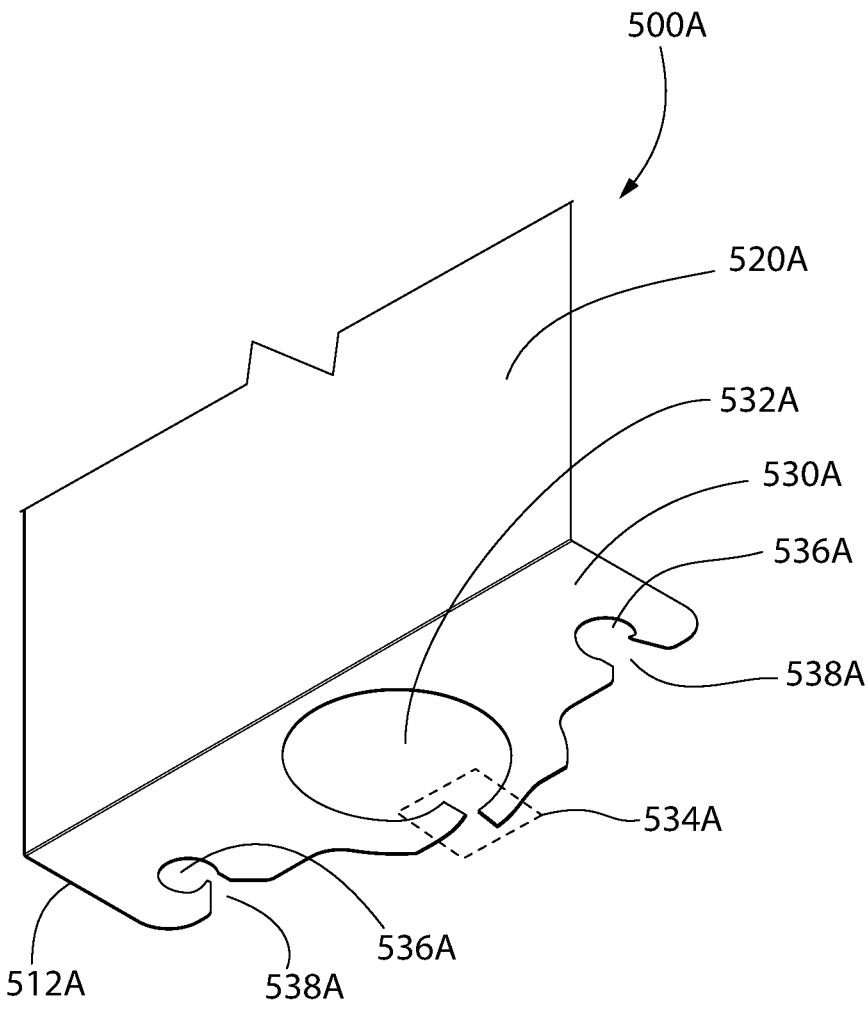
FIG. 23C is a perspective view of a portion of the seal retainer of FIG. 19 after removal of the seal retainer from the fluid flow component.
Figure 24:
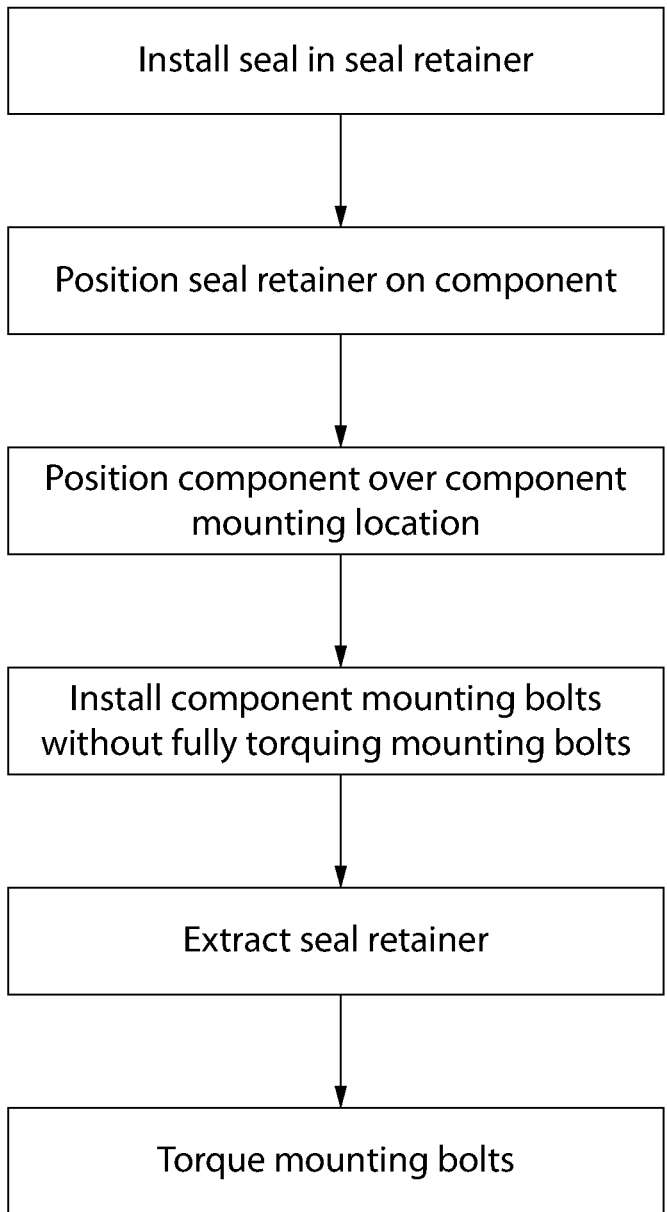
FIG. 24 is a flow chart showing the method of installing the fluid flow component in an apparatus for controlling flow.

Thus, the frangible zone 534A is configured to tear the unbroken section 537A by increasing stress concentrations adjacent the slots 535A and ensuring a clean and easy break when the user pulls on the first portion 520A of the seal retainer 500A. A representation of a broken seal retainer is shown in FIG. 23C. As mentioned above, grooves, slots, perforations, holes, or any other known means may be used to selectively weaken the frangible zone 534A. Combinations of multiple techniques may also be used to promote breaking within a desired area in the frangible zone. The design of the features in the frangible zone 534A may also be used to control breaking force. This, in combination with parameters such as material and thickness of the sheet body 510A will allow close control of the required force.

FIG. 23 shows a flow chart illustrating the steps for installing a fluid flow component 200A into an apparatus for controlling flow 100A. First, the user positions a seal 300A into a seal retainer 500A. Specifically, the seal 300A is inserted into the seal aperture 532A so that the seal aperture 532A is located approximately at a midpoint on the cylindrical outer surface 304A. This assembly step forms a seal assembly 540A. The seal retainer 500A may be folded along the fold line 514A before or after insertion of the seal 300A into the seal aperture 532A, but is preferably folded prior to insertion of the seal 300A.

Second, the seal assembly 540A is positioned on the fluid flow component 200A. The seal assembly 540A is positioned such that the seal 300A engages a seal cavity 216A of the fluid flow component 200A. The seal retainer 500A is positioned so that alignment features 250A of the fluid flow component 200A engage fastener engagement features 536A of the second portion 530A of the seal retainer 500A. The alignment features 250A are inserted into the fastener passageways 208A of the fluid flow component 200A prior to assembling the seal assembly to the fluid flow component 200A. The first portion 520A of the seal retainer 500A extends along a side of the fluid flow component 200A while the second portion 530A is positioned approximately parallel to the mounting surface 216A of the fluid flow component 200A. A component assembly 550A is formed by the combination of the seal assembly 540A, the fluid flow component 200A, and the alignment features 250A. Optionally, the alignment features 250A may be considered part of the fluid flow component 200A or may be considered separate components which form a part of the component assembly 550A. Nonetheless, a completed component assembly 550A comprises at least one alignment feature 250A.

Third, the fluid flow component 200A is positioned atop the component mounting location 106A. Thus, the fluid flow component 200A overlays at least one substrate block 104A. The seal 300A is positioned so that it is in contact with a seal cavity 116A of the substrate block 104A. Thus, the seal 300A is aligned with the seal cavity 116A of the substrate block 104A and the seal cavity 216A of the fluid flow component 200A. In positioning the fluid flow component 200A atop the component mounting location 106A, the alignment features 250A are inserted into the fastener passageways 108A. In this embodiment, the alignment features 250A are bolts, and the bolts facilitate alignment of the fluid flow component 200A and the substrate block 104A while retaining the seal retainer 500A. This ensures that the seal 300A remains in contact with the seal cavity 216A during positioning of the fluid flow component 200A. However, the seal 300A is not necessarily fully inserted into the seal cavity 216A or the seal cavity 116A during this or previous steps. Additional fastening is required to properly seat the seal 300A and ensure a hermetic seal of the fluid flow paths 112A, 212A, 302A.

Fourth, in the present embodiment, the alignment features 250A, which are bolts, are partially installed. Thus, the alignment features also serve as fasteners which compress the seal 300A. The alignment features 250A may be installed finger tight, or otherwise to a torque that is less than a specified maximum torque. Partial fastening is essential to avoid pinching the seal retainer 500A between the fluid flow component 200A and the substrate block 104A.

Fifth, the seal retainer 500A is retracted. The user utilizes a gripping feature such as the circular apertures 522A, the elongate apertures 524A and the tab portion 529A, or even the first portion 520A itself. The user applies a retraction force on the first portion 520A in order to break the frangible zone 534A adjacent the seal aperture 532A. The seal retainer 500A may then be removed, such that no part of the seal retainer 500A remains between the fluid flow component 200A and the substrate block 100A after the seal retainer 500A is retracted.

Sixth, the alignment features 250A, in this case bolts, are torqued to a torque specification. If alternate (non-threaded) fastening means are used, then the fasteners of this alternate fastening means would be installed such that they provide the intended clamping force between the substrate block 104A and the fluid flow component 200A. Thus, the seal 300A is fully seated in the respective seal cavities 116A, 216A and a hermetic seal is formed between the fluid flow paths 112A, 212A, 302A. Optionally, this process may be performed in parallel such that two or more seal assemblies 540A are formed and installed on the fluid flow component 200A. For instance, where a fluid flow component 200A has two fluid ports 210A, the process would be performed twice in parallel. Where a fluid flow component 200A has three fluid ports 210A, the process would be performed three or more times in parallel. In order to complete a flow path from a fluid supply to the processing chamber 1300A, each and every fluid port 210A must either be hermetically sealed to a fluid port 110A of a substrate block 104A or to a conduit which connects to a component or external device.

Figure 25A:
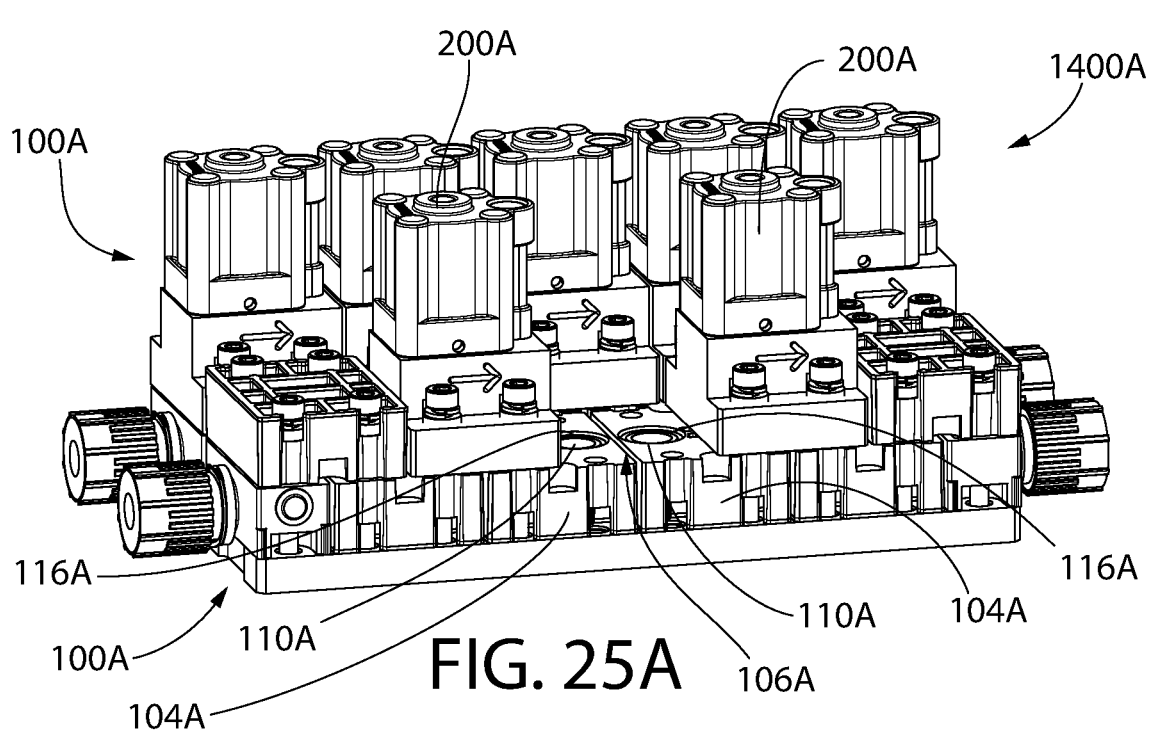
FIG. 25A is a perspective view of a fluid delivery module showing an apparatus for controlling flow having a missing fluid flow component.

Turning to FIGS. 25A-E, the assembly method is shown in greater detail. Another embodiment of a delivery module 1400A is shown with two apparatus for controlling flow 100A arranged in parallel. In FIG. 25A, one of the apparatus for controlling flow 100A is incomplete, with a component mounting location 106A missing a fluid flow component. As can be seen, two substrate blocks 104A of the component mounting location 106A have exposed fluid ports 110A and the seal cavities 116A are free of seals 300A. Thus, the component mounting location 106A is prepared for installation of a fluid flow component 200A.

Figure 25B:
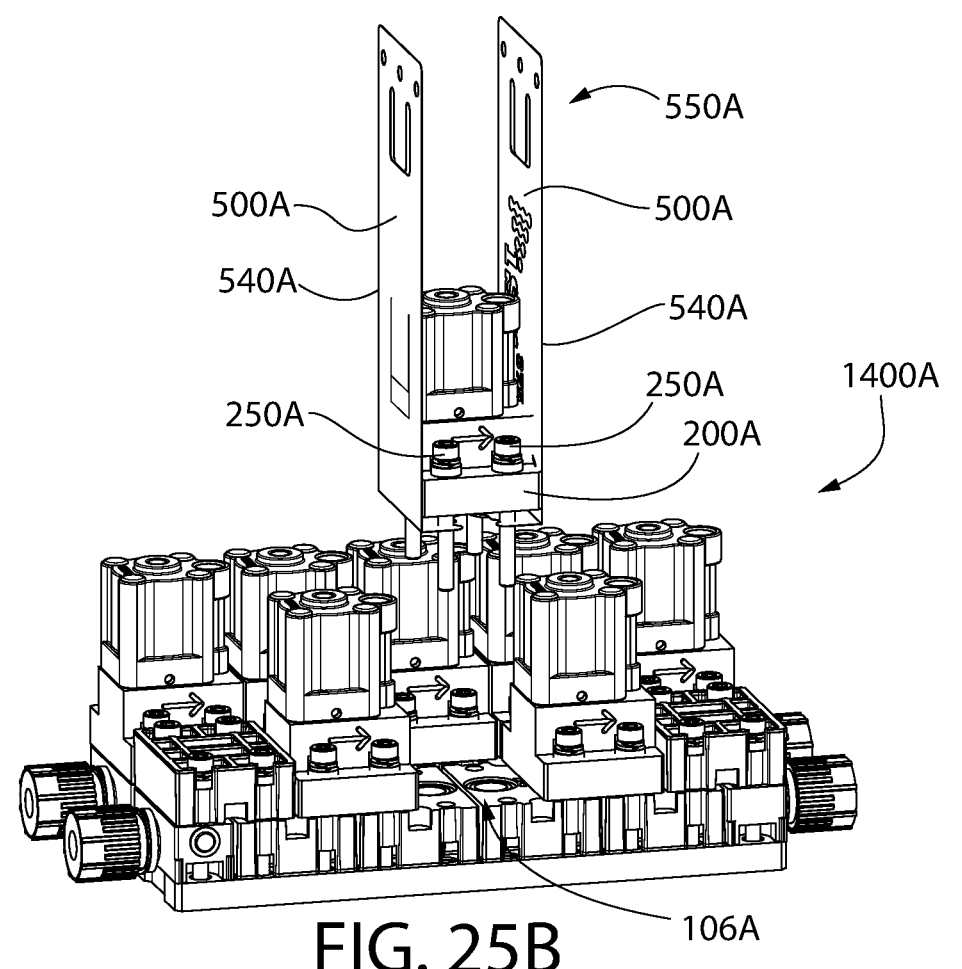
FIG. 25B is a perspective view of the fluid delivery module of FIG. 25A showing a component assembly in preparation for assembly.
Figure 25C:
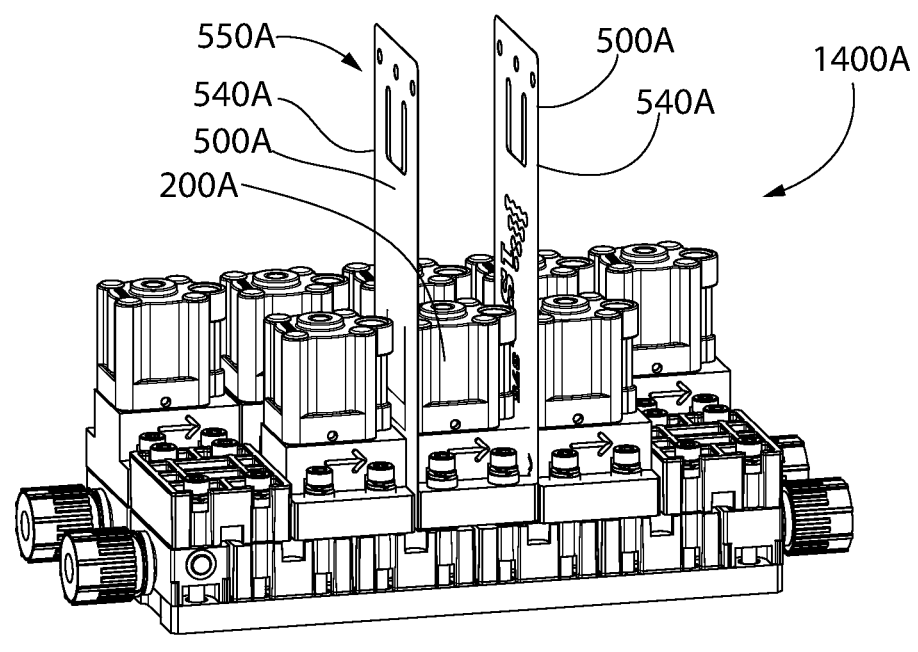
FIG. 25C is a perspective view of the fluid delivery module of FIG. 25A showing the component assembly partially fastened to the apparatus for controlling flow.
Figure 25D:
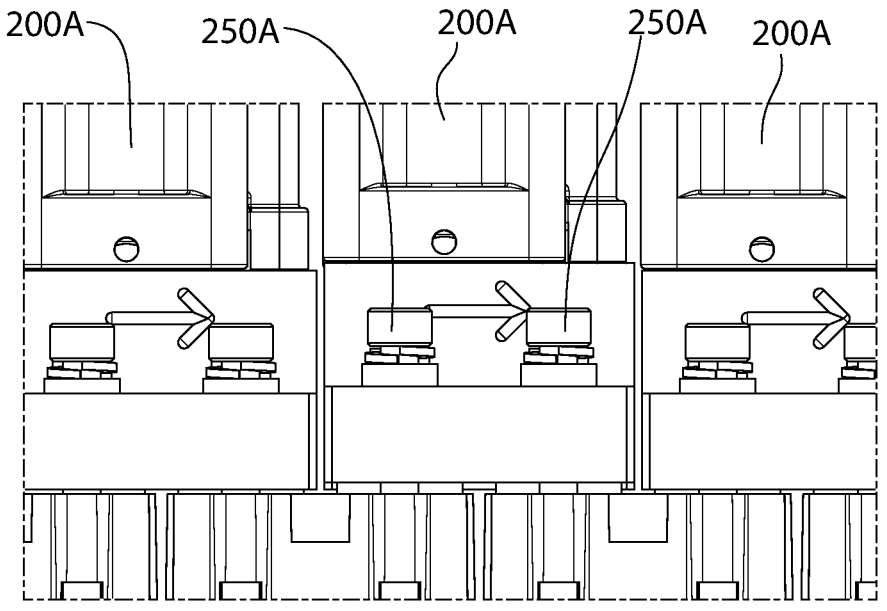
FIG. 25D is a detail view a portion of the apparatus for controlling flow of FIG. 25A showing the fluid flow component of the component assembly with the seal retainers removed.
Figure 25E:
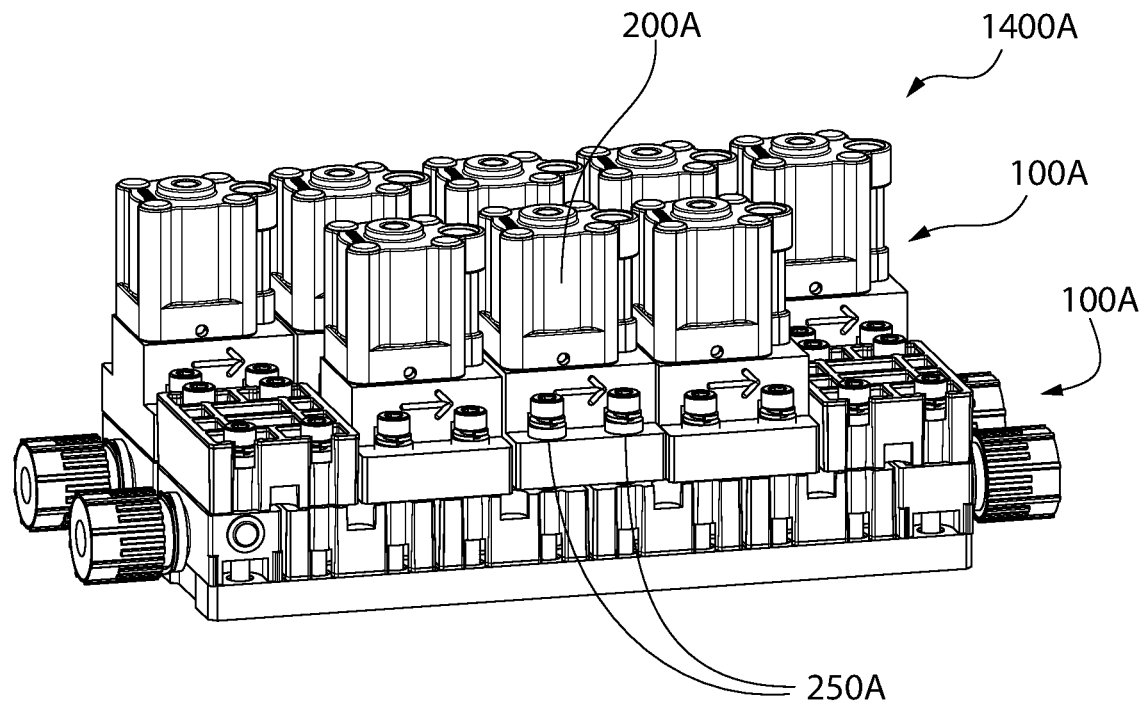
FIG. 25E is a perspective view of the fluid delivery module of FIG. 25A showing the fluid flow component completely fastened to the apparatus for controlling flow.

In FIG. 25B, a component assembly 550A is shown positioned above the component mounting location 106A. As discussed above, the component assembly 550A comprises two seal assemblies 540A, a plurality of alignment features 250A, and a fluid flow component 200A. In FIG. 25C, the component assembly 550A is positioned atop the component mounting location 106A so that the seal cavities 116A, 216A are aligned with the seals 300A. The alignment features 250A are partially fastened. Turning to FIG. 25D, a detail view of the component assembly 550A is shown, with the seal retainers 500A retracted. As can be seen, the fluid flow component 200A is slightly higher than the fluid flow components 200A on either side because the fluid flow component 200A has not yet been completely fastened. Finally, in FIG. 25E, the fluid flow component 200A is completely fastened via the alignment features 250A. The seal 300A is fully compressed and a hermetic seal is provided that ensures leakage free operation of the apparatus for controlling flow 100A.

Figure 26:
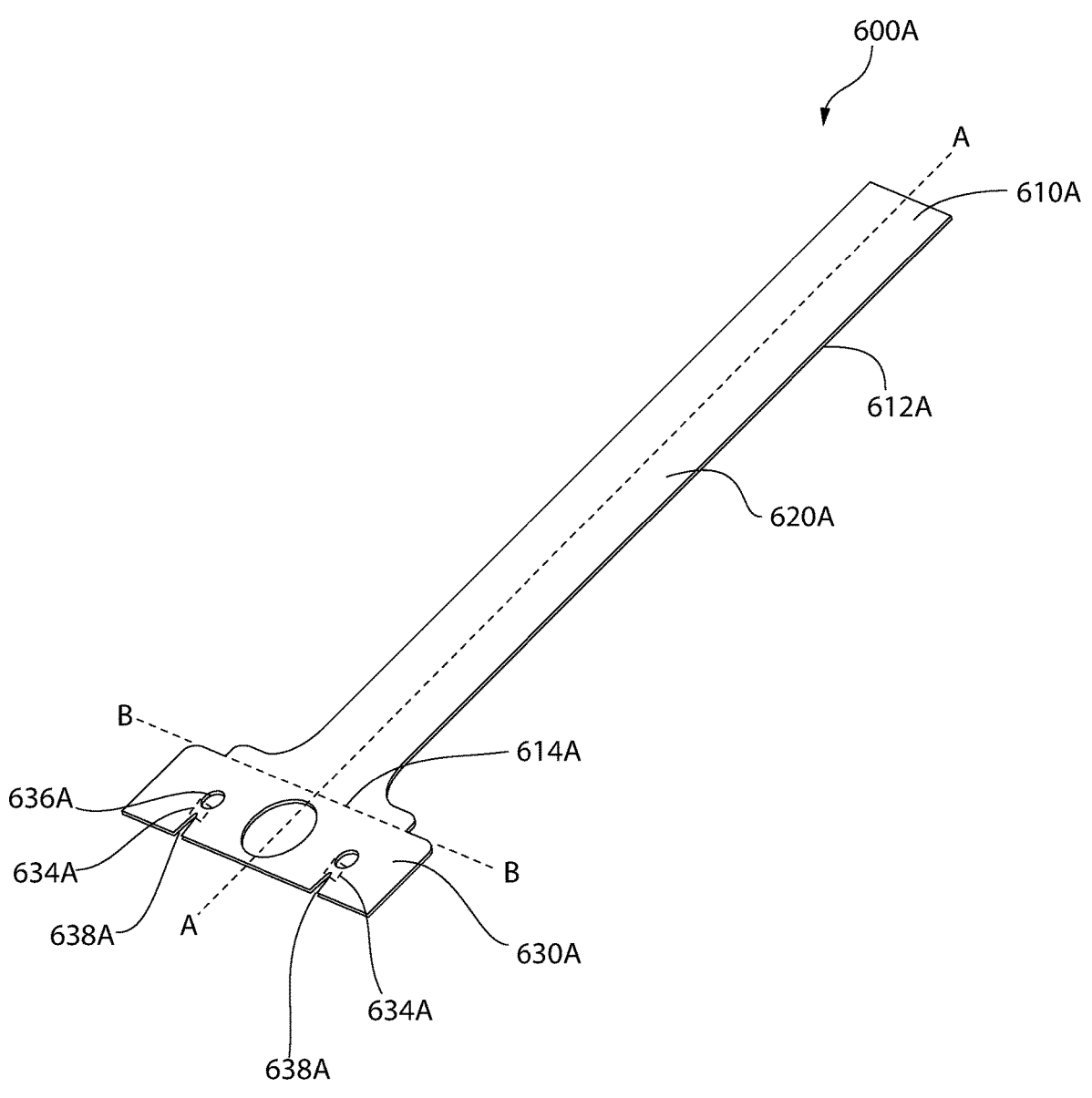
FIG. 26 is a perspective view illustrating an alternate embodiment of the seal retainer.

Turning to FIG. 26, an alternate seal retainer 600A is shown. The seal retainer 600A has a sheet body 610A having a perimeter edge 612A. A longitudinal axis A-A extends along the length of the seal retainer 600A, while a transverse axis B-B extends along a fold line 614A. A first portion 620A is long enough that the user can grip the first portion to enable retracting the seal retainer 600A after assembly of a component assembly 550A. A second portion 630A has a seal aperture 632A. However, no frangible zone is located between the perimeter edge 612A and the seal aperture

632A. Instead, the fastener engagement features 636A have frangible zones 634A formed therebetween. The frangible zones 634A are selectively weakened by providing entry slots 638A which have a sharp edge. However, there is no weakening feature extending from the fastener engagement features 636A. The functioning of the seal retainer 600A is substantially identical to the seal retainer 500A, with the exception of increased retention of the alignment features 250A provided by the different configuration of the fastener engagement features 636A.

While the invention has been described with respect to specific examples including presently preferred modes of carrying out the invention, those skilled in the art will appreciate that there are numerous variations and permutations of the above-described systems and techniques. It is to be understood that other embodiments may be utilized, and structural and functional modifications may be made without departing from the scope of the present invention. Thus, the spirit and scope of the invention should be construed broadly as set forth in the appended claims.

What is claimed is:

1. A seal insertion tool, comprising:
   a body;
   a pair of fasteners for coupling the body to a fluid delivery module;
   an end effector slidably mounted to the body, the end effector configured to retain and adjustably hold an annular seal, the end effector being configured to change configuration to release the annular seal by comprising a plurality of grip fingers configured to radially outwardly expand to release the annular seal; and
   an actuator operably coupled to the end effector and configured to alter the end effector from a raised state to a lowered state upon a user actuating the actuator.

2. The seal insertion tool according to claim 1, wherein the actuator comprises:
   a user-engagement component;
   a threaded drive shaft non-rotatably coupled to the user-engagement component such that rotation of the user-engagement component causes corresponding rotation of the threaded drive shaft; and
   a threaded collar mounted to and fixed relative to the body, the threaded drive shaft in threaded engagement with the threaded collar such that rotation of the threaded drive shaft causes the threaded drive shaft to axially translate relative to the body and the threaded collar.

3. The seal insertion tool according to claim 2, wherein the end effector comprises a plunger shaft and a plunger head, the plunger shaft in axial alignment and operable cooperation with the threaded drive shaft such that the axial translation of the threaded drive shaft moves the end effector from the raised state to the lowered state.

4. The seal insertion tool according to claim 1, wherein the end effector comprises a plunger head having an annular wall surrounding a central depression having a floor, the annular wall terminating in a work surface, the work surface and floor being axially offset from one another.

5. The seal insertion tool according to claim 4, further comprising the annular seal loaded into the end effector, the annular seal comprising an outer upstanding ring wall, an inner upstanding ring wall, and a flange extending between the inner and outer upstanding ring walls; and wherein a top surface of the outer upstanding ring wall is in contact with the work surface and an upper portion of the inner upstanding ring wall protrudes into the central depression, a gap existing between the floor and a top surface of the inner upstanding ring wall.

6. The seal insertion tool according to claim 1, wherein the end effector comprises a gripper slidably mounted to a plunger having a plunger shaft and a plunger head located at the distal end of the plunger shaft, the gripper comprising a plurality of radially deflectable grip fingers mounted to a collar slidably mounted about the plunger shaft.

7. The seal insertion tool according to claim 6, wherein upon the actuator being actuated, the plunger of the end effector is lowered and slides relative to the gripper.

8. A seal insertion tool, comprising:
   a body;
   a pair of fasteners for coupling the body to a fluid delivery module;
   an end effector slidably mounted to the body, the end effector configured to receive and retain an annular seal; and
   an actuator operably coupled to the end effector and configured to alter the end effector from a raised state to a lowered state upon a user actuating the actuator, wherein the actuator comprises:
      a user-engagement component;
      a threaded drive shaft non-rotatably coupled to the user-engagement component such that rotation of the user-engagement component causes corresponding rotation of the threaded drive shaft; and
      a threaded collar mounted to and fixed relative to the body, the threaded drive shaft in threaded engagement with the threaded collar such that rotation of the threaded drive shaft causes the threaded drive shaft to axially translate relative to the body and the threaded collar,
   wherein the end effector comprises:
      a plunger shaft; and
      a plunger head, the plunger shaft in axial alignment and operable cooperation with the threaded drive shaft such that the axial translation of the threaded drive shaft moves the end effector from the raised state to the lowered state, and
   wherein the seal insertion tool further comprises a friction-reducing component located between a distal end of the threaded drive shaft and a proximal end of the plunger shaft.

9. The seal insertion tool according to claim 8, wherein the friction-reducing component comprises a ball bearing.

10. The seal insertion tool according to claim 9, wherein the proximal end of the plunger shaft comprises a depression in which the ball bearing nests.

11. A seal insertion tool, comprising:
   a body;
   a pair of fasteners for coupling the body to a fluid delivery module;
   an end effector slidably mounted to the body, the end effector configured to receive and retain an annular seal; and
   an actuator operably coupled to the end effector and configured to alter the end effector from a raised state to a lowered state upon a user actuating the actuator, wherein the end effector is non-rotatable relative to the body.

12. A seal insertion tool, comprising:
   a body:
   a fastener for coupling the body to a fluid delivery module;

an end effector slidably mounted to the body, the end effector configured to receive and retain an annular seal; and
   an actuator operably coupled to the end effector, the actuator configured to apply a force to the end effector, wherein the end effector is non-rotatable relative to the body.

13. The seal insertion tool according to claim 12, wherein the actuator comprises:
   a user-engagement component;
   a threaded drive shaft non-rotatably coupled to the user-engagement component such that rotation of the user-engagement component causes corresponding rotation of the threaded drive shaft; and
   a threaded collar mounted to and fixed relative to the body, the threaded drive shaft in threaded engagement with the threaded collar such that rotation of the threaded drive shaft causes the threaded drive shaft to axially translate relative to the body and the threaded collar.

14. The seal insertion tool according to claim 13, wherein the end effector comprises a plunger shaft and a plunger head, the plunger shaft in axial alignment and operable cooperation with the threaded drive shaft such that the axial translation of the threaded drive shaft moves the end effector from a raised state to a lowered state.

15. A seal insertion tool, comprising:
   a body:
   a fastener for coupling the body to a fluid delivery module;
   an end effector slidably mounted to the body, the end effector configured to receive and retain an annular seal; and
   an actuator operably coupled to the end effector, the actuator configured to apply a force to the end effector, wherein the end effector comprises a plunger head having an annular wall surrounding a central depression having a floor, the annular wall terminating in a work surface, the work surface and floor being axially offset from one another; and further comprising the annular seal loaded into the end effector, the annular seal comprising an outer upstanding ring wall, an inner upstanding ring wall, and a flange extending between the inner and outer upstanding ring walls; and wherein a top surface of the outer upstanding ring wall is in contact with the work surface and an upper portion of the inner upstanding ring wall protrudes into the central depression, a gap existing between the floor and a top surface of the inner upstanding ring wall.

16. A seal insertion tool, comprising:
   a body;
   a fastener for coupling the body to a fluid delivery module;
   an end effector slidably mounted to the body, the end effector configured to receive and retain an annular seal; and
   an actuator operably coupled to the end effector, the actuator configured to apply a force to the end effector, wherein the end effector comprises a gripper slidably mounted to a plunger having a plunger shaft and a plunger head located at the distal end of the plunger shaft, the gripper comprising a plurality of radially deflectable grip fingers mounted to a collar slidably mounted about the plunger shaft.

17. A seal insertion tool, comprising:

a body comprising a bore;

a fastener configured to couple the body to a fluid delivery module;

an end effector located within the bore, the end effector free to move along a longitudinal axis of the bore, and the end effector comprising grip arms configured to receive and retain an annular seal, the end effector being configured to change configuration to release the annular seal by comprising a plurality of grip fingers configured to radially outwardly expand to release the annular seal; and an actuator operably coupled to the end effector, the actuator configured to extend into the bore and engage the end effector.

* * * * *